(12) United States Patent
Suyama et al.

(10) Patent No.: US 11,958,568 B2
(45) Date of Patent: Apr. 16, 2024

(54) MOTOR UNIT AND DERAILLEUR

(71) Applicant: SHIMANO INC., Sakai (JP)

(72) Inventors: Shota Suyama, Sakai (JP); Yuta Mizutani, Sakai (JP); Atsuhiro Emura, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 18/171,641

(22) Filed: Feb. 20, 2023

(65) Prior Publication Data

US 2024/0092456 A1    Mar. 21, 2024

(30) Foreign Application Priority Data

Sep. 16, 2022  (DE) ............... 10 2022 209 746.7

(51) Int. Cl.
*B62M 9/122* (2010.01)
*B62M 9/1242* (2010.01)
*F16D 7/02* (2006.01)

(52) U.S. Cl.
CPC .......... *B62M 9/122* (2013.01); *B62M 9/1242* (2013.01); *F16D 7/024* (2013.01)

(58) Field of Classification Search
CPC ..... B62M 9/122; B62M 9/1242; B62M 9/124
USPC .................................................. 474/80, 82
See application file for complete search history.

(56) References Cited

U.S. PATENT DOCUMENTS

| | | | | |
|---|---|---|---|---|
| 6,162,140 A | * | 12/2000 | Fukuda | B62M 25/08 474/81 |
| 8,066,597 B2 | * | 11/2011 | Sakaue | B62M 9/122 474/82 |
| 9,394,030 B2 | * | 7/2016 | Shipman | B62M 9/128 |
| 11,472,509 B2 | * | 10/2022 | Sala | B62M 9/125 |
| 2015/0111675 A1 | * | 4/2015 | Shipman | B62M 9/122 474/82 |
| 2021/0129937 A1 | * | 5/2021 | Sala | H02J 7/02 |
| 2021/0129938 A1 | * | 5/2021 | Sala | B62M 9/1242 |
| 2021/0129939 A1 | * | 5/2021 | Sala | B62M 9/122 |
| 2021/0129940 A1 | * | 5/2021 | Sala | B62J 45/413 |

FOREIGN PATENT DOCUMENTS

| | | | |
|---|---|---|---|
| JP | 4282889 B2 | 4/2002 | |
| JP | 4009429 B2 | 9/2002 | |
| JP | 4541081 B2 | 3/2006 | |
| JP | 4890905 B2 | 10/2007 | |

* cited by examiner

*Primary Examiner* — Henry Y Liu

(74) *Attorney, Agent, or Firm* — MORI & WARD, LLP

(57) ABSTRACT

A motor unit comprises a torque limiter and a transmitting structure. The torque limiter includes a first member and a second member. The first member and the second member are movable relative to each other in a state where a torque applied to the torque limiter is equal to or higher than a torque threshold. The first member and the second member are movable together with each other in a state where the torque is lower than the torque threshold. The transmitting structure includes a first race, a second race, a first intermediate element at least partially provided between the first race and the second race, and a second intermediate element at least partially provided between the first race and the second race.

25 Claims, 40 Drawing Sheets

MOTOR UNIT AND DERAILLEUR

CROSS-REFERENCE TO RELATED APPLICATIONS

The present application claims priority under 35 U.S.C. § 119 to German Patent Application No. 10 2022 209 746.7, filed Sep. 16, 2022. The contents of German Patent Application No. 10 2022 209 746.7 are incorporated herein by reference in their entirety.

BACKGROUND

Technical Field

The present invention relates to a motor unit and a derailleur.

Background Information

A human-powered vehicle includes a motor device coupled to a movable part to move the movable part. External torque is input to the motor device in a case where the movable part receives an external force caused by a physical contact between an obstacle and the movable part. It is preferable to protect the motor device from such an external force.

SUMMARY

In accordance with a first aspect of the present invention, a motor unit for a bicycle component comprises a torque limiter and a transmitting structure. The torque limiter includes a first member and a second member. The first member and the second member are movable relative to each other in a state where a torque applied to the torque limiter is equal to or higher than a torque threshold. The first member and the second member are movable together with each other in a state where the torque is lower than the torque threshold. The transmitting structure has a transmitting-structure rotational axis. The transmitting structure includes a first race, a second race, a first intermediate element at least partially provided between the first race and the second race, and a second intermediate element at least partially provided between the first race and the second race. The first intermediate element is configured to move toward the first race in response to the first intermediate element pushed by the second race in a first circumferential direction with respect to the transmitting-structure rotational axis. The first intermediate element is configured to move toward the first race in response to the first intermediate element pushed by the second race in a second circumferential direction different from the first circumferential direction. The first intermediate element is configured to move away from the first race in response to the first intermediate element pushed by the second intermediate element in the first circumferential direction. The first intermediate element is configured to move away from the first race in response to the first intermediate element pushed by the second intermediate element in the second circumferential direction different from the first circumferential direction.

With the motor unit according to the first aspect, a relative movement between the first member and the second member reduces output torque transmitted via the torque limiter in the state where the torque applied to the torque limiter is equal to or higher than the torque threshold. Furthermore, the transmitting structure restricts, using the first race, the second race, the first intermediate element, and the second intermediate element, the torque from being transmitted from the second race to the second intermediate element and allows the torque to be transmitted from the second intermediate element to the second race. The torque limiter and the transmitting structure reduce or block an external force applied to at least one of the movable member and the linkage. Thus, it is possible to protect the electric motor from the external force applied to at least one of the movable member and the linkage.

In accordance with a second aspect of the present invention, the motor unit according to the first aspect is configured so that the first intermediate element is configured to rotate together with the first race in a state where the second race pushes the first intermediate element without the second intermediate element pushing the first intermediate element.

With the motor unit according to the second aspect, the transmitting structure reliably restricts, using the first race, the second race, and the first intermediate element, the torque from being transmitted from the second race to the second intermediate element.

In accordance with a third aspect of the present invention, the motor unit according to the first or second aspect is configured so that the first intermediate element is configured to rotate relative to the first race in a state where the second intermediate element pushes the first intermediate element without the second race pushing the first intermediate element.

With the motor unit according to the third aspect, the transmitting structure reliably allows, using the first race, the second race, the first intermediate element, and the second intermediate element, the torque to be transmitted from the second race to the second intermediate element.

In accordance with a fourth aspect of the present invention, the motor unit according to any one of the first to third aspects further comprises an electric motor, an output member, and a speed reducer. The speed reducer couples the electric motor and the output member to transmit an output torque of the electric motor to the output member.

With the motor unit according to the fourth aspect, it is possible to transmit the output torque from the electric motor to the output member.

In accordance with a fifth aspect of the present invention, the motor unit according to any one of the first to fourth aspects is configured so that the speed reducer includes the torque limiter and the transmitting structure.

With the motor unit according to the fifth aspect, it is possible to make the motor unit compact while protecting the electric motor from the external force.

In accordance with a sixth aspect of the present invention, the motor unit according to any one of the first to fifth aspects is configured so that the transmitting structure is provided between the electric motor and the torque limiter on a power transmission path provided from the electric motor to the output member.

With the motor unit according to the sixth aspect, it is possible to reliably protect the electric motor from the external force.

In accordance with a seventh aspect of the present invention, the motor unit according to any one of the fourth to sixth aspects is configured so that the transmitting structure is configured to transmit a first torque in a first load direction defined from the electric motor to the output member. The transmitting structure is configured to transmit a second torque in a second load direction defined from the output member to the electric motor. The first torque is higher than the second torque.

With the motor unit according to the seventh aspect, it is possible to reduce the torque applied to the transmitting structure in the second load direction.

In accordance with an eighth aspect of the present invention, the motor unit according to any one of the fourth to seventh aspects is configured so that the second member is configured to transmit a third torque to the first member in a second load direction defined from the output member to the electric motor in a state where an external torque which is input to the output member is lower than an external torque threshold. The second member is configured to transmit a fourth torque to the first member in a second load direction in a state where the external torque is equal to or larger than the external torque threshold. The third torque is higher than the fourth torque.

With the motor unit according to the eighth aspect, it is possible to reliably reduce the torque applied to the torque limiter in the state where the external torque which is input to the output member is equal to or larger than the external torque threshold.

In accordance with a ninth aspect of the present invention, the motor unit according to any one of the first to eighth aspects is configured so that the torque limiter has a limiter rotational axis. The transmitting structure has a transmitting-structure rotational axis. The limiter rotational axis is not coincident with the transmitting-structure rotational axis.

With the motor unit according to the ninth aspect, it is possible to arrange the torque limiter and the transmitting structure in different positions. Thus, it is possible to improve design flexibility of the motor unit.

In accordance with a tenth aspect of the present invention, the motor unit according to any one of the first to ninth aspects is configured so that the torque limiter has a limiter rotational axis. The limiter rotational axis is parallel to the transmitting-structure rotational axis.

With the motor unit according to the tenth aspect, it is possible to more easily arrange the torque limiter and the transmitting structure in different positions. Thus, it is possible to reliably improve design flexibility of the motor unit.

In accordance with an eleventh aspect of the present invention, the motor unit according to any one of the first to tenth aspects is configured so that the torque limiter has a limiter rotational axis. The limiter rotational axis is coincident with the transmitting-structure rotational axis.

With the motor unit according to the eleventh aspect, it is possible to reduce a space in which the torque limiter and the transmitting structure are provided.

In accordance with a twelfth aspect of the present invention, the motor unit according to any one of the first to eleventh aspects is configured so that the first member slidably contacts the second member to transmit a third torque between the first member and the second member in a state where external torque which is input to the output member is lower than an external torque threshold. The first member slidably contacts the second member to transmit a fourth torque between the first member and the second member in a state where the external torque is equal to or higher than the external torque threshold. The third torque is higher than the fourth torque.

With the motor unit according to the twelfth aspect, it is possible to reliably reduce the torque applied to the torque limiter in the state where the external torque which is input to the output member is lower than the external torque threshold.

In accordance with a thirteenth aspect of the present invention, the motor unit according to any one of the first to twelfth aspects is configured so that one of the first member and the second member includes a recess. The other of the first member and the second member includes a protruding part. The protruding part is configured to be engaged in the recess to transmit a third torque between the first member and the second member in a state where the torque is lower than the torque threshold. The protruding part is configured to be disengaged from the recess to transmit a fourth torque between the first member and the second member in a state where the torque is equal to or higher than the torque threshold. The third torque is higher than the fourth torque.

With the motor unit according to the thirteenth aspect, it is possible to reduce, with a comparatively simple structure, the torque applied to the torque limiter in the state where the torque is equal to or higher than torque threshold.

In accordance with a fourteenth aspect of the present invention, the motor unit according to any one of the first to thirteenth aspects further comprises a gear fastened to the first member to transmit the torque from the transmitting structure to the first member.

With the motor unit according to the fourteenth aspect, it is possible to reliably transmit the torque from the transmitting structure to the first member via the gear.

In accordance with a fifteenth aspect of the present invention, the motor unit according to any one of the first to fourteenth aspects is configured so that the torque limiter includes a biasing member configured to bias at least one of the first member and the second member to maintain a contact state between the first member and the second member.

With the motor unit according to the fifteenth aspect, it is possible to maintain the contact state between the first member and the second member with a comparative simple structure.

In accordance with a sixteenth aspect of the present invention, the motor unit according to any one of the first to fifteenth aspects further comprises a detection object configured to be detected by a detector. The detection object is provided on a downstream side with respect to the transmitting structure on a power transmission path.

With the motor unit according to the sixteenth aspect, it is possible to detect a state of the motor unit or the bicycle component using the detection object.

In accordance with a seventeenth aspect of the present invention, the motor unit according to any one of the first to sixteenth aspects further comprises a detection object configured to be detected by a detector. The detection object is provided on a downstream side with respect to the torque limiter on a power transmission path.

With the motor unit according to the seventeenth aspect, it is possible to detect a state of the motor unit or the bicycle component using the detection object.

In accordance with an eighteenth aspect of the present invention, the motor unit according to any one of the first to seventeenth aspects is configured so that the transmitting structure is coupled to the torque limiter. The transmitting structure is configured to transmit a first torque to the torque limiter in a state where first input torque is applied to the transmitting structure from a device other than the torque limiter. The transmitting structure is configured to transmit a second torque in a state where second input torque is applied from the torque limiter to the transmitting structure. The first torque is higher than the second torque.

With the motor unit according to the eighteenth aspect, it is possible to reduce the torque applied from the torque limiter to the transmitting structure in the state where second input torque is applied from the torque limiter to the transmitting structure.

In accordance with a nineteenth aspect of the present invention, a derailleur comprises a base member, a movable member, a linkage, and the motor unit according to any one of the first to eighteenth aspects. The linkage movably couples the base member and the movable member. The motor unit is provided at one of the base member, the movable member, and the linkage.

With the motor unit according to the nineteenth aspect, it is possible to improve design flexibility of the derailleur.

In accordance with a twentieth aspect of the present invention, the motor unit according to the nineteenth aspect further comprises a power-supply attachment structure to which an electric power source is to be attached. The power-supply attachment structure is provided at one of the base member, the movable member, and the linkage.

With the motor unit according to the twentieth aspect, it is possible to mount the electric power source via the power-supply attachment structure. Thus, it is possible to omit an electric cable for supplying electricity from another electric power source to the motor unit.

In accordance with a twenty-first aspect of the present invention, the motor unit according to the twentieth aspect is configured so that the motor unit is provided at one of the base member, the movable member, and the linkage. The power-supply attachment structure is provided at another of the base member, the movable member, and the linkage.

With the motor unit according to the twenty-first aspect, it is possible to improve design flexibility of the derailleur while omitting an electric cable.

In accordance with a twenty-second aspect of the present invention, the motor unit according to the twentieth or twenty-first aspect is configured so that the motor unit is provided at one of the base member and the linkage. The power-supply attachment structure is provided at the other of the base member and the linkage.

With the motor unit according to the twenty-second aspect, it is possible to reliably improve design flexibility of the derailleur while omitting an electric cable.

In accordance with a twenty-third aspect of the present invention, a motor unit for a bicycle component comprises an output member, an electric motor, a torque limiter, and a transmitting structure. The electric motor includes an output shaft. The torque limiter is entirely disposed inside a housing of the motor unit. The transmitting structure is configured to transmit a first torque in a first load direction defined from the output shaft to the output member and configured to transmit a second torque in a second load direction defined from the output member to the output shaft. The transmitting structure is configured to transmit a torque in multiple rotational directions based on a rotational direction of the output shaft in a state where the transmitting structure transmits the torque in the first load direction. The first torque is higher than the second torque.

With the motor unit according to the twenty-third aspect, it is possible to simplify the structure of the motor unit since the torque limiter is provided disposed inside the housing. Furthermore, the transmitting structure restricts, using the first race, the second race, the first intermediate element, and the second intermediate element, the torque from being transmitted from the second race to the second intermediate element and allows the torque to be transmitted from the second intermediate element to the second race. Thus, it is possible to protect the electric motor from the external force applied to at least one of the movable member and the linkage with a comparatively simple structure.

In accordance with a twenty-fourth aspect of the present invention, the motor unit according to the twenty-third aspect is configured so that the torque limiter is configured to transmit a third torque in a state where the torque which is input to the torque limiter is lower than a torque threshold. The torque limiter is configured to transmit a fourth torque in a state where the torque which is input to the torque limiter is equal to or higher than the torque threshold. The third torque is higher than the fourth torque.

With the motor unit according to the twenty-fourth aspect, it is possible to reduce, with a comparatively simple structure, the torque applied to the torque limiter in the state where the torque is equal to or higher than torque threshold.

In accordance with a twenty-fifth aspect of the present invention, the motor unit according to the twenty-third or twenty-fourth aspect is configured so that the torque limiter includes a first member and a second member. The first member and the second member contact each other to transmit the third torque between the first member and the second member in a state where the torque is lower than the torque threshold. The first member and the second member are configured to transmit the fourth torque between the first member and the second member in a state where the torque is equal to or higher than the torque threshold.

With the motor unit according to the twenty-fifth aspect, a relative movement between the first member and the second member reduces output torque transmitted via the torque limiter in the state where the torque applied to the torque limiter is equal to or higher than the torque threshold. Thus, it is possible to reliably protect the electric motor from the external force applied to at least one of the movable member and the linkage with a comparatively simple structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
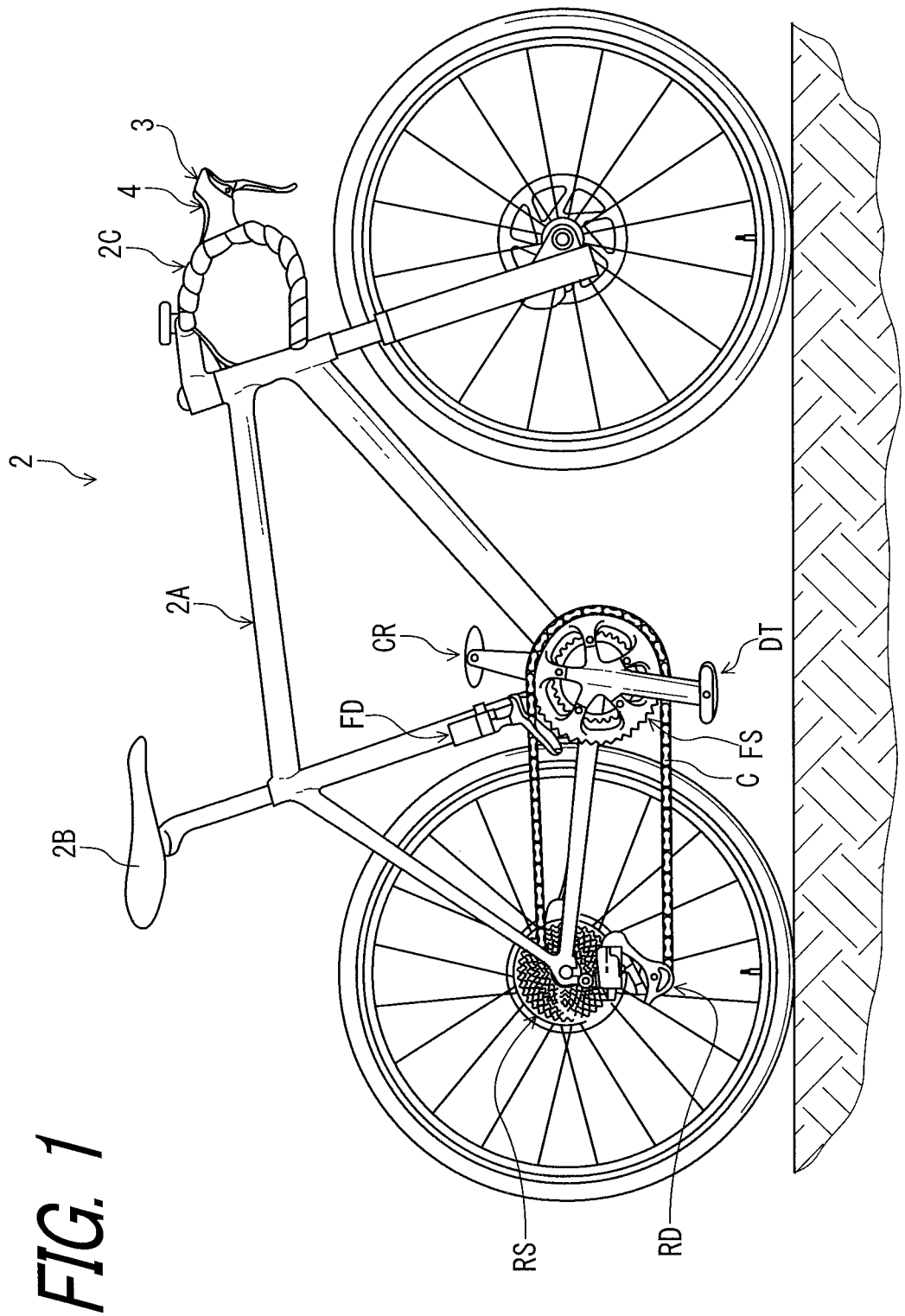
FIG. 1 is a side elevational view of a bicycle including a derailleur in accordance with a first embodiment.

The embodiments will now be described with reference to the accompanying drawings, wherein like reference numerals designate corresponding or identical elements throughout the various drawings.

First Embodiment

As seen in FIG. 1, a bicycle 2 includes a bicycle component RD in accordance with a first embodiment. The bicycle 2 further includes a vehicle body 2A, a saddle 2B, a handlebar 2C, an operating device 3, an operating device 4, and a drive train DT. The operating devices 3 and 4 are configured to be mounted to the handlebar 2C. The drive train DT includes a crank CR, a front sprocket assembly FS, a rear sprocket assembly RS, a chain C, the bicycle component FD, and the bicycle component RD. The front sprocket assembly FS is secured to the crank CR. The rear sprocket assembly RS is rotatably mounted to the vehicle body 2A. The chain C is engaged with the front sprocket assembly FS and the rear sprocket assembly RS. The bicycle component RD is mounted to the vehicle body 2A and is configured to shift the chain C relative to a plurality of sprockets of the rear sprocket assembly RS to change a gear position. The bicycle component FD is configured to shift the chain C relative to a plurality of sprockets of the front sprocket assembly FS.

The bicycle component RD is configured to be operated using the operating device 3. The bicycle component FD is configured to be operated using the operating device 4. The bicycle component RD is configured to be electrically connected to the operating devices 3 and 4. The bicycle component RD is configured to be electrically connected to the bicycle component FD.

In the first embodiment, the bicycle component RD is configured to be wirelessly connected to the operating devices 3 and 4. The bicycle component RD is configured to be wirelessly connected to the bicycle component FD. The bicycle RD can be configured to be wirelessly communicate with the bicycle component FD via at least on of a cycle computer, smart phone, a tablet, and a personal computer. The bicycle component RD is configured to change the gear position in response to a control signal transmitted from the operating device 3. The bicycle component RD is configured to transmit, to the bicycle component FD, a control signal transmitted from the operating device 4. The bicycle component FD is configured to change the gear position in response to the control signal transmitted from the operating device 4 via the bicycle component RD. Each of the bicycle components RD and FD includes an electric power source such as a battery. However, at least one of the bicycle components RD and FD can be electrically connected to another electric power source such as a battery via an electric cable if needed and/or desired. Both of the bicycle component RD and the bicycle component FD can be electrically connected to another electric power source such as a battery via an electric cable if needed and/or desired.

In the first embodiment, the bicycle component RD includes a derailleur, and the bicycle component FD includes a derailleur. Namely, the bicycle component RD can also be referred to as a derailleur RD. The bicycle component FD can also be referred to as a derailleur FD.

Structures of the bicycle component RD can be applied to other bicycle components such as the bicycle component FD if needed and/or desired.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle 2B or a seat) in the bicycle 2 with facing the handlebar 2C. Accordingly, these terms, as utilized to describe the bicycle component RD or other components, should be interpreted relative to the bicycle 2 equipped with the bicycle component RD as used in an upright riding position on a horizontal surface.

Figure 2:
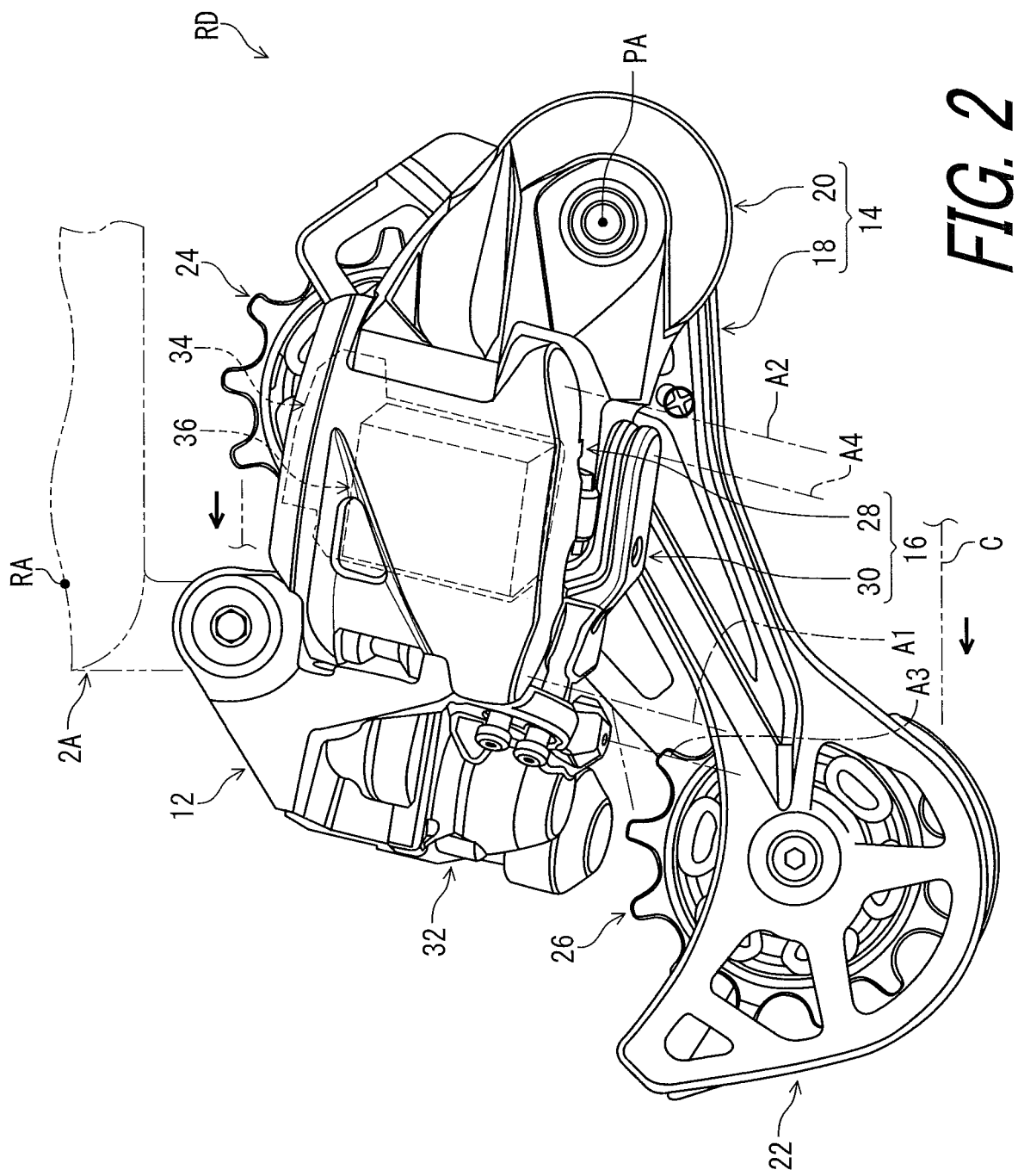
FIG. 2 is a side elevational view of the derailleur of the bicycle illustrated in FIG. 1.

As seen in FIG. 2, the derailleur RD comprises a base member 12, a movable member 14, and a linkage 16. The base member 12 is configured to be coupled to the vehicle body 2A. The movable member 14 is movable relative to the base member 12. The movable member 14 includes a chain guide 18 and a coupling part 20. The chain guide 18 is pivotally coupled to the coupling part 20 about a pivot axis PA. The coupling part 20 is movably coupled to the base member 12 via the linkage 16.

Figure 3:
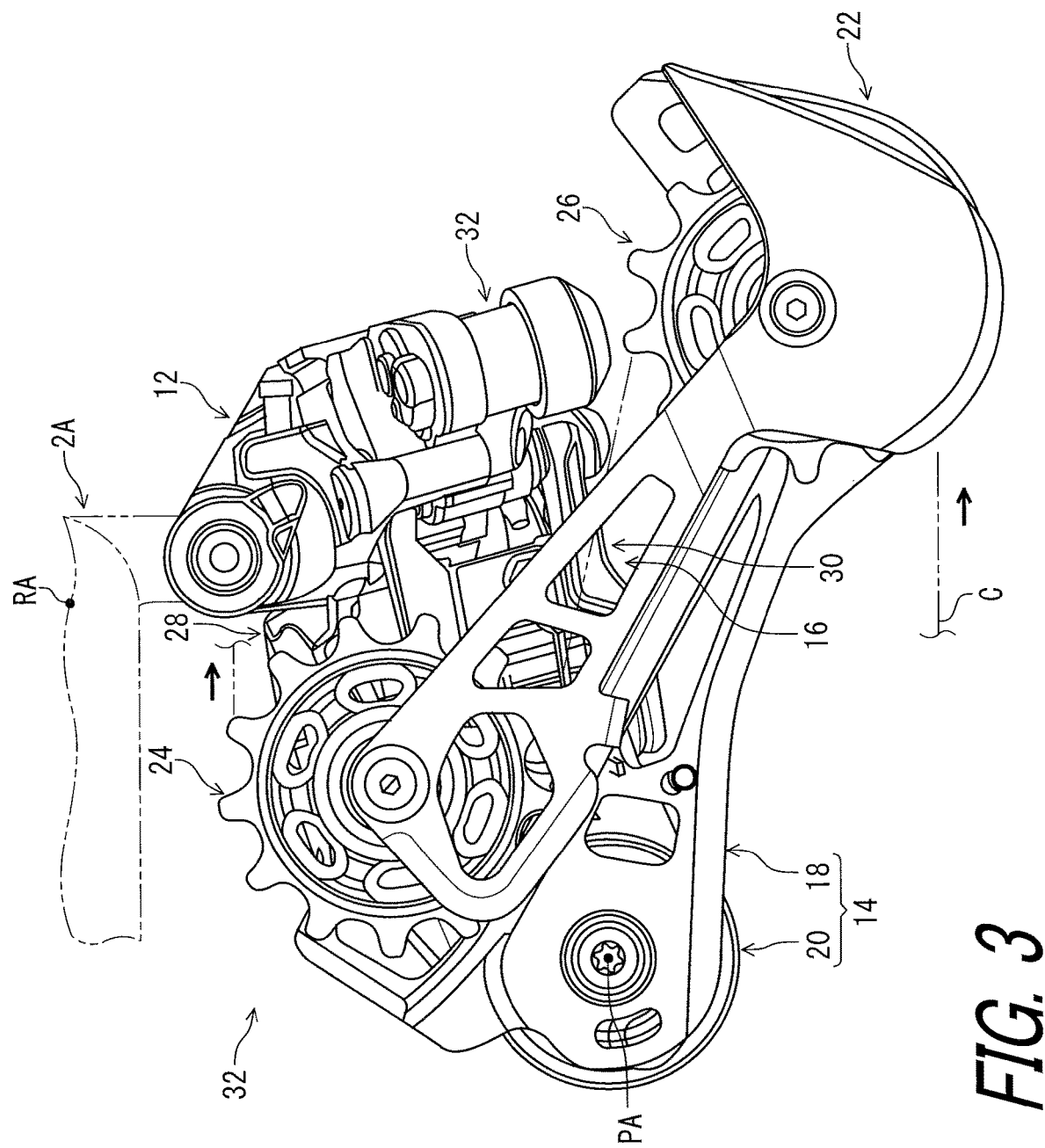
FIG. 3 is a side elevational view of the derailleur illustrated in FIG. 2.

As seen in FIG. 3, the chain guide 18 includes a guide plate 22, a guide pulley 24, and a tension pulley 26. The guide plate 22 is pivotally coupled to the coupling part 20. The guide pulley 24 is rotatably coupled to the guide plate 22. The tension pulley 26 is rotatably coupled to the guide plate 22. The guide pulley 24 is configured to be engaged with the chain C. The tension pulley 26 is configured to be engaged with the chain C. The structure of the movable member 14 is not limited to the above structure.

As seen in FIG. 2, the linkage 16 movably couples the base member 12 and the movable member 14. The linkage 16 movably couples the base member 12 and the coupling part 20. In the present embodiment, the linkage 16 includes an outer link 28 and an inner link 30. The outer link 28 is pivotally coupled to the base member 12 about a first pivot axis A1. The outer link 28 is pivotally coupled to the movable member 14 about a second pivot axis A2. The inner link 30 is pivotally coupled to the base member 12 about a third pivot axis A3. The inner link 30 is pivotally coupled to the movable member 14 about a fourth pivot axis A4. The first to fourth pivot axes A1 to A4 are parallel to each other. However, one of the outer link 28 and the inner link 30 can be omitted from the linkage 16 if needed and/or desired. The structure of the linkage 16 is not limited to the above structure. At least one of the first to fourth pivot axes A1 to A4 can be non-parallel to another of the first to fourth pivot axes A1 to A4.

Figure 4:
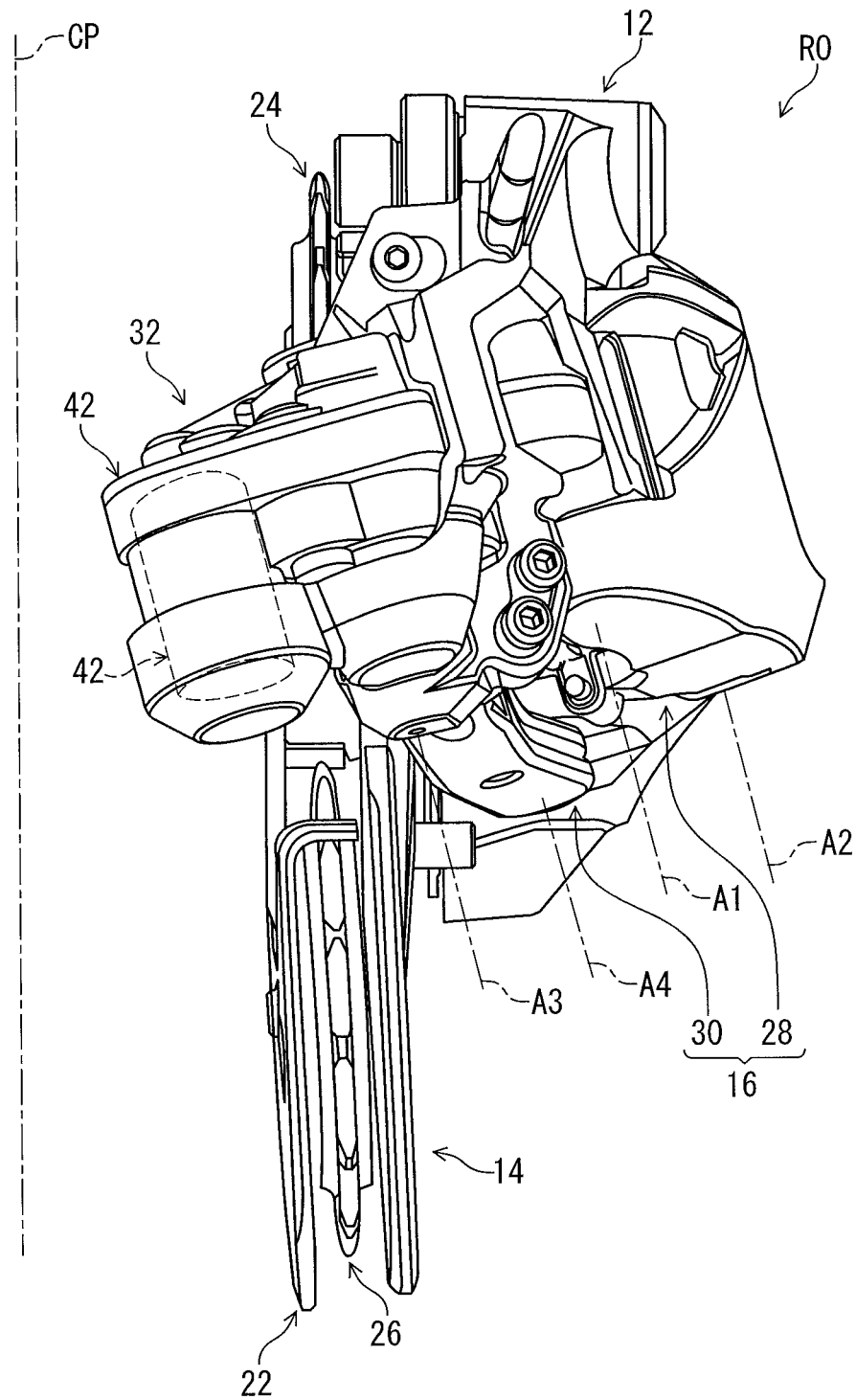
FIG. 4 is a rear view of the derailleur illustrated in FIG. 2.

As seen in FIG. 4, the inner link 30 is at least partially provided between the outer link 28 and a transverse center plane CP of the bicycle 2. The transverse center plane CP is defined to be perpendicular to a rotational axis RA (see e.g., FIG. 2) of the rear sprocket assembly RS (see e.g., FIG. 1).

The derailleur RD comprises a motor unit 32. The motor unit 32 is configured to move at least one of the movable member 14 and the linkage 16 relative to the base member 12. In the present embodiment, the motor unit 32 is coupled to the linkage 16 to move the movable member 14 via the linkage 16. The motor unit 32 is configured to generate an actuation force and coupled to the linkage 16 to transmit the actuation force to the linkage 16. However, the motor unit 32 can be directly coupled to the movable member 14 to move the movable member 14 relative to the base member 12 if needed and/or desired.

As seen in FIG. 2, the derailleur RD further comprises a power-supply attachment structure 34 to which an electric power source 36 is to be attached. The power-supply attachment structure 34 is configured to detachably hold the electric power source 36. The power-supply attachment structure 34 is electrically connected to the motor unit 32 to supply electricity from the electric power source 36 to the motor unit 32. Examples of the electric power source 36 include a battery such as a primary battery and a secondary battery. However, the power-supply attachment structure 34 can be omitted from the derailleur RD if needed and/or desired. In such embodiments, the derailleur RD can be configured to be electrically connected to another electric power source if needed and/or desired.

Figure 5:
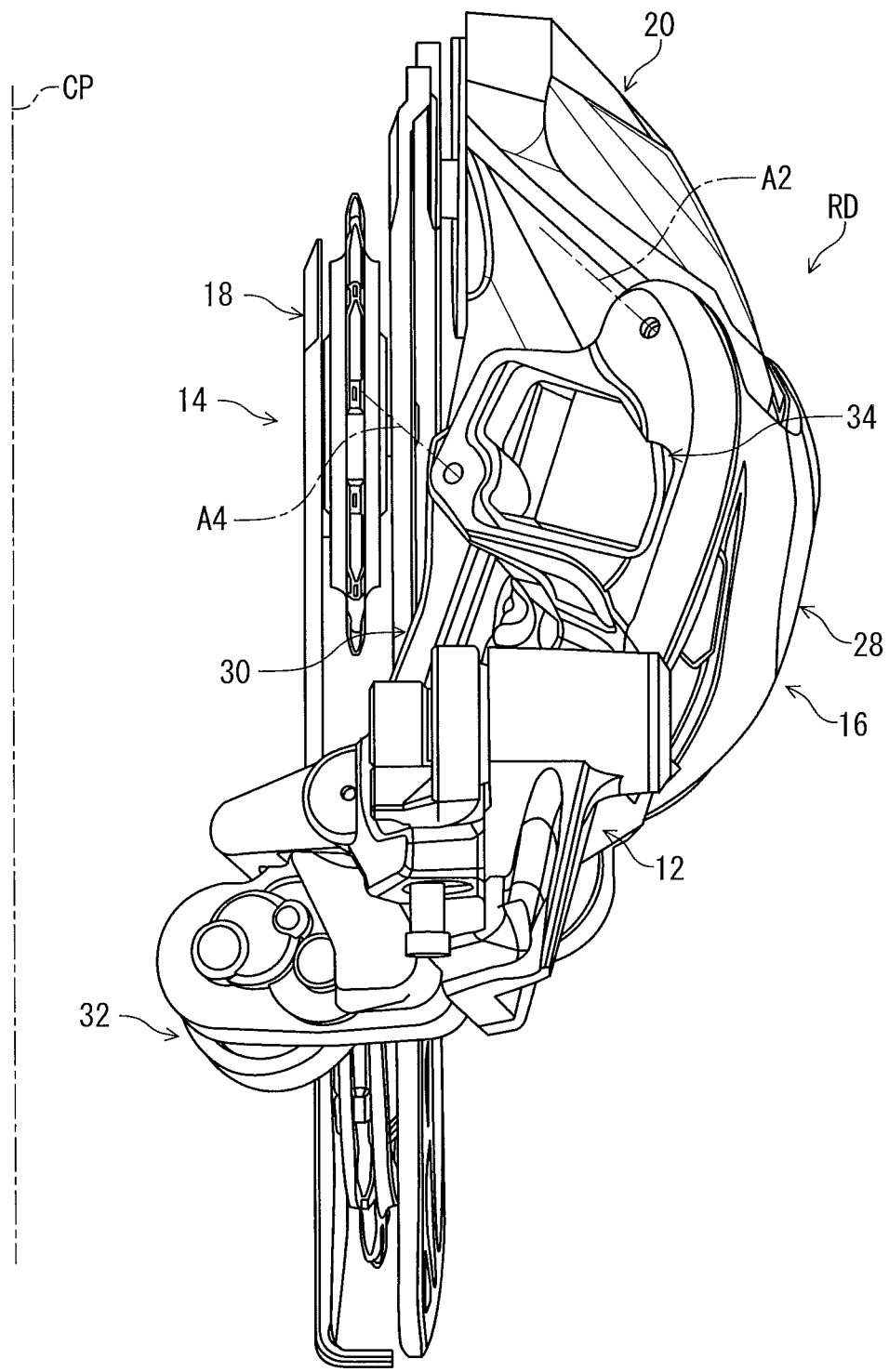
FIG. 5 is a top view of the derailleur illustrated in FIG. 2.

As seen in FIG. 5, the power-supply attachment structure 34 is provided at one of the base member 12, the movable member 14, and the linkage 16. The motor unit 32 is provided at one of the base member 12, the movable member 14, and the linkage 16. The power-supply attachment structure 34 is provided at another of the base member 12, the movable member 14, and the linkage 16. The motor unit 32 is provided at one of the base member 12 and the linkage 16. The power-supply attachment structure 34 is provided at the other of the base member 12 and the linkage 16.

In the present embodiment, the motor unit 32 is provided at the base member 12. The power-supply attachment structure 34 is provided at the linkage 16. The power-supply attachment structure 34 is provided at the outer link 28. However, the motor unit 32 can be provided at one of the movable member 14 and the linkage 16 if needed and/or desired. The motor unit 32 can be provided at one of the outer link 28 and the inner link 30 if needed and/or desired. The power-supply attachment structure 34 can be provided at one of the base member 12 and the movable member 14 if needed and/or desired. The power-supply attachment structure 34 can be provided at the inner link 30 if needed and/or desired. The power-supply attachment structure 34 can be omitted from the motor unit 32 if needed and/or desired.

Figure 6:
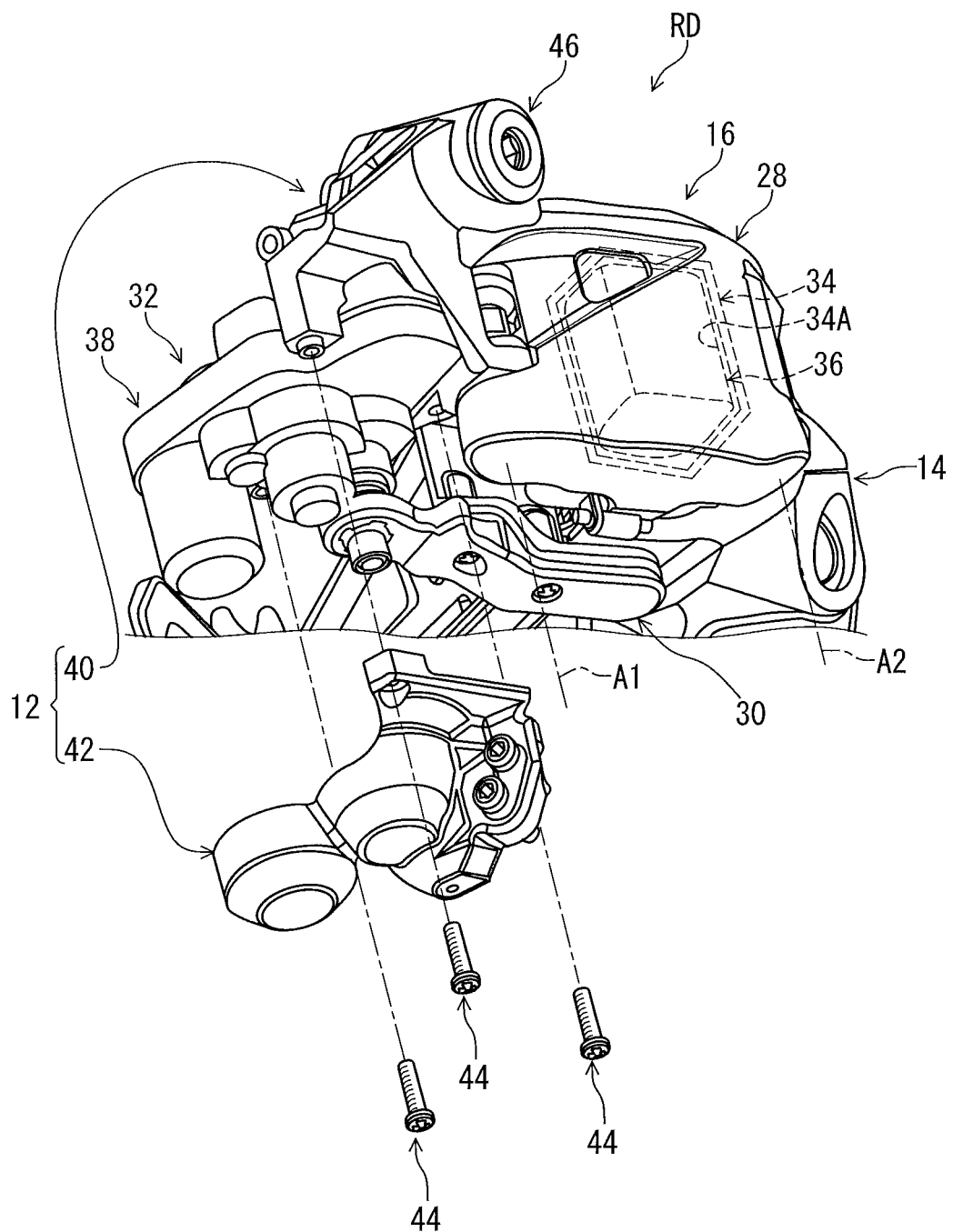
FIG. 6 is an exploded perspective view of the derailleur illustrated in FIG. 2.

As seen in FIG. 6, the power-supply attachment structure 34 includes a holder space 34A. The electric power source 36 is provided in the holder space 34A. The power-supply attachment structure 34 is configured to detachably hold the electric power source 36 in the holder space 34A. The structures of the outer link 28 and the power-supply attachment structure 34 are not limited to the illustrated embodiment.

The motor unit 32 includes a housing 38. In the present embodiment, the housing 38 is a separate member from the base member 12. However, the housing 38 can be at least partially provided integrally with the base member 12 as a one-piece unitary member.

The base member 12 includes a first base body 40, a second base body 42, and fasteners 44. The first base body 40 is configured to be coupled to the vehicle body 2A with a derailleur fastener 46. The second base body 42 is a separate member from the first base body 40. The second base body 42 is fastened to the first base body 40 with the fasteners 44 such as screws. The motor unit 32 is provided between the first base body 40 and the second base body 42. The housing 38 is held between the first base body 40 and the second base body 42.

Figure 7:
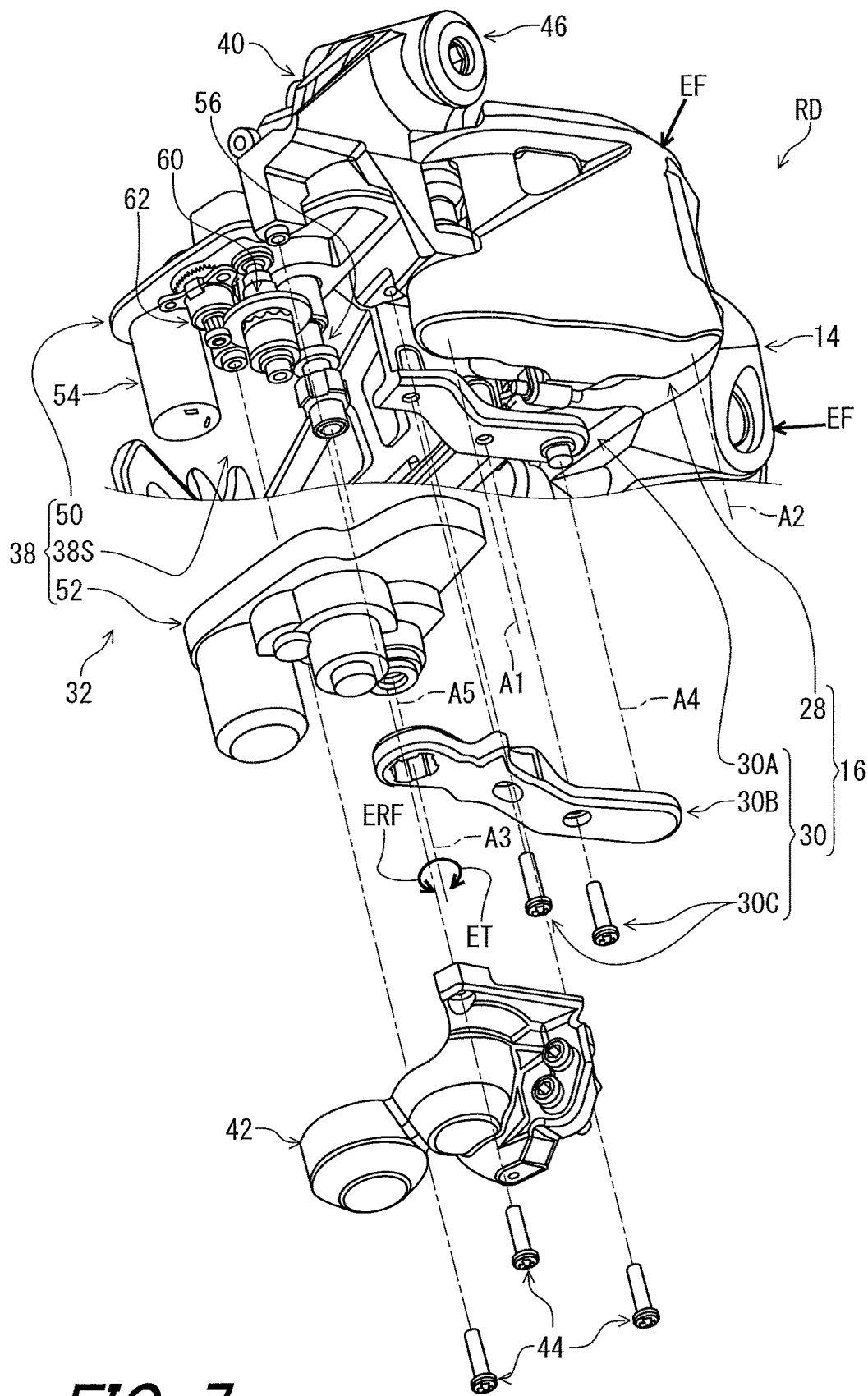
FIG. 7 is an exploded perspective view of the derailleur illustrated in FIG. 2.

As seen in FIG. 7, the housing 38 includes a first housing 50 and a second housing 52. The housing 38 includes an internal space 38S. The first housing 50 and the second housing 52 define the internal space 38S between the first housing 50 and the second housing 52. In the present embodiment, the second housing 52 is a separate member from the first housing 50. However, the second housing 52 can be integrally provided with the first housing 50 as a one-piece unitary member if needed and/or desired.

The motor unit 32 for the bicycle component RD comprises an electric motor 54. The electric motor 54 is configured to generate the actuation force using electricity supplied from the electric power source 36 via the power-supply attachment structure 34 (see e.g., FIG. 6). The electric motor 54 is electrically connected to the power-supply attachment structure 34. The electric motor 54 is provided in the internal space 38S of the housing 38. The electric motor 54 is provided between the first housing 50 and the second housing 52.

The motor unit 32 for the bicycle component RD comprises an output member 56. The electric motor 54 is coupled to the output member 56 to rotate the output member 56 relative to the housing 38 about an output rotational axis A5. The output member 56 extends along the output rotational axis A5. In the present embodiment, the output rotational axis A5 is coincident with the third pivot axis A3. The output member 56 is rotatable relative to the housing 38 about the third pivot axis A3. The inner link 30 is rotatable relative to the base member 12 about the output rotational axis A5. However, the output rotational axis A5 can be offset from the third pivot axis A3 if needed and/or desired.

The inner link 30 is coupled to the output member 56 to receive, from the output member 56, the actuation force transmitted from the electric motor 54 to the output member 56. The inner link 30 is coupled to the output member 56 to rotate along with the output member 56 relative to the housing 38 and the base member 12 about the third pivot axis A3. The inner link 30 includes an inner link body 30A, an inner link lever 30B, and fasteners 30C. The inner link body 30A is pivotally coupled to the base member 12 about the third pivot axis A3. The inner link body 30A is pivotally coupled to the movable member 14 about the fourth pivot axis A4. The inner link lever 30B is fastened to the inner link body 30A with the fasteners 30C. The inner link lever 30B is coupled to the output member 56 to receive, from the output member 56, the actuation force transmitted from the electric motor 54. The inner link lever 30B is coupled to the output member 56 to rotate along with the output member 56 relative to the housing 38 and the base member 12 about the third pivot axis A3.

An external force EF is applied to at least one of the movable member 14 and the linkage 16 in response to a physical contact between an obstacle and the at least one of the movable member 14 and the linkage 16. Thus, an external rotational force ERF having external torque ET is applied to the output member 56 via the linkage 16 in response to the external force EF. It is preferable to restrict the external torque ET from being transmitted from at least one of the movable member 14 and the linkage 16 to the electric motor 54.

Figure 8:
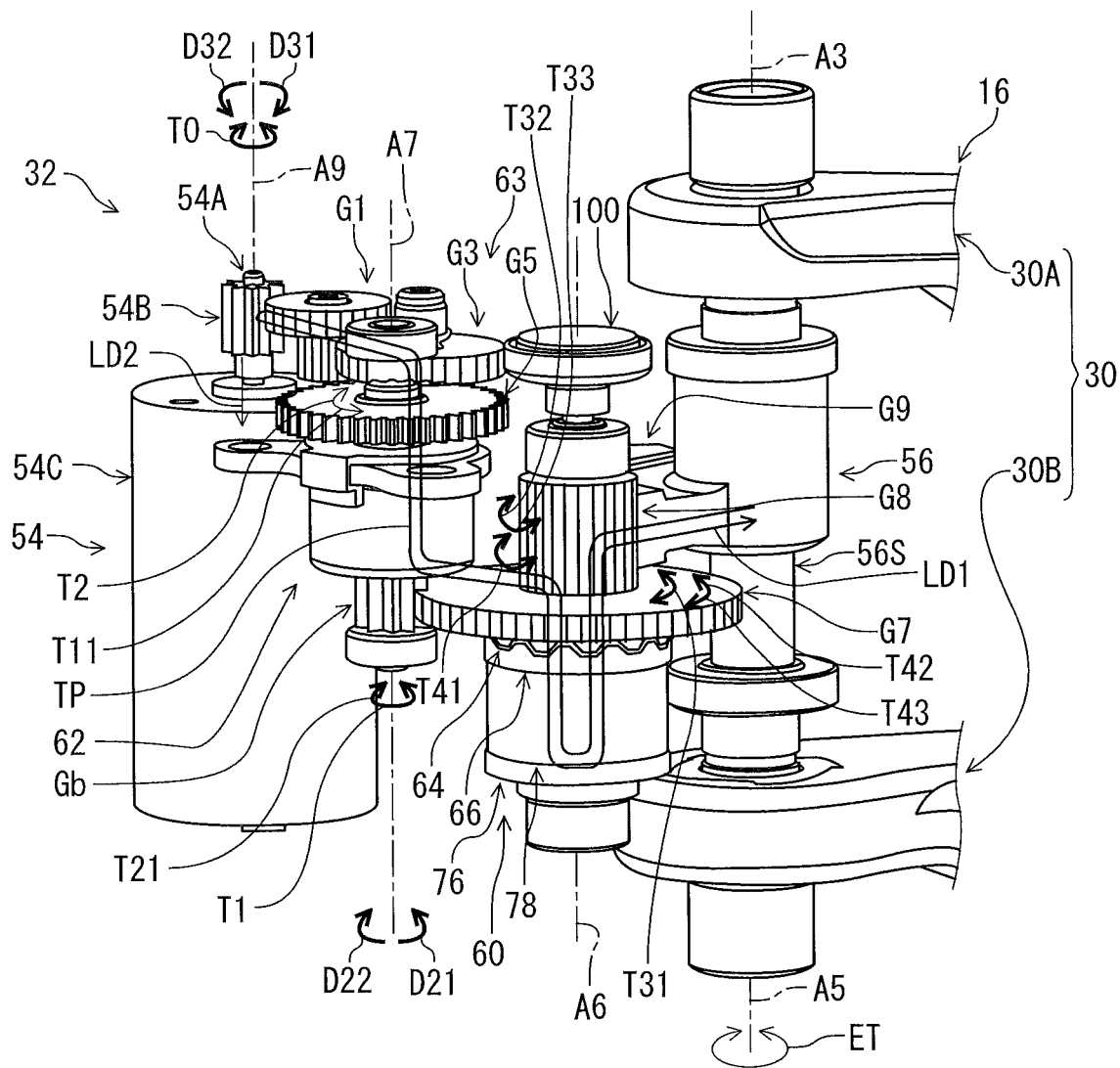
FIG. 8 is a perspective view of an internal structure of a motor unit of the derailleur illustrated in FIG. 2.

As seen in FIG. 8, the motor unit 32 for the bicycle component RD comprises a torque limiter 60 and a transmitting structure 62. The torque limiter 60 is configured to protect the electric motor 54 from damage caused by the external force EF while allowing a necessary force to be transmitted from the electric motor 54 to at least one of the movable member 14 and the linkage 16. The transmitting structure 62 is configured to protect the electric motor 54 from damage caused by the external force EF while allowing the actuation force generated by the electric motor 54 to be transmitted to at least one of the movable member 14 and the linkage 16. The torque limiter 60 has a structure different from a structure of the transmitting structure 62.

The torque limiter 60 and the transmitting structure 62 are provided between the electric motor 54 and the output member 56 on a power transmission path TP provided from the electric motor 54 to the output member 56. The transmitting structure 62 is provided between the electric motor 54 and the torque limiter 60 on the power transmission path TP provided from the electric motor 54 to the output member 56. The torque limiter 60 is provided between the transmitting structure 62 and the output member 56 on the power transmission path TP. The power transmission path TP is defined from the electric motor 54 to the output member 56 through the transmitting structure 62 and the torque limiter 60.

The torque limiter 60 and the transmitting structure 62 are configured to transmit the actuation force generated by the electric motor 54 to at least one of the movable member 14 and the linkage 16. The torque limiter 60 is configured to restricting a force from being transmitted from one of the movable member 14 and the linkage 16 to the transmitting structure 62. The transmitting structure 62 is configured to restricting a force from being transmitted from the torque limiter 60 to the electric motor 54.

The motor unit 32 further comprises a speed reducer 63. The speed reducer 63 couples the electric motor 54 and the output member 56 to transmit output torque TO of the electric motor 54 to the output member 56. In the present embodiment, the speed reducer 63 includes the torque limiter 60 and the transmitting structure 62. However, one of the torque limiter 60 and the transmitting structure 62 can be omitted from the speed reducer 63 if needed and/or desired. The speed reducer 63 can include structures other than the torque limiter 60 and the transmitting structure 62 in additional to the torque limiter 60 and the transmitting structure 62 if needed and/or desired.

The electric motor 54 includes an output shaft 54A. The electric motor 54 includes a motor gear 54B and a motor housing 54C. The motor gear 54B is fastened to the output shaft 54A. The electric motor 54 is configured to rotate the output shaft 54A relative to the motor housing 54C about a motor rotational axis A9. The electric motor 54 is configured to generate the output torque TO.

Figure 9:
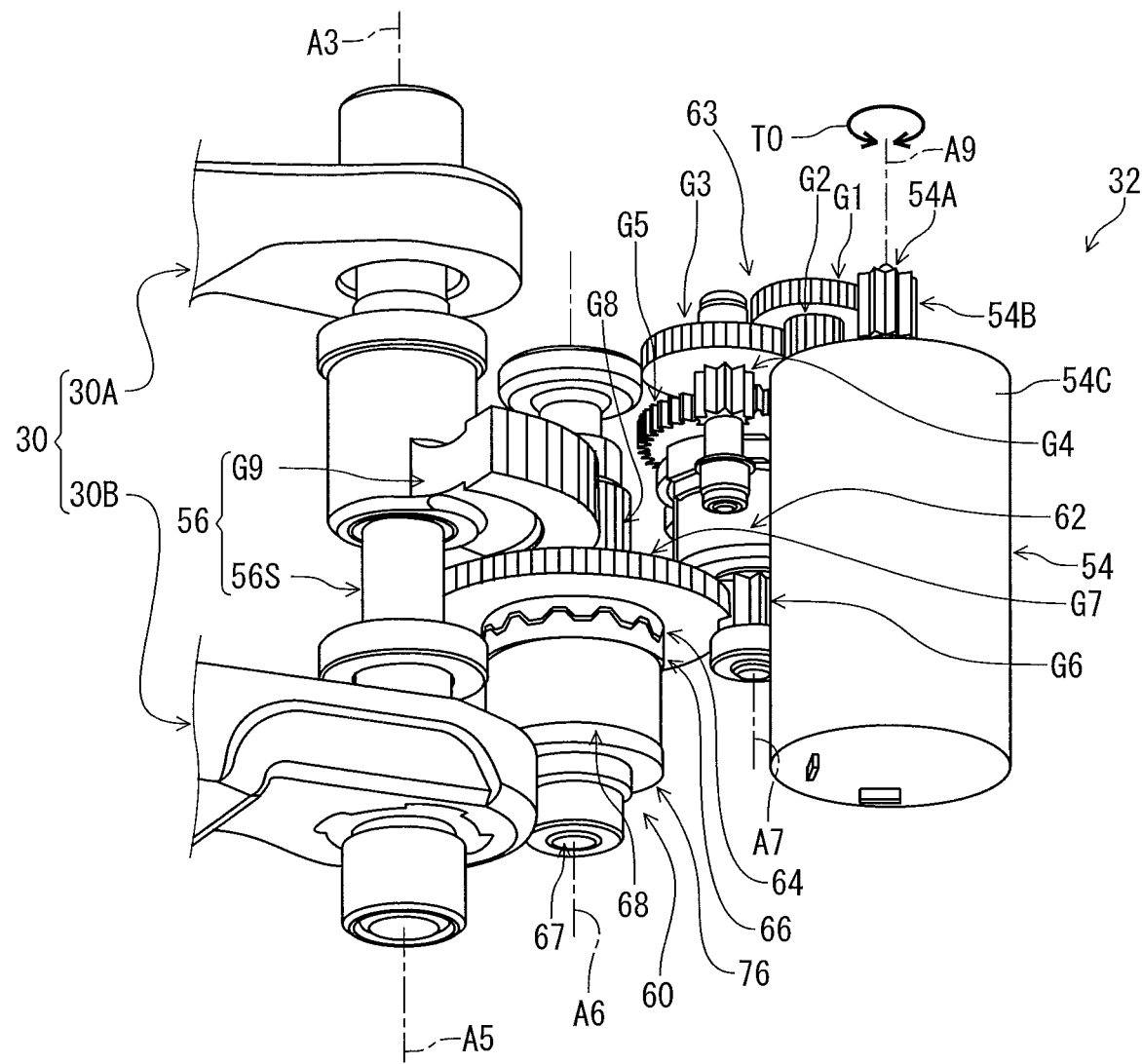
FIG. 9 is a perspective view of the internal structure of the motor unit of the derailleur illustrated in FIG. 2.

As seen in FIG. 9, the electric motor 54 is coupled to the transmitting structure 62. The electric motor 54 is coupled to the transmitting structure 62 via at least one gear. The speed reducer 63 includes gears G1, G2, G3, G4, and G5. Namely, the motor unit 32 includes the gears G1 to G5. The electric motor 54 is coupled to the transmitting structure 62 via the gears G1 to G5. The gear G1 meshes with the motor gear 54B of the electric motor 54. The gear G2 is rotatable along with the gear G1 relative to the housing 38 (see e.g., FIG. 16). The gear G2 meshes with the gear G3. The gear G4 is rotatable along with the gear G3 relative to the housing 38 (see e.g., FIG. 16). The gear G4 meshes with the gear G5. The transmitting structure 62 is coupled to the gear G5 to receive the actuation force generate by the electric motor 54 via the gears G1 to G5.

The transmitting structure 62 is coupled to the torque limiter 60. The transmitting structure 62 is coupled to the torque limiter 60 via at least one gear. The speed reducer 63 includes gears G6 and G7. Namely, the motor unit 32 further comprises the gear G7. The transmitting structure 62 is coupled to the torque limiter 60 via the gears G6 and G7. The gear G6 is coupled to the transmitting structure 62 to receive a rotational force from the transmitting structure 62.

The gear G7 meshes with the gear G6. The gear G7 is coupled to the torque limiter 60 to transmit a rotational force between the torque limiter 60 and the gear G7.

As seen in FIG. 8, the transmitting structure 62 is configured to transmit a first torque T1 in a first load direction LD1 defined from the electric motor 54 to the output member 56. The transmitting structure 62 is configured to transmit the first torque T1 in the first load direction LD1 defined from the output shaft 54A to the output member 56. The transmitting structure 62 is configured to transmit the first torque T1 to the torque limiter 60 in a state where first input torque T11 is applied to the transmitting structure 62 from a device other than the torque limiter 60.

The transmitting structure 62 is configured to receive the first input torque T11 from the electric motor 54 via the gear G5 in the first load direction LD1. The transmitting structure 62 is configured to transmit the first torque T1 to the gear G6 in the first load direction LD1. The first torque T1 can also be referred to as first output torque T1. In the present embodiment, the first torque T1 is equal to the first input torque T11. However, the first torque T1 can be different from the first input torque T11 if needed and/or desired.

The transmitting structure 62 is configured to transmit a second torque T2 in a second load direction LD2 defined from the output member 56 to the electric motor 54. The transmitting structure 62 is configured to transmit the second torque T2 in the second load direction LD2 defined from the output member 56 to the output shaft 54A. The transmitting structure 62 is configured to transmit the second torque T2 in a state where second input torque T21 is applied from the torque limiter 60 to the transmitting structure 62.

The transmitting structure 62 is configured to receive the second input torque T21 from the torque limiter 60 via the gear G6 in the second load direction LD2. The transmitting structure 62 is configured to transmit the second torque T2 to the gear G5 in the second load direction LD2. The second torque T2 can also be referred to as second output torque T2.

In the present embodiment, the second torque T2 is lower than the second input torque T12. The second torque T2 can include zero. The second torque T2 can be zero. The transmitting structure 62 is configured to reduce the second input torque T21 to the second torque T2 in the second load direction LD2. The transmitting structure 62 is configured to restrict the second input torque T21 from being transmitted to the gear G5 via the transmitting structure 62 in the second load direction LD2. The transmitting structure 62 is configured to restrict a torque from being transmitted to the gear G5 in the second load direction LD2. Thus, the transmitting structure 62 is configured not to transmit, to the electric motor 54, the torque transmitted to the transmitting structure 62 in the second load direction LD2. However, the second torque T2 can be higher than zero if needed and/or desired.

The first torque T1 is higher than the second torque T2. In other words, the second torque T2 transmitted via the transmitting structure 62 in the second load direction LD2 is lower than the first torque T1 transmitted via the transmitting structure 62 in the first load direction LD1. However, the first torque T1 can be equal to or lower than the second torque T2 if needed and/or desired.

As seen in FIG. 8, the speed reducer 63 includes a gear G8. The gear G8 is coupled to the torque limiter 60. The output member 56 includes a shaft 56S and an output gear G9. The shaft 56S extends along the output rotational axis A5. The output gear G9 is coupled to the shaft 56S to rotate along with the shaft 56S about the output rotational axis A5. The gear G8 meshes with the output gear G9.

The torque limiter 60 is configured to receive third input torque T31 from the gear G7 in the first load direction LD1. The torque limiter 60 is configured to transmit third output torque T32 or limited output torque T33 to the gear G8 in the first load direction LD1.

The torque limiter 60 is configured to transmit the third output torque T32 which is equal to the third input torque T31 to the gear G8 in the first load direction LD1 in a state where the third input torque T31 is lower than a torque threshold. The torque limiter 60 is configured to transmit the limited output torque T33 which is lower than the third input torque T31 to the gear G8 in the first load direction LD1 in a state where the third input torque T31 is equal to or higher than the torque threshold. The torque limiter 60 is configured to reduce the third input torque T31 to the limited output torque T33 in the state where the third input torque T31 is equal to or higher than the torque threshold.

In the present embodiment, the limited output torque T33 is lower than the torque threshold. The limited output torque T33 can include zero. The limited output torque T33 can be zero or approximately zero. However, the limited output torque T33 can be higher than zero if needed and/or desired.

The torque limiter 60 is configured to receive the third input torque T31 from the electric motor 54 via the transmitting structure 62 and the gears G1 to G7. The torque threshold is higher than a possible maximum value of the third input torque T31. Thus, the torque limiter 60 is configured to transmit the output torque T33 to the gear G8 when the torque limiter 60 receives the third input torque T31 from the electric motor 54 via the transmitting structure 62 and the gears G1 to G7.

As seen in FIG. 8, the torque limiter 60 is configured to receive fourth input torque T41 from the gear G8 in the second load direction LD2. The torque limiter 60 is configured to transmit fourth output torque T42 or limited output torque T43 to the gear G7 in the second load direction LD2.

The torque limiter 60 is configured to transmit fourth output torque T42 which is equal to the fourth input torque T41 to the gear G7 in the second load direction LD2 in a state where the fourth input torque T41 is lower than the torque threshold. The torque limiter 60 is configured to transmit the limited output torque T43 which is lower than the fourth input torque T41 to the gear G7 in the second load direction LD2 in a state where the fourth input torque T41 is equal to or higher than the torque threshold. The torque limiter 60 is configured to reduce the fourth input torque T41 to the limited output torque T43 in the state where the fourth input torque T41 is equal to or higher than the torque threshold.

In the present embodiment, the limited output torque T43 is lower than the fourth output torque T42 and the torque threshold. The limited output torque T43 can include zero. The limited output torque T43 can be zero or approximately zero. The fourth output torque T42 can also be referred to as third torque T42. The limited output torque T43 can also be referred to as fourth torque T43. The third torque T42 is higher than the fourth torque T43. In other words, the fourth torque T43 is lower than the third torque T42. However, the limited output torque T43 can be higher than zero if needed and/or desired.

The fourth input torque T41 is applied to the torque limiter 60 from the output member 56 when the external torque ET is applied to the output member 56 from at least one of the movable member 14 and the linkage 16.

The torque limiter 60 is configured to transmit the third torque T42 in a state where the torque which is input to the torque limiter 60 is lower than the torque threshold. The torque limiter 60 is configured to transmit the third torque T42 in the second load direction LD2 in the state where the fourth input torque T41 is lower than the torque threshold. The torque limiter 60 is configured to transmit the fourth torque T43 in a state where the torque which is input to the torque limiter 60 is equal to or higher than the torque threshold. The torque limiter 60 is configured to transmit the fourth torque T43 in the second load direction LD2 in the state where the fourth input torque T41 is equal to or higher than the torque threshold. In other words, the torque limiter 60 is configured to transmit the third torque T42 in the second load direction LD2 in a state where the external torque ET is lower than an external torque threshold. The torque limiter 60 is configured to transmit the fourth torque T43 in the second load direction LD2 in a state where the external torque ET is equal to or higher than the external torque threshold. The external torque threshold is a standard for determining the external torque ET applied to the output member 56 while the torque threshold is a standard for determining the fourth input torque T41 applied to the torque limiter 60.

As seen in FIG. 8, the torque limiter 60 includes a first member 64 and a second member 66. The first member 64 and the second member 66 are movable relative to each other in a state where a torque applied to the torque limiter 60 is equal to or higher than the torque threshold. The first member 64 and the second member 66 are movable together with each other in a state where the torque is lower than the torque threshold. The first member 64 and the second member 66 contact each other to transmit the third torque T42 between the first member 64 and the second member 66 in the state where the torque is lower than the torque threshold. The first member 64 and the second member 66 are configured to transmit the fourth torque T43 between the first member 64 and the second member 66 in the state where the torque is equal to or higher than the torque threshold.

The first member 64 and the second member 66 slidably contacts with each other to transmit the third torque T42 between the first member 64 and the second member 66 in a state where the torque is lower than the torque threshold. The first member 64 and the second member 66 are movable relative to each other in a state where the third input torque T31 applied to the first member 64 is equal to or higher than the torque threshold. The first member 64 is movable relative to the second member 66 in the state where the third input torque T31 applied to the first member 64 is equal to or higher than the torque threshold. The first member 64 and the second member 66 are movable together with each other in a state where the third input torque T31 is lower than the torque threshold.

The first member 64 and the second member 66 are movable relative to each other in a state where the fourth input torque T41 applied to the torque limiter 60 is equal to or higher than the torque threshold. The second member 66 is movable relative to the first member 64 in the state where the fourth input torque T41 applied to the second member 66 is equal to or higher than the torque threshold. The first member 64 and the second member 66 are movable together with each other in a state where the fourth input torque T41 is lower than the torque threshold.

The gear G7 is fastened to the first member 64 to transmit the torque from the transmitting structure 62 to the first member 64. In the present embodiment, the gear G7 is integrally provided with the first member 64 as a one-piece unitary member. However, the gear G7 can be a separate member from the first member 64 if needed and/or desired.

The second member 66 is configured to transmit the third torque T42 to the first member 64 in the second load direction LD2 defined from the output member 56 to the electric motor 54 in a state where the external torque ET which is input to the output member 56 is lower than the external torque threshold. The second member 66 is configured to transmit the fourth torque T43 to the first member 64 in the second load direction LD2 in a state where the external torque ET is equal to or larger than the external torque threshold.

The first member 64 slidably contacts the second member 66 to transmit the third torque T42 between the first member 64 and the second member 66 in the state where the external torque ET which is input to the output member 56 is lower than the external torque threshold. The first member 64 slidably contacts the second member 66 to transmit the fourth torque T43 between the first member 64 and the second member 66 in the state where the external torque ET is equal to or higher than the external torque threshold.

The torque limiter 60 has a limiter rotational axis A6. The first member 64 is rotatable relative to the housing 38 (see e.g., FIG. 7) about the limiter rotational axis A6. The second member 66 is rotatable relative to the housing 38 (see e.g., FIG. 7) about the limiter rotational axis A6. The first member 64 and the second member 66 are rotatable relative to each other about the limiter rotational axis A6 in the state where the torque applied to the torque limiter 60 is equal to or higher than the torque threshold. The first member 64 and the second member 66 are rotatable together with each other about the limiter rotational axis A6 in the state where the torque applied to the torque limiter 60 is lower than the torque threshold.

Figure 10:
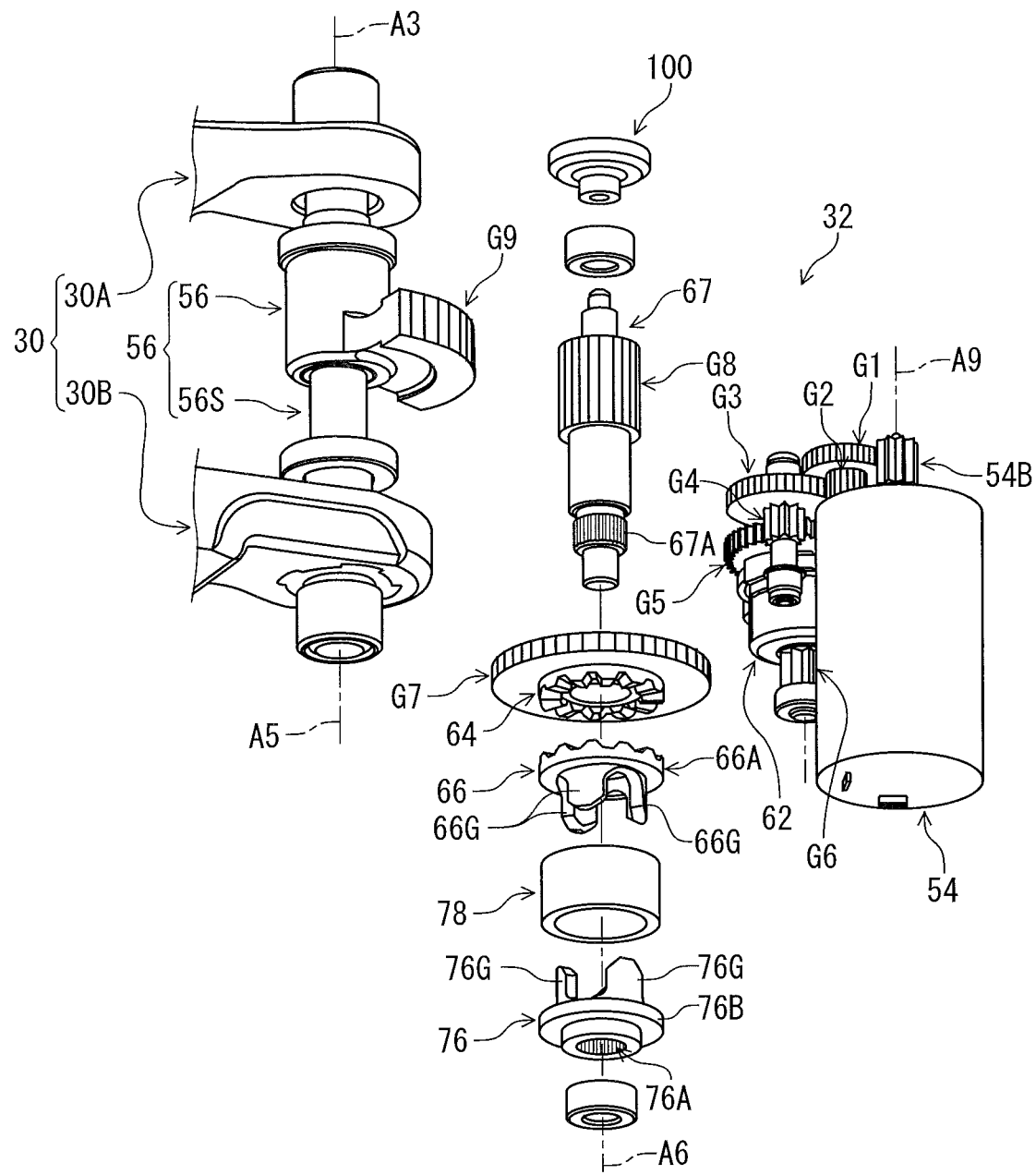
FIG. 10 is an exploded perspective view of the internal structure of the motor unit of the derailleur illustrated in FIG. 2.

As seen in FIG. 10, the torque limiter 60 includes a support shaft 67. The support shaft 67 extends along the limiter rotational axis A6. The support shaft 67 is rotatably supported by the housing 38 (see e.g., FIG. 7). The first member 64 is rotatable relative to the support shaft 67 about the limiter rotational axis A6. The second member 66 is coupled to the support shaft 67 to rotate along with the support shaft 67 about the limiter rotational axis A6. The support shaft 67 movably supports the second member 66. The second member 66 is movable relative to the support shaft 67 along the limiter rotational axis A6.

The gear G8 is coupled to the support shaft 67. In the present embodiment, the gear G8 is integrally provided with the support shaft 67 as a one-piece unitary member. However, the gear G8 can be a separate member from the support shaft 67 if needed and/or desired.

The gear G8 meshes with the output gear G9 of the output member 56. Thus, the output member 56 is rotated about the output rotational axis A5 in response to rotation of the second member 66 and the support shaft 67 about the limiter rotational axis A6. The second member 66 and the support shaft 67 are rotated about the limiter rotational axis A6 in response to rotation of the output member 56 about the output rotational axis A5.

As seen in FIG. 10, the torque limiter 60 includes a guide member 76. The guide member 76 is coupled to the support shaft 67 to guide the second member 66 along the limiter rotational axis A6. The guide member 76 is coupled to the support shaft 67 to rotate along with the support shaft 67 about the limiter rotational axis A6. The guide member 76 is fastened to the support shaft 67.

The support shaft 67 includes a splined part 67A. The guide member 76 includes a splined hole 76A. The splined part 67A of the support shaft 67 meshes with the splined hole 76A of the guide member 76. The splined part 67A is fastened to the splined hole 76A with a fastening structure such as press-fitting and an adhesive agent. Thus, the guide member 76 is fastened to the support shaft 67 via the splined part 67A and the splined hole 76A. The guide member 76 is coupled to the support shaft 67 to rotate along with the support shaft 67 about the limiter rotational axis A6.

The guide member 76 includes a guide base 76B and at least one first guide part 76G. The guide base 76B includes the splined hole 76A. The guide base 76B has an annular shape. In the present embodiment, the guide member 76 includes at least two first guide part 76G. The first guide part 76G extends from the guide base 76B along the limiter rotational axis A6. The at least two first guide parts 76G are circumferentially spaced apart from each other about the limiter rotational axis A6.

The second member 66 includes a base part 66A and a second guide part 66G. The base part 66A has an annular shape. In the present embodiment, the second member 66 includes at least two second guide parts 66G. The second guide part 66G extends from the base part 66A along the limiter rotational axis A6. The at least two second guide parts 66G are circumferentially spaced apart from each other about the limiter rotational axis A6.

In the present embodiment, a total number of the first guide parts 76G is three. A total number of the second guide parts 66G is three. However, the total number of the first guide parts 76G is not limited to three. The total number of the second guide parts 66G is not limited to three.

Figure 11:
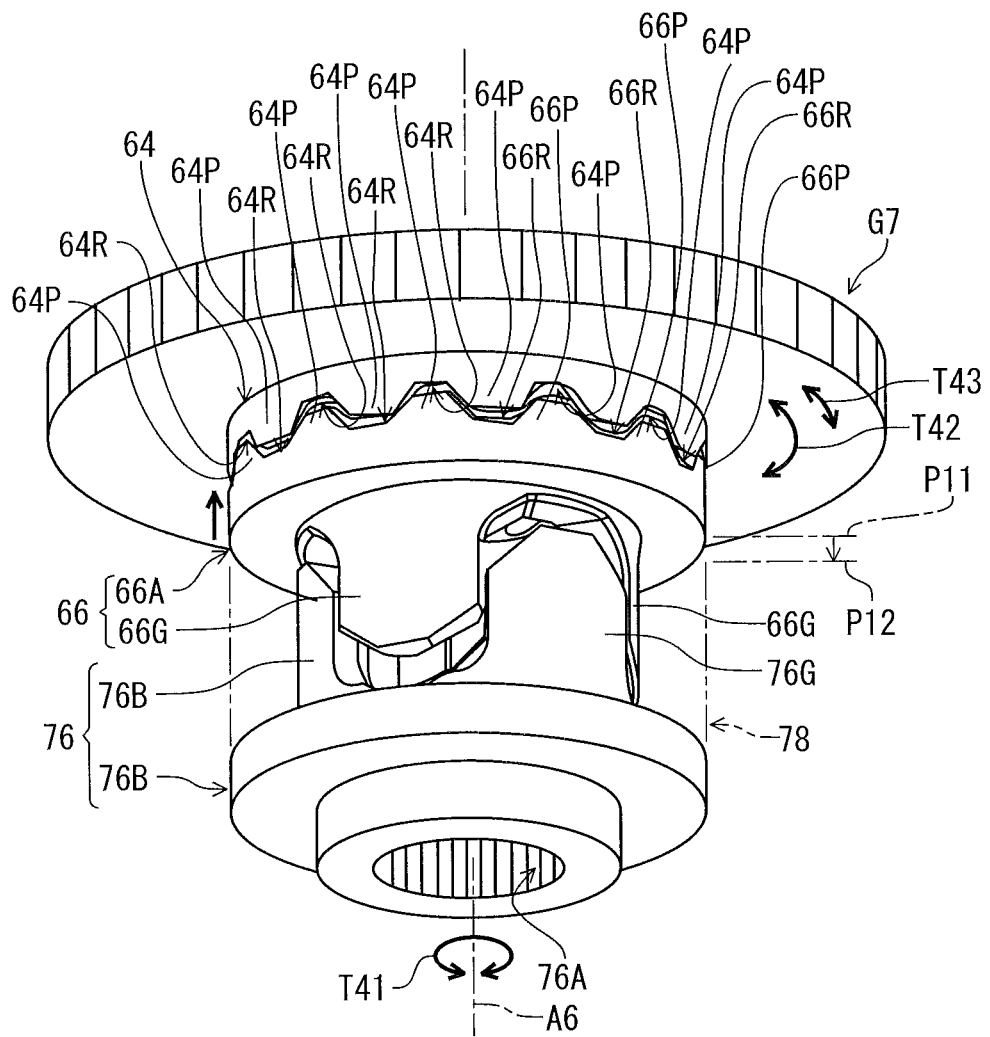
FIG. 11 is a perspective view of a torque limiter of the motor unit of the derailleur illustrated in FIG. 2.

As seen in FIG. 11, the at least two second guide parts 66G are engaged with the at least two first guide parts 76G. The second guide part 66G is circumferentially provided between adjacent two guide parts of the at least two first guide parts 76G. The first guide part 76G is circumferentially provided between adjacent two guide parts of the at least two second guide parts 66G. Thus, the second member 66 is movable relative to the support shaft 67 and the guide member 76 along the limiter rotational axis A6 without rotating relative to the support shaft 67.

The torque limiter 60 includes a biasing member 78. The biasing member 78 is configured to bias at least one of the first member 64 and the second member 66 to maintain a contact state between the first member 64 and the second member 66. The biasing member 78 is configured to bias at least one of the first member 64 and the second member 66 to maintain a slidable contact state between the first member 64 and the second member 66. The biasing member 78 is provided between the second member 66 and the guide member 76. The biasing member 78 is provided between the base part 66A and the guide base 76B. The first guide parts 76G and the second guide parts 66G are provided in the biasing member 78.

Figure 12:
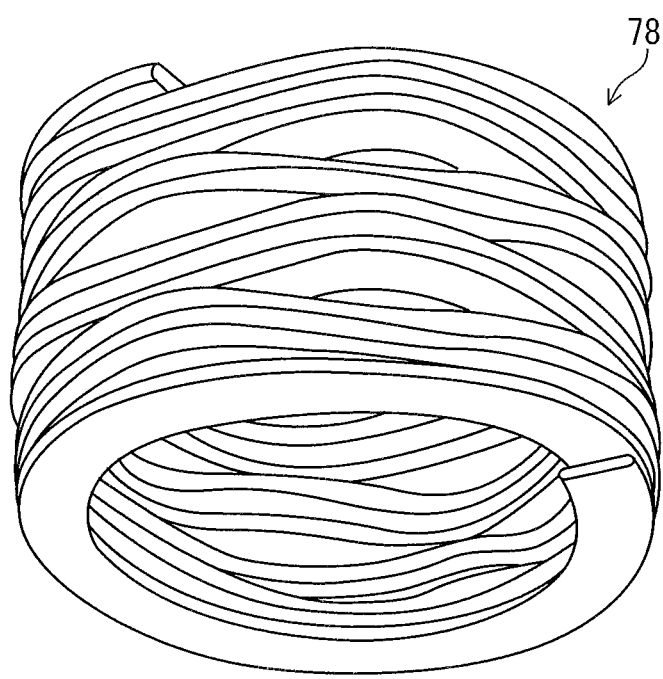
FIG. 12 is a perspective view of a biasing member of the torque limiter of the motor unit illustrated in FIG. 8.

As seen in FIG. 12, in the present embodiment, the biasing member 78 includes a coiled wave spring. However, the biasing member 78 can include other members such as a disc spring, a coiled spring, and an elastic member (e.g., rubber) instead of or in addition to the coiled wave spring if needed and/or desired. In FIGS. 8 to 11, the biasing member 78 is depicted in a simplified manner.

As seen in FIG. 11, the biasing member 78 is configured to bias the second member 66 toward the first member 64 to maintain the contact state between the first member 64 and the second member 66. The biasing member 78 is configured to bias the second member 66 toward the first member 64 to maintain the slidable contact state between the first member 64 and the second member 66.

However, the biasing member 78 can be configured to bias the first member 64 toward the second member 66 to maintain the contact state between the first member 64 and the second member 66 if needed and/or desired. The biasing member 78 can be configured to bias the first member 64 and the second member 66 toward each other to maintain the contact state between the first member 64 and the second member 66 if needed and/or desired. The biasing member 78 can be configured to bias the first member 64 toward the second member 66 to maintain the slidable contact state between the first member 64 and the second member 66 if needed and/or desired. The biasing member 78 can be configured to bias the first member 64 and the second member 66 toward each other to maintain the slidable contact state between the first member 64 and the second member 66 if needed and/or desired.

Figure 13:
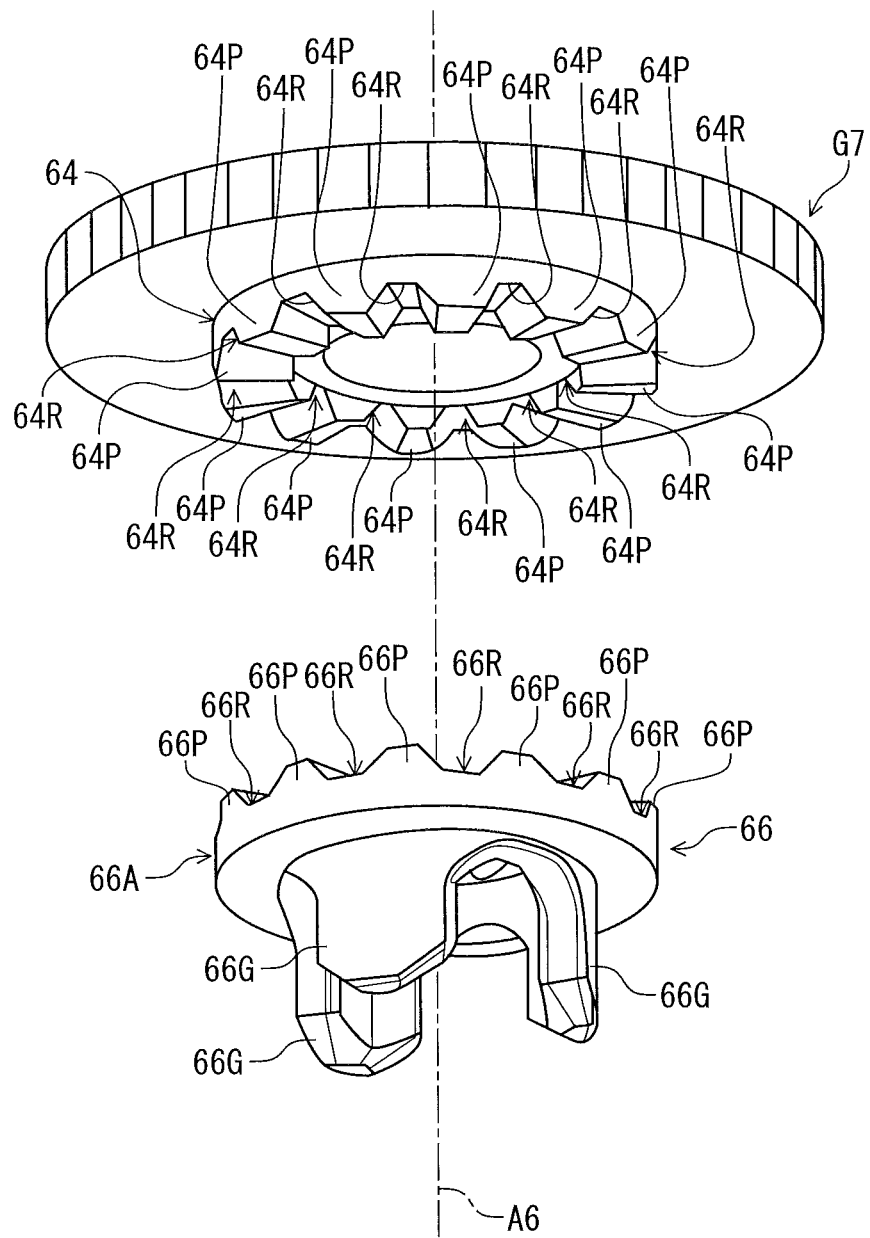
FIG. 13 is an exploded perspective view of a first member and a second member of the torque limiter of the motor unit illustrated in FIG. 8.
Figure 14:
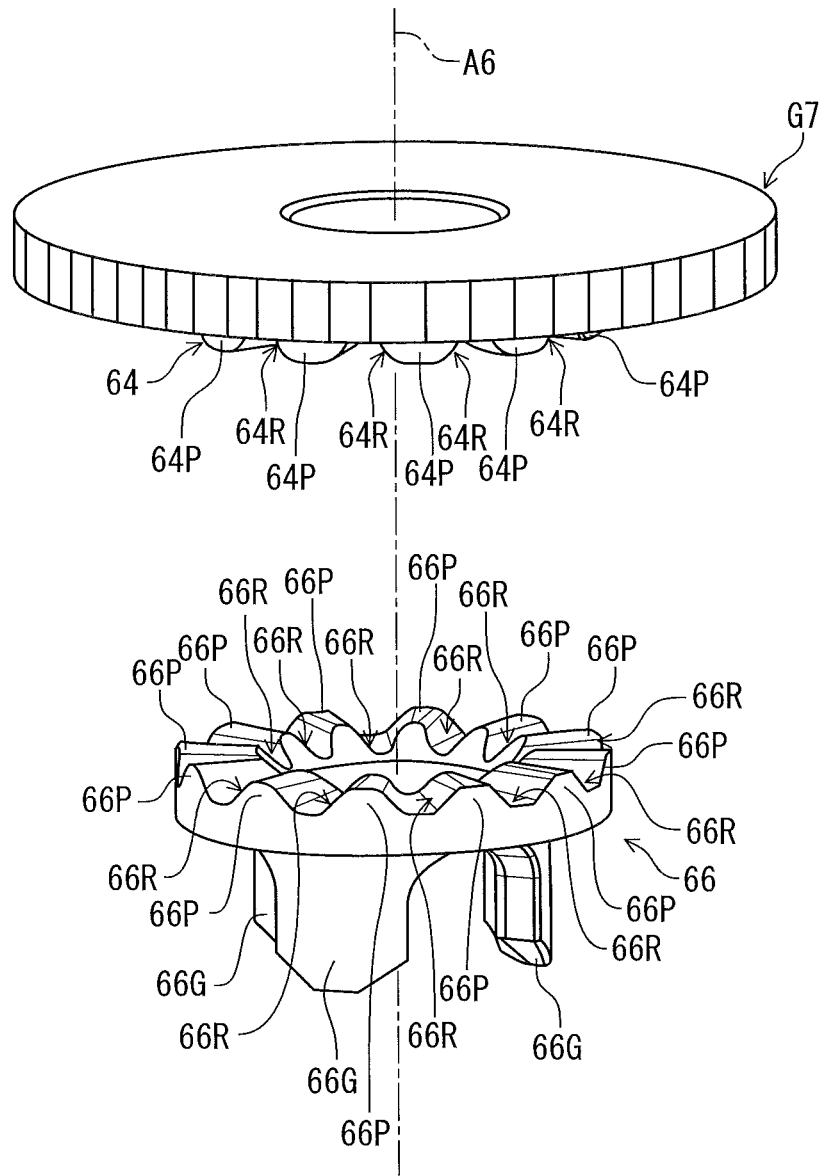
FIG. 14 is an exploded perspective view of the first member and the second member of the torque limiter of the motor unit illustrated in FIG. 8.

As seen in FIGS. 13 and 14, one of the first member 64 and the second member 66 includes a recess. The other of the first member 64 and the second member 66 includes a protruding part. In the present embodiment, the first member 64 includes a recess 64R. The second member 66 includes a recess 66R. The base part 66A of the second member 66 includes the recess 66R. The first member 64 includes a protruding part 64P. The second member 66 includes a protruding part 66P. The base part 66A of the second member 66 includes the protruding part 66P.

More specifically, the first member 64 includes at least two recesses 64R. The second member 66 includes at least two recesses 66R. The base part 66A of the second member 66 includes the at least two recesses 66R. The first member 64 includes at least two protruding parts 64P. The second member 66 includes at least two protruding parts 66P. The base part 66A of the second member 66 includes the at least two protruding parts 66P. The recess 64R is provided between adjacent two protruding parts of the at least two protruding parts 64P. The recess 66R is provided between adjacent two protruding parts of the at least two protruding parts 66P. However, only one of the first member 64 and the second member 66 can include a recess if needed and/or desired. Only the other of the first member 64 and the second member 66 can include a protruding part if needed and/or desired.

As seen in FIG. 11, the protruding part 64P is configured to be engaged in the recess 66R to transmit the third torque T42 between the first member 64 and the second member 66 in the state where the torque (e.g., the fourth input torque T41) is lower than the torque threshold. The protruding part 64P is configured to be disengaged from the recess 66R to transmit the fourth torque T43 between the first member 64 and the second member 66 in the state where the torque (e.g., the fourth input torque T41) is equal to or higher than the torque threshold.

The protruding part 66P is configured to be engaged in the recess 64R to transmit the third torque T42 between the first member 64 and the second member 66 in the state where the torque (e.g., the fourth input torque T41) is lower than the torque threshold. The protruding part 66P is configured to be disengaged from the recess 64R to transmit the fourth torque T43 between the first member 64 and the second member 66 in the state where the torque (e.g., the fourth input torque T41) is equal to or higher than the torque threshold.

Figure 15:
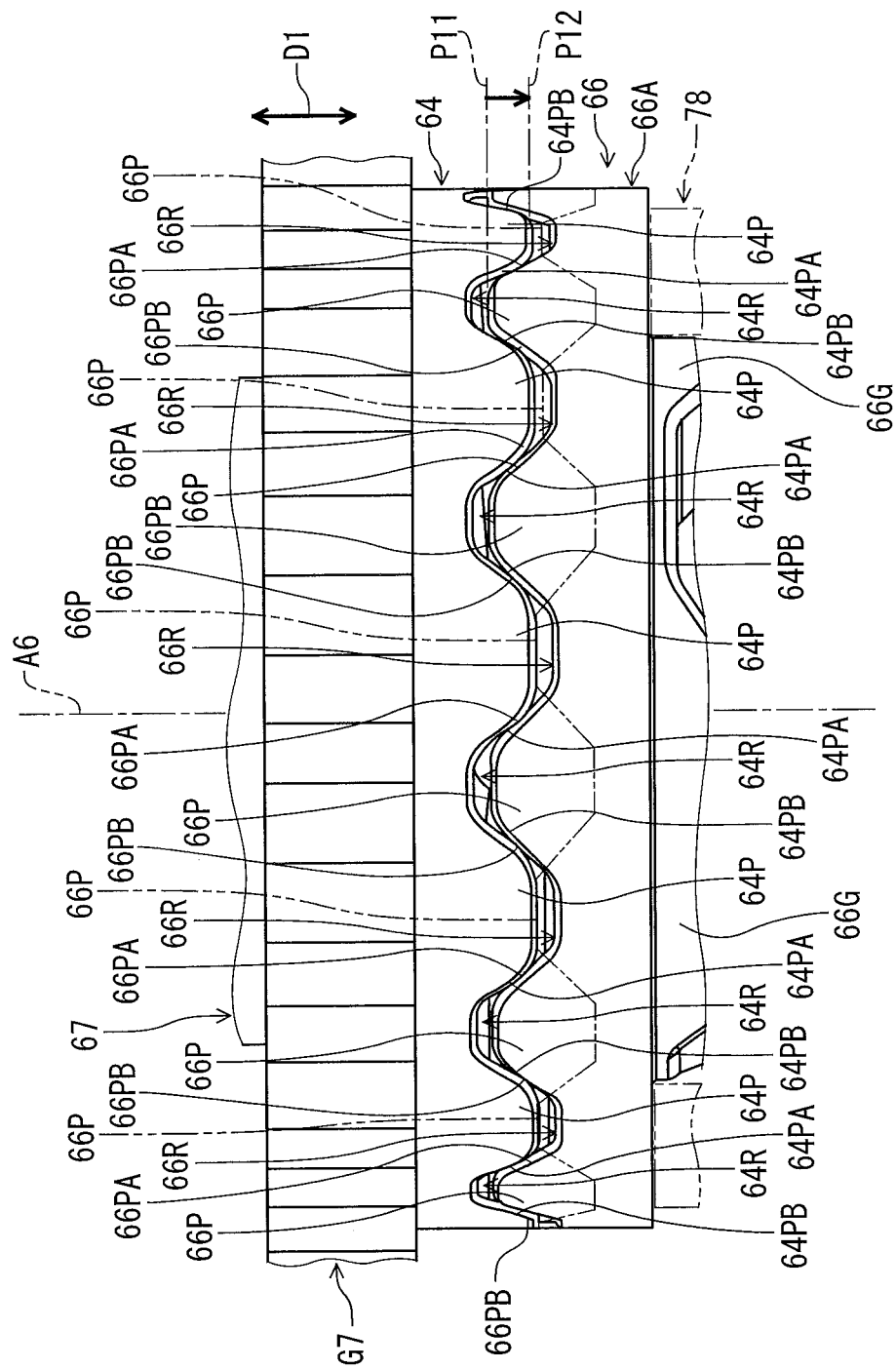
FIG. 15 is a side elevational view of the first member and the second member of the torque limiter of the motor unit illustrated in FIG. 8.

As seen in FIG. 15, the protruding part 64P includes a first inclined surface 64PA and a second inclined surface 64PB. The first inclined surface 64PA and the second inclined surface 64PB at least partially define the recess 64R. The first inclined surface 64PA is non-parallel and non-perpendicular to the limiter rotational axis A6. The second inclined surface 64PB is non-parallel and non-perpendicular to the limiter rotational axis A6.

The protruding part 66P includes a first inclined surface 66PA and a second inclined surface 66PB. The first inclined surface 66PA and the second inclined surface 66PB at least partially define the recess 66R. The first inclined surface 66PA is non-parallel and non-perpendicular to the limiter rotational axis A6. The second inclined surface 66PB is non-parallel and non-perpendicular to the limiter rotational axis A6.

The first inclined surface 64PA is contactable with the first inclined surface 66PA. The second inclined surface 64PB is contactable with the second inclined surface 66PB. The first inclined surface 64PA is in contact with the first inclined surface 66PA in a state where the protruding part 64P is provided in the recess 66R and the protruding part 66P is provided in the recess 64R. The second inclined surface 64PB is in contact with the second inclined surface 66PB in a state where the protruding part 64P is provided in the recess 66R and the protruding part 66P is provided in the recess 64R.

As seen in FIG. 15, the second member 66 is movable relative to the first member 64 between a first position P11 and a second position P12 in an axial direction D1 parallel to the limiter rotational axis A6. For example, the first position P11 and the second position P12 are defined based on an end of the protruding part 66P. However, the first position P11 and the second position P12 can be defined based on another part of the second member 66.

The protruding part 64P is configured to be engaged in the recess 66R to transmit the third torque T42 between the first member 64 and the second member 66 in a state where the second member 66 is in the first position P11 relative to the first member 64. The protruding part 66P is configured to be engaged in the recess 64R to transmit the third torque T42 between the first member 64 and the second member 66 in the state where the second member 66 is in the first position P11 relative to the first member 64. Specifically, the protruding part 64P is configured to be at least partially provided between adjacent two protruding parts of the protruding parts 66P to transmit the third torque T42 between the first member 64 and the second member 66 in the state where the second member 66 is in the first position P11 relative to the first member 64. The protruding part 66P is configured to be at least partially provided between adjacent two protruding parts of the protruding parts 64P to transmit the third torque T42 between the first member 64 and the second member 66 in the state where the second member 66 is in the first position P11 relative to the first member 64. More specifically, the first inclined surface 64PA is in contact with the second incline surface 66PA to transmit the third torque T42 between the first member 64 and the second member 66 in the state where the second member 66 is in the first position P11 relative to the first member 64. The first inclined surface 64PB is in contact with the second incline surface 66PB to transmit the third torque T42 between the first member 64 and the second member 66 in the state where the second member 66 is in the first position P11 relative to the first member 64.

The protruding part 64P is provided in the recess 66R in a state where the second member 66 is in the first position P11. The protruding part 66P is provided in the recess 64R in a state where the second member 66 is in the first position P11. The second member 66 is maintained in the first position P11 by the biasing force of the biasing member 78 in a state where the torque is not input to the first member 64 and the second member 66.

When the torque is input to one of the first member 64 and the second member 66, one of the first inclined surface 64PA and the second inclined surface 64PB of the protruding part 64P guides the protruding part 66P to an axial end of the protruding part 64P to disengage the protruding part 66P from the recess 64R in the state where the torque is equal to or higher than the torque threshold. Namely, when the torque is input to one of the first member 64 and the second member 66, one of the first inclined surface 64PA and the second inclined surface 64PB of the protruding part 64P guides the protruding part 66P to the axial end of the protruding part 64P to move the second member 66 from the first position P11 to the second position P12 against the biasing force of the biasing member 78 in the state where the torque is equal to or higher than the torque threshold.

The protruding part 66P moves from the axial end of the protruding part 64P into the recess 66R along one of the first inclined surface 64PA and the second inclined surface 64PB of the protruding part 64P in the state where the torque is equal to or higher than the torque threshold, moving the second member 66 from the second position P12 to the first position P11. The protruding parts 66P are repeatedly disengaged from and engaged with the recesses 64R while one of the first member 64 and the second member 66 receives the torque which is equal to or higher than the torque threshold, allowing the first member 64 and the second member 66 to rotate relative to each other about the limiter rotational axis A6.

While the disengagement and the engagement between the protruding parts 66P and the recesses 64R are repeated, the fourth torque T43 is transmitted between the first member 64 and the second member 66. The fourth torque T43 depends on rotational resistance generated by the protruding parts 64P, the protruding parts 66P, the recesses 64R, and the recesses 66R while the first member 64 and the second member 66 rotate relative to each other. For example, the fourth torque T43 is substantially zero.

The structure of the torque limiter 60 is not limited to the illustrated embodiment. The torque limiter 60 can have other structures such as a friction torque limiter and a ball clutch.

Figure 16:
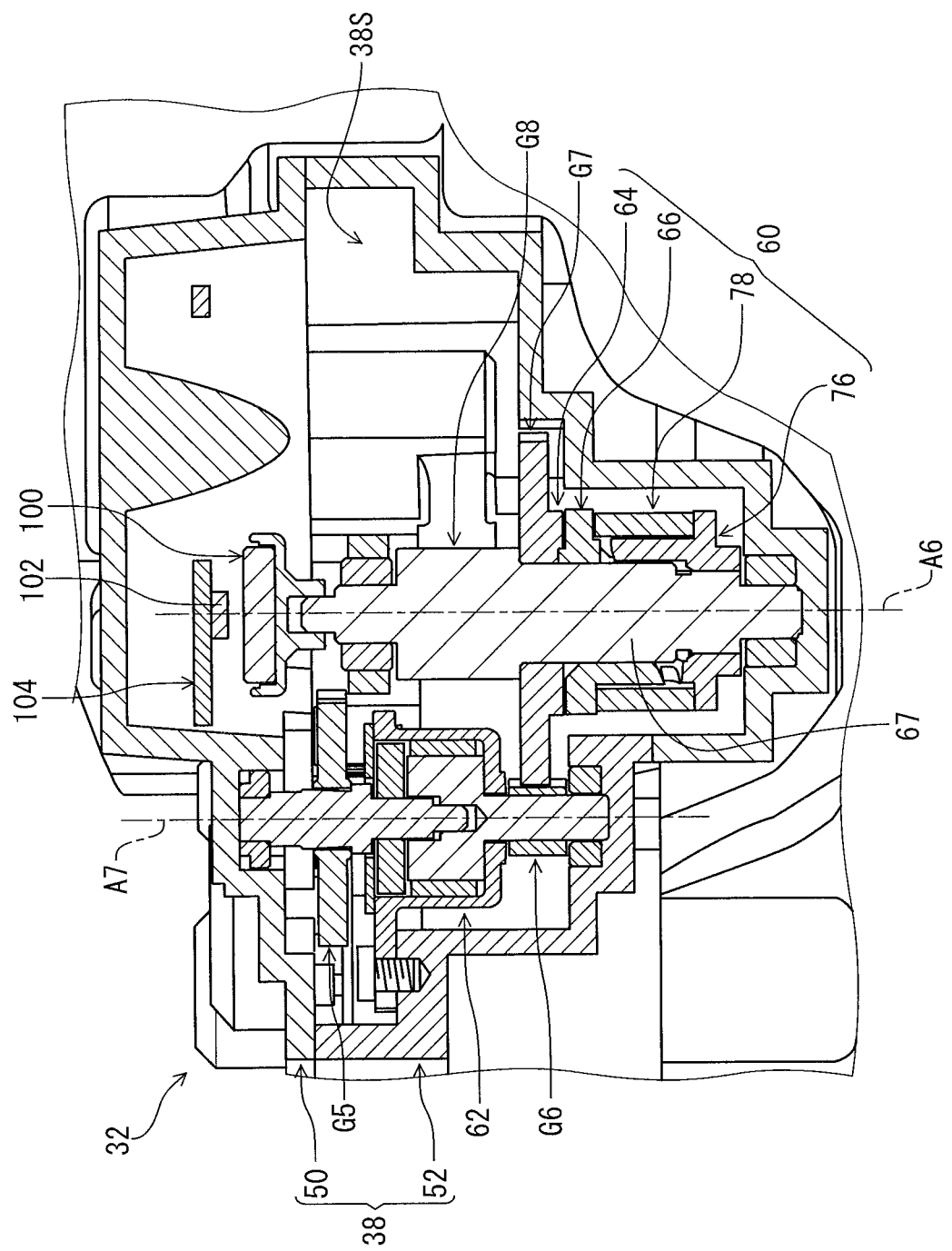
FIG. 16 is a cross-sectional view of the derailleur illustrated in FIG. 2.

As seen in FIG. 16, the torque limiter 60 is entirely disposed inside the housing 38 of the motor unit 32. The torque limiter 60 is entirely disposed in the internal space 38S of the housing 38. However, the torque limiter 60 can be partially disposed inside the housing 38 of the motor unit 32 if needed and/or desired. The torque limiter 60 can be partially disposed in the internal space 38S of the housing 38 if needed and/or desired.

The transmitting structure 62 has a transmitting-structure rotational axis A7. In the present embodiment, the limiter rotational axis A6 is not coincident with the transmitting-structure rotational axis A7. The limiter rotational axis A6 is offset from the transmitting-structure rotational axis A7. The limiter rotational axis A6 is parallel to the transmitting-structure rotational axis A7. However, the limiter rotational axis A6 can be non-parallel to the transmitting-structure rotational axis A7 if needed and/or desired. The limiter rotational axis A6 can be coincide with the transmitting-structure rotational axis A7 if needed and/or desired.

Figure 17:
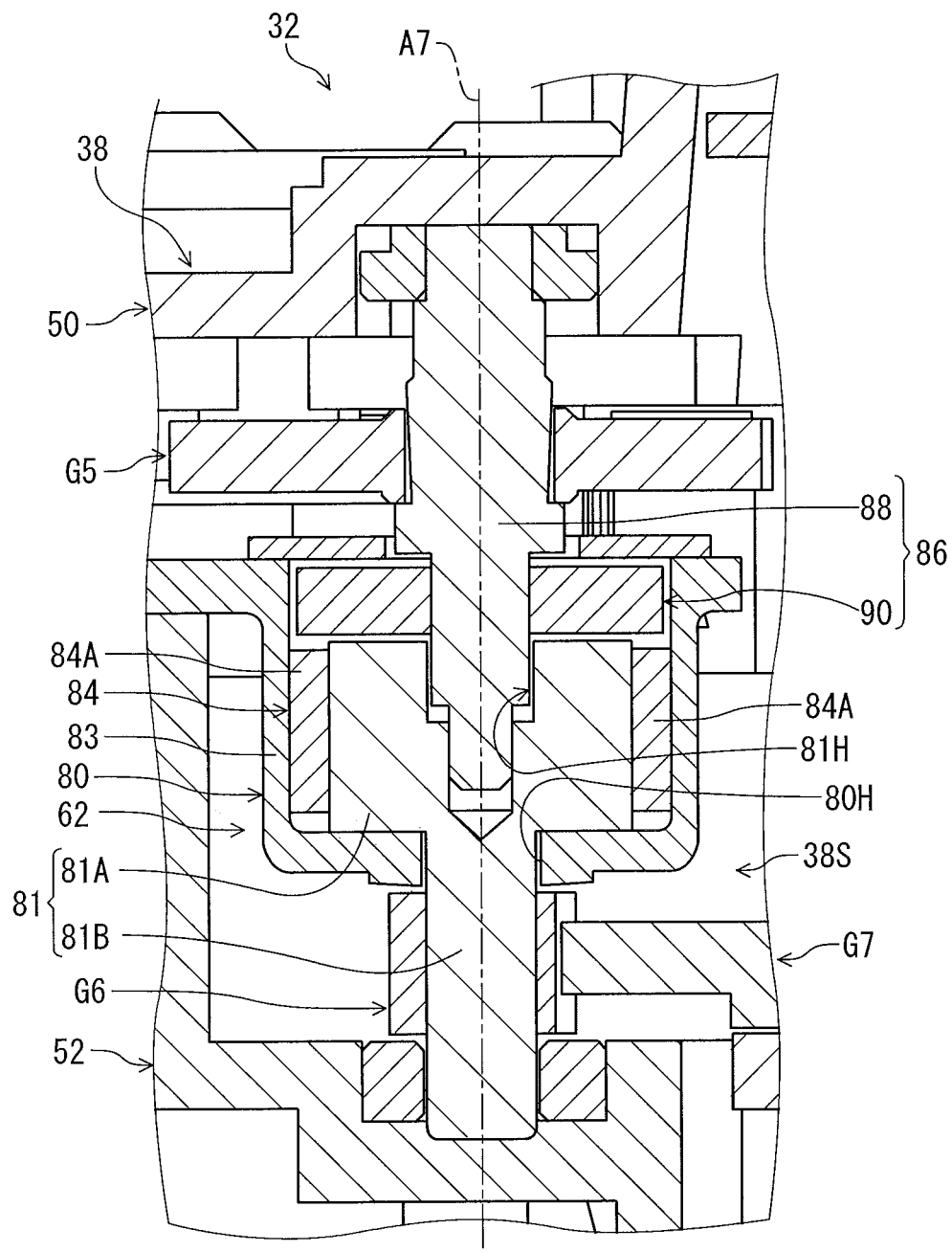
FIG. 17 is a cross-sectional view of the derailleur illustrated in FIG. 2.

As seen in FIG. 17, the transmitting structure 62 includes a first race 80 and a second race 81. The first race 80 is secured to the housing 38. The second race 81 extends along the transmitting-structure rotational axis A7. The second race 81 is rotatable relative to the first race 80 about the transmitting-structure rotational axis A7. The first race 80 is at least partially provided radially outwardly of the second race 81. The second race 81 is at least partially provided radially inwardly of the first race 80.

The first race 80 includes an outer race 83 having an annular shape. The second race 81 includes an inner race 81A. The inner race 81A is at least partially provided radially inwardly of the outer race 83. The first race 80 includes a hole 80H. The second race 81 extends through the hole 80H along the transmitting-structure rotational axis A7. The second race 81 includes a rod part 81B. The rod part 81B extends from the inner race 81A along the transmitting-structure rotational axis A7. The rod part 81B extends through the hole 80H of the first race 80 along the transmitting-structure rotational axis A7.

The transmitting structure 62 includes a first intermediate element 84. The first intermediate element 84 is at least partially provided between the first race 80 and the second race 81. In the present embodiment, the first intermediate element 84 is entirely provided between the first race 80 and the second race 81. However, the first intermediate element 84 can be partially provided between the first race 80 and the second race 81 if needed and/or desired.

Figure 18:
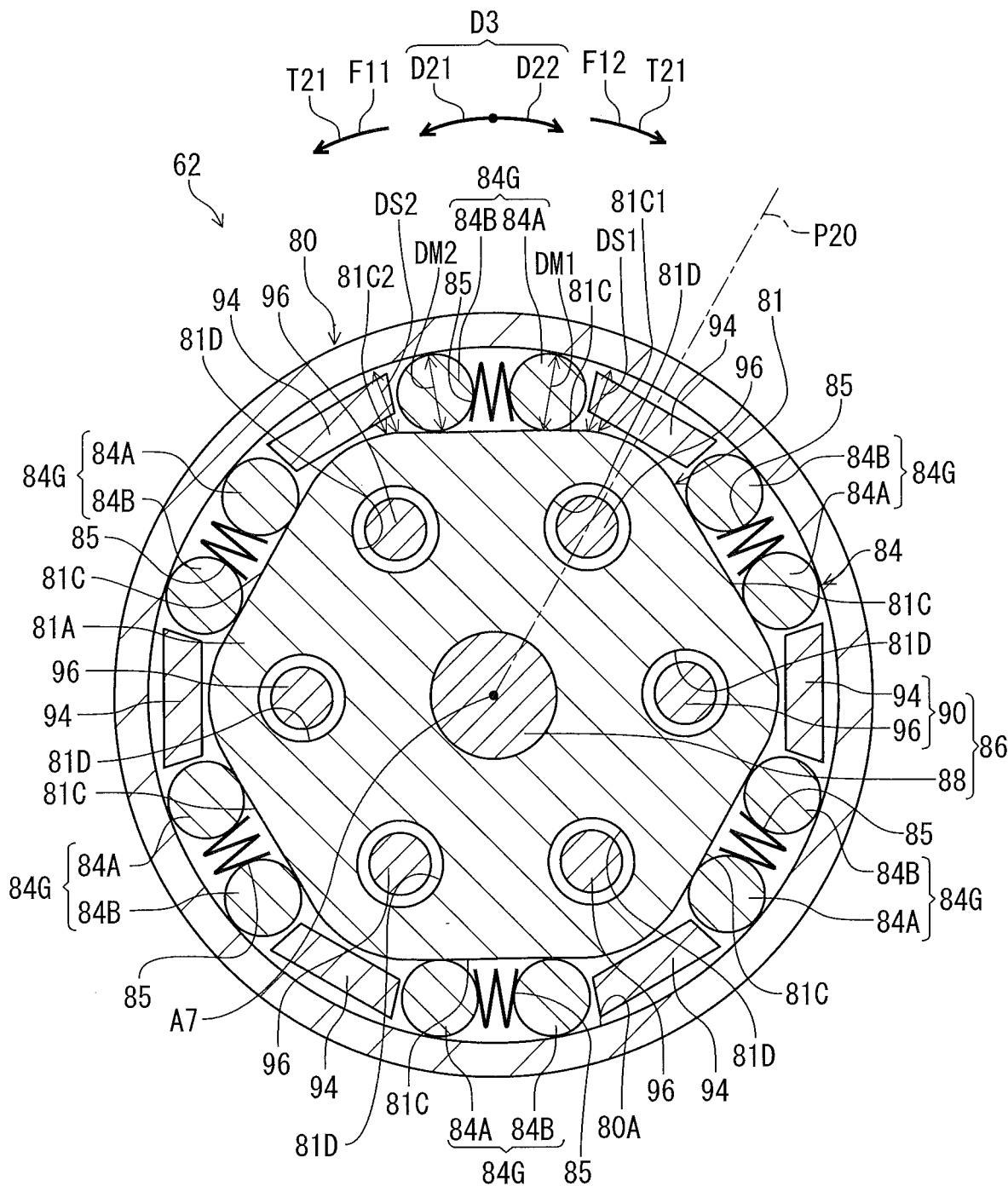
FIG. 18 is a cross-sectional view of a transmitting structure of the motor unit illustrated in FIG. 8 (neutral position).

As seen in FIG. 18, the first intermediate element 84 includes a first rotatable member 84A and a second rotatable member 84B. In the present embodiment, the first intermediate element 84 includes at least two first rotatable members 84A and at least two second rotatable members 84B. A total number of the first rotatable members 84A is six. A total number of the second rotatable members 84B is six. The first rotatable member 84A has a columnar shape. The second rotatable member 84B has a columnar shape.

However, the total number of the first rotatable members 84A is not limited to six. The total number of the second rotatable members 84B is not limited to six. The structure of the first intermediate element 84 is not limited to the first rotatable member 84A and the second rotatable member 84B. One of the first rotatable member 84A and the second rotatable member 84B can be omitted from the first intermediate element 84 if needed and/or desired. The first rotatable member 84A can have shapes other than the columnar shape if needed and/or desired. The second rotatable member 84B can have shapes other than the columnar shape if needed and/or desired.

The first rotatable member 84A is at least partially provided between the first race 80 and the second race 81. The second rotatable member 84B is at least partially provided between the first race 80 and the second race 81. In the present embodiment, the first rotatable member 84A is entirely provided between the first race 80 and the second race 81. The second rotatable member 84B is entirely provided between the first race 80 and the second race 81. However, the first rotatable member 84A can be partially provided between the first race 80 and the second race 81 if needed and/or desired. The second rotatable member 84B can be partially provided between the first race 80 and the second race 81 if needed and/or desired.

The first rotatable members 84A and the second rotatable members 84B are alternatingly arranged in a circumferential direction D3 about the transmitting-structure rotational axis A7. The first rotatable members 84A and the second rotatable members 84B are spaced apart from each other in the circumferential direction D3.

The first race 80 includes an inner peripheral surface 80A. The second race 81 includes at least two contact surfaces 81C. A total number of the contact surfaces 81C is six. The contact surface 81C includes a flat surface. However, the total number of contact surfaces 81C is not limited to six. The contact surface 81C can have shapes other than the flat surface if needed and/or desired.

The first rotatable member 84A and the second rotatable member 84B are provided between the inner peripheral surface 80A of the first race 80 and the contact surface 81C of the second race 81. The first rotatable member 84A and the second rotatable member 84B are contactable with the inner peripheral surface 80A of the first race 80 and the contact surface 81C of the second race 81.

The first intermediate element 84 includes at least one intermediate-member group 84G consisting of the first rotatable member 84A and the second rotatable member 84B. In the present embodiment, the first intermediate element 84 includes six intermediate-member groups 84G each consisting of the first rotatable member 84A and the second rotatable member 84B. The intermediate-member group 84G is at least partially provided between the inner peripheral surface 80A of the first race 80 and the contact surface 81C of the second race 81. The intermediate-member group 84G is spaced apart from each other in the circumferential direction D3. The intermediate-member groups 84G respectively correspond to the contact surfaces 81C of the second race 81. However, a total number of the intermediate-member groups 84G consisting of the first rotatable member 84A and the second rotatable member 84B is not limited to six.

The transmitting structure 62 includes at least one biasing element 85. The biasing element 85 is configured to bias the first rotatable member 84A and the second rotatable member 84B to move away from each other. In the present embodiment, the transmitting structure 62 includes at least two biasing elements 85. The biasing element 85 is provided between the first rotatable member 84A and the second rotatable member 84B of the intermediate-member group 84G to bias the first rotatable member 84A and the second rotatable member 84B to move away from each other. A total number of the biasing elements 85 is six. The biasing element 85 includes a spring such as a coiled spring and a leaf spring. However, the biasing element 85 can include members other than the spring (e.g., an elastic member such as rubber) if needed and/or desired. The total number of the biasing elements 85 is not limited to six.

The contact surface 81C of the second race 81 includes a first circumferential end 81C1 and a second circumferential end 81C2. The contact surface 81C extends between the first circumferential end 81C1 and the second circumferential end 81C2. The first circumferential end 81C1 is closer to the first rotatable member 84A than the second circumferential end 81C2. The second circumferential end 81C2 is closer to the second rotatable member 84B than the first circumferential end 81C1.

A first radial distance DS1 is radially defined between the inner peripheral surface 80A of the first race 80 and the first circumferential end 81C1 of the contact surface 81C of the second race 81. A second radial distance DS2 is radially defined between the inner peripheral surface 80A of the first race 80 and the second circumferential end 81C2 of the contact surface 81C of the second race 81. The first rotatable member 84A has a first diameter DM1. The second rotatable member 84B has a second diameter DM2. The first radial distance DS1 is shorter than the first diameter DM1. The second radial distance DS2 is shorter than the second diameter DM2.

The biasing element 85 biases the first rotatable member 84A to keep the first rotatable member 84A in contact with the inner peripheral surface 80A of the first race 80 and contact surface 81C of the second race 81 because of the biasing force of the biasing element 75. The biasing element 85 biases the second rotatable member 84B to keep the second rotatable member 84B in contact with the inner peripheral surface 80A of the first race 80 and the contact surface 81C of the second 72 because of the biasing force of the biasing element 85.

Figure 19:
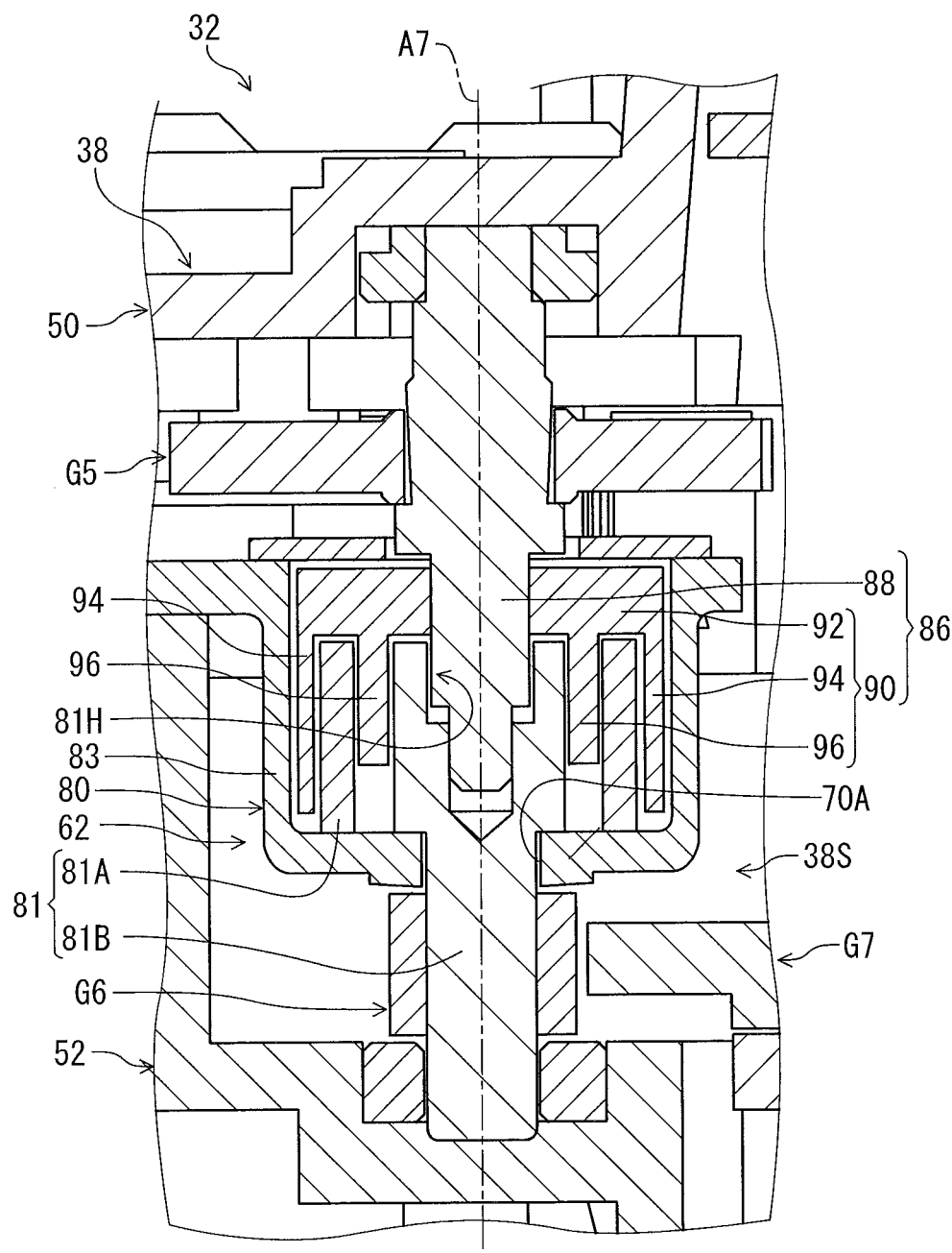
FIG. 19 is a cross-sectional view of the derailleur illustrated in FIG. 2. illustrated in FIG. 8.

As seen in FIG. 19, the transmitting structure 62 includes a second intermediate element 86. The second intermediate element 86 is at least partially provided between the first race 80 and the second race 81. In the present embodiment, the second intermediate element 86 is partially provided between the first race 80 and the second race 81. However, the second intermediate element 86 can be entirely provided between the first race 80 and the second race 81.

The second intermediate element 86 is rotatable relative to the first race 80 about the transmitting-structure rotational axis A7. The second intermediate element 86 includes a shaft 88. The shaft 88 extends along the transmitting-structure rotational axis A7. The second race 81 includes a support hole 81H. The shaft 88 is rotatably provided in the support hole 81H.

The second intermediate element 86 includes a coupling member 90. The coupling member 90 is secured to the shaft 88. The coupling member 90 is a separate member from the shaft 88. However, the coupling member 90 can be integrally provided with the shaft 88 as a one-piece unitary member if needed and/or desired.

The coupling member 90 includes a base part 92, at least two intermediate parts 94, and at least two transmitting parts 96. The base part 92 is secured to the shaft 88. The base part 92 extends radially outwardly from the shaft 88. The intermediate part 94 extends from the base part 92 along the transmitting-structure rotational axis A7. The intermediate part 94 is at least partially provided between the first race 80 and the second race 81. The second race 81 includes at least two transmitting holes 81D. The transmitting part 96 is provided in the transmitting hole 81D of the second race 81. The transmitting part 96 is contactable with the second race 81 to transmit rotation between the second race 81 and the second intermediate element 86 about the transmitting-structure rotational axis A7.

As seen in FIG. 18, a total number of the intermediate parts 94 is six. A total number of the transmitting parts 96 is six. A total number of the transmitting hole 81D is six. However, the total number of the intermediate parts 94 is not limited to six. The total number of the transmitting parts 96 is not limited to six. The total number of the transmitting hole 81D is not limited to six.

The intermediate part 94 is at least partially provided between adjacent two groups of the intermediate-member groups 84G in the circumferential direction D3. The intermediate part 94 is at least partially provided between the first rotatable member 84A of one of the intermediate-member groups 84G and the second rotatable member 84B of another of the intermediate-member groups 84G in the circumferential direction D3.

In the present embodiment, the base part 92, the at least two intermediate parts 94, and the at least two transmitting parts 96 are integrally provided with each other as a one-piece unitary member. However, at least one of the base part 92, the at least two intermediate parts 94, and the at least two transmitting parts 96 can be a separate member from another of the base part 92, the at least two intermediate parts 94, and the at least two transmitting parts 96 if needed and/or desired.

Figure 20:
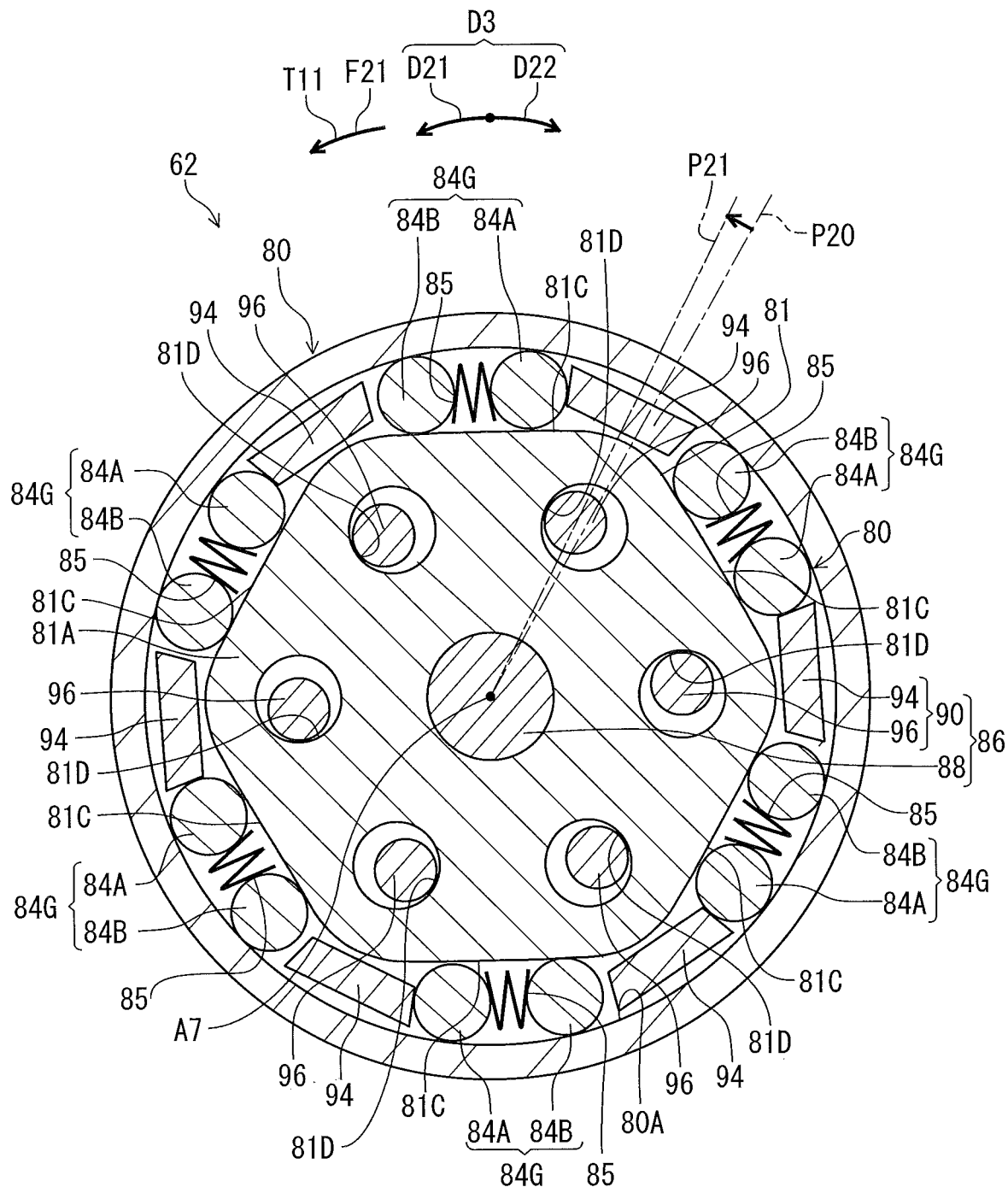
FIG. 20 is a cross-sectional view of the transmitting structure of the motor unit illustrated in FIG. 8 (first rotational position).
Figure 21:
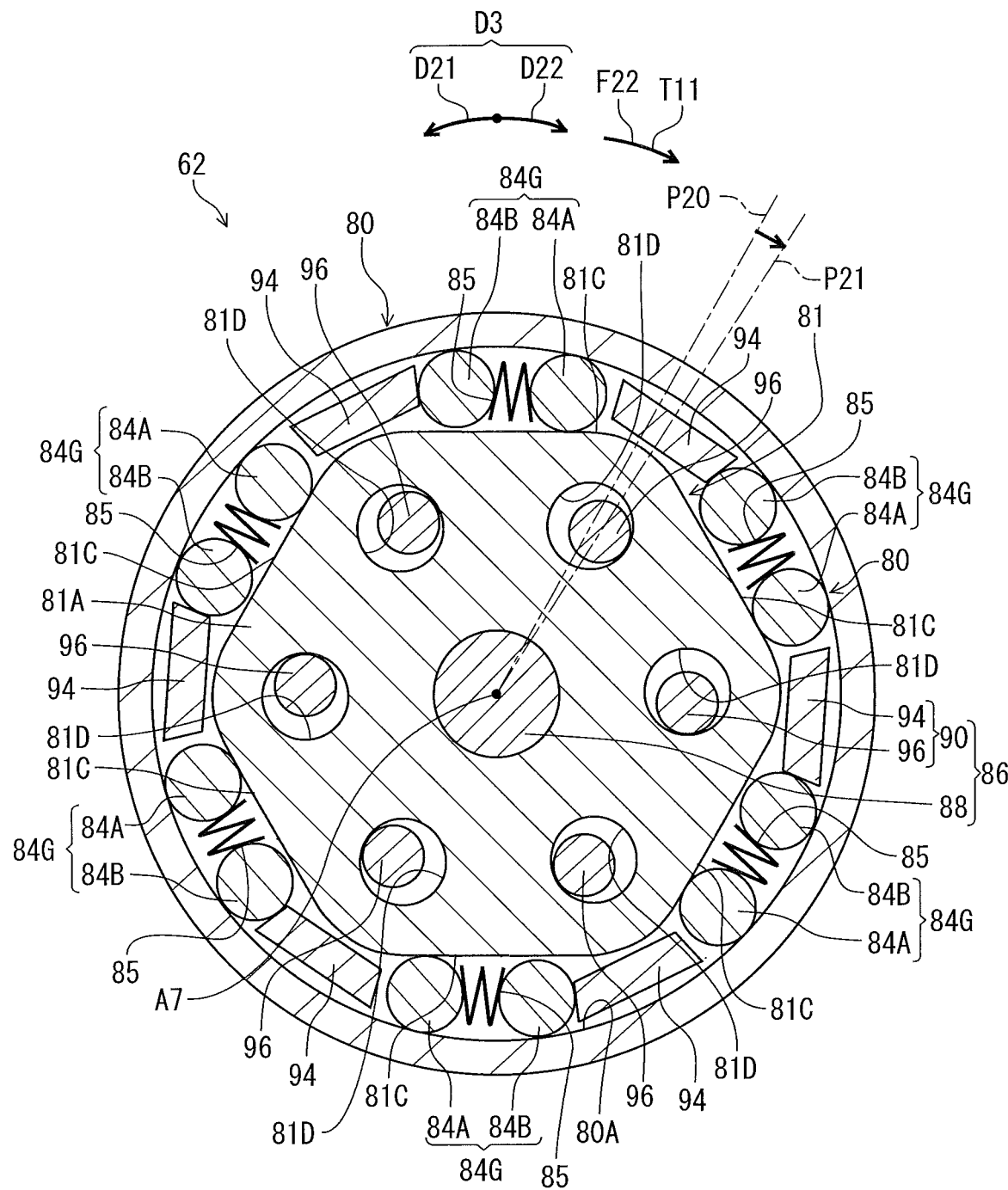
FIG. 21 is a cross-sectional view of the transmitting structure of the motor unit illustrated in FIG. 8 (second rotational position).

As seen in FIG. 20, the second intermediate element 86 is rotatable relative to the second race 81 about the transmitting-structure rotational axis A7 from a neutral position P20 to a first rotational position P21 in a first circumferential direction D21. As seen in FIG. 21, the second intermediate element 86 is rotatable relative to the second race 81 about the transmitting-structure rotational axis A7 from the neutral position P20 to a second rotational position P22 in a second circumferential direction D22 different from the first circumferential direction D21. In the present embodiment, the second circumferential direction D22 is an opposite direction of the first circumferential direction D21. However, the second circumferential direction D22 can be a direction different from the opposite direction of the first circumferential direction D21.

As seen in FIGS. 18, 20, and 21, the transmitting part 96 is contactable with an inner peripheral surface of the transmitting hole 81D. As seen in FIG. 18, the transmitting part 96 is spaced apart from the inner peripheral surface of the transmitting hole 81D in an initial state where the second intermediate element 86 is in the neutral position P20. As seen in FIG. 20, the transmitting part 96 is in contact with the inner peripheral surface of the transmitting hole 81D in a first rotation state where the second intermediate element 86 is in the first rotational position P21. As seen in FIG. 21, the transmitting part 96 is in contact with the inner peripheral surface of the transmitting hole 81D in a second rotation state where the second intermediate element 86 is in the second rotational position P22.

As seen in FIGS. 18, 20, and 21, the intermediate part 94 is contactable with each of the first rotatable member 84A and the second rotatable member 84B. As seen in FIG. 18, the intermediate part 94 is spaced apart from each of the first rotatable member 84A and the second rotatable member 84B in the initial state where the second intermediate element 86 is in the neutral position P20. As seen in FIG. 20, the intermediate part 94 is in contact with the first rotatable member 84A in the first rotation state where the second intermediate element 86 is in the first rotational position P21. As seen in FIG. 21, the intermediate part 94 is in contact with the second rotatable member 84B in the second rotation state where the second intermediate element 86 is in the second rotational position P22.

As seen in FIG. 18, the first intermediate element 84 is configured to restrict the second race 81 from rotating relative to the first race 80 in the first circumferential direction D21 with respect to the transmitting-structure rotational axis A7 when the second race 81 receives a first rotational force F11 having the second input torque T21 in the first circumferential direction D21. The first intermediate element 84 is configured to restrict the second race 81 from rotating relative to the first race 80 in the second circumferential direction D22 with respect to the transmitting-structure rotational axis A7 when the second race 81 receives a second rotational force F12 having the second input torque T21 in the second circumferential direction D22.

The first intermediate element 84 is configured to move toward the first race 80 in response to the first intermediate element 84 pushed by the second race 81 in the first circumferential direction D21 with respect to the transmitting-structure rotational axis A7. The first intermediate element 84 is configured to move toward the first race 80 in response to the first intermediate element 84 pushed by the second race 81 in the second circumferential direction D22 different from the first circumferential direction D21. The first intermediate element 84 is configured to rotate together with the first race 80 in a state where the second race 81 pushes the first intermediate element 84 without the second intermediate element 86 pushing the first intermediate element 84. Since the first race 80 is secured to the housing 38 of the motor unit 32, the first race 80 and the first intermediate element 84 are stationary relative to the housing 38 (see e.g., FIG. 16) in the state where the second race 81 pushes the first intermediate element 84 without the second intermediate element 86 pushing the first intermediate element 84.

The first rotatable member 84A is configured to restrict the second race 81 from rotating relative to the first race 80 in the first circumferential direction D21 with respect to the transmitting-structure rotational axis A7 when the second race 81 receives the first rotational force F11 in the first circumferential direction D21. The second rotatable member 84B is configured to restrict the second race 81 from rotating relative to the first race 80 in the second circumferential direction D22 with respect to the transmitting-structure rotational axis A7 when the second race 81 receives the second rotational force F12 in the second circumferential direction D22.

As seen in FIG. 18, the contact surface 81C of the second race 81 is configured to press the first rotatable member 84A against the inner peripheral surface 80A of the first race 80 when the second race 81 receives the first rotational force F11 in the first circumferential direction D21. The first race 80 and the second race 81 are locked by the first rotatable members 84A when the second race 81 receives the first rotational force F11 in the first circumferential direction D21. The first rotatable members 84A is configured to restrict the second race 81 from rotating relative to the first race 80 in the first circumferential direction D21 about the transmitting-structure rotational axis A7 when the second race 81 receives the first rotational force F11 in the first circumferential direction D21. Thus, the first race 80 secured to the housing 38 (see e.g., FIG. 16) receives the first rotational force F11 transmitted to the second race 81.

The contact surface 81C of the second race 81 is configured to press the second rotatable member 84B against the inner peripheral surface 80A of the first race 80 when the second race 81 receives the second rotational force F12 in the second circumferential direction D22. The first race 80 and the second race 81 are locked by the second rotatable members 84B when the second race 81 receives the second rotational force F12 in the second circumferential direction D22. The second rotatable members 84B is configured to restrict the second race 81 from rotating relative to the first race 80 in the second circumferential direction D22 about the transmitting-structure rotational axis A7 when the second race 81 receives the second rotational force F12 in the second circumferential direction D22. Thus, the first race 80 secured to the housing 38 (see e.g., FIG. 16) receives the second rotational force F12 transmitted to the second race 81.

The contact surface 81C of the second race 81 is configured not to press the first rotatable member 84A against the inner peripheral surface 80A of the first race 80 when the second race 81 receives the second rotational force F12 in the second circumferential direction D22. The first rotatable members 84A is configured not to restrict the second race 81 from rotating relative to the first race 80 in the second circumferential direction D22 about the transmitting-structure rotational axis A7 when the second race 81 receives the second rotational force F12 in the second circumferential direction D22.

The contact surface 81C of the second race 81 is configured not to press the second rotatable member 84B against the inner peripheral surface 80A of the first race 80 when the second race 81 receives the first rotational force F11 in the first circumferential direction D21. The second rotatable members 84B is configured to restrict the second race 81 from rotating relative to the first race 80 in the first circumferential direction D21 about the transmitting-structure rotational axis A7 when the second race 81 receives the first rotational force F11 in the first circumferential direction D21.

As seen in FIG. 20, the first intermediate element 84 is configured to move away from the first race 80 in response to the first intermediate element 84 pushed by the second intermediate element 86 in the first circumferential direction D21. The first intermediate element 84 is configured to rotate relative to the first race 80 in a state where the second intermediate element 86 pushes the first intermediate element 84 without the second race 81 pushing the first intermediate element 84. The first intermediate element 84 is configured to move radially inwardly with respect to the transmitting-structure rotational axis A7 in response to the first intermediate element 84 pushed by the second intermediate element 86 in the first circumferential direction D21.

The second intermediate element 86 is configured to move the first intermediate element 84 relative to the second race 81 in the first circumferential direction D21 to allow the second race 81 to rotate relative to the first race 80 in the first circumferential direction D21 along with the second intermediate element 86 when the second intermediate element 86 receives a first rotational force F21 having the first input torque T11 in the first circumferential direction D21. The first intermediate element 84 is configured to rotate relative to the first race 80 together with the second race 81 and the second intermediate element 86 about the transmitting-structure rotational axis A7 in the first circumferential direction D21 when the second intermediate element 86 receives the first rotational force F21 in the first circumferential direction D21.

The intermediate part 94 of the second intermediate element 86 is configured to move the first rotatable member 84A relative to the second race 81 in the first circumferential direction D21 in response to a first rotation of the second intermediate element 86 from the neutral position P20 to the first rotational position P21 in the first circumferential direction D21. The transmitting part 96 of the second intermediate element 86 is configured to rotate the second race 81 relative to the first race 80 in the first circumferential direction D21 in response to the first rotation of the second intermediate element 86 from the first rotational position P21 in the first circumferential direction D21. The second race 81, the first intermediate element 84, and the second intermediate element 86 rotate relative to the first race 80 in the first circumferential direction D21 when the second intermediate element 86 receives the first rotational force F21 having the first input torque T11 in the first circumferential direction D21.

As seen in FIG. 21, the first intermediate element 84 is configured to move away from the first race 80 in response to the first intermediate element 84 pushed by the second intermediate element 86 in the second circumferential direction D22 different from the first circumferential direction D21. The first intermediate element 84 is configured to rotate relative to the first race 80 in a state where the second intermediate element 86 pushes the first intermediate element 84 without the second race 81 pushing the first intermediate element 84. The first intermediate element 84 is configured to move radially inwardly with respect to the transmitting-structure rotational axis A7 in response to the first intermediate element 84 pushed by the second intermediate element 86 in the second circumferential direction D22.

The second intermediate element 86 is configured to move the first intermediate element 84 relative to the second race 81 in the second circumferential direction D22 to allow the second race 81 to rotate relative to the first race 80 in the second circumferential direction D22 along with the second intermediate element 86 when the second intermediate element 86 receives a second rotational force F22 having the first input torque T11 in the second circumferential direction D22. The first intermediate element 84 is configured to rotate relative to the first race 80 together with the second race 81 and the second intermediate element 86 about the transmitting-structure rotational axis A7 in the second circumferential direction D22 when the second intermediate element 86 receives the second rotational force F22 in the second circumferential direction D22.

The intermediate part 94 of the second intermediate element 86 is configured to move the second rotatable member 84B relative to the second race 81 in the second circumferential direction D22 in response to a second rotation of the second intermediate element 86 from the neutral position P20 to the second rotational position P22 in the second circumferential direction D22. The transmitting part 96 of the second intermediate element 86 is configured to rotate the second race 81 relative to the first race 80 in the second circumferential direction D22 in response to the second rotation of the second intermediate element 86 from the second rotational position P22 in the second circumferential direction D22. The second race 81, the first intermediate element 84, and the second intermediate element 86 rotate relative to the first race 80 in the second circumferential direction D22 when the second intermediate element 86 receives the second rotational force F22 having the first input torque T11 in the second circumferential direction D22.

As seen in FIGS. 8, 20, and 21, the transmitting structure 62 is configured to transmit the torque in multiple rotational directions based on a rotational direction of the output shaft 54A in a state where the transmitting structure 62 transmits the torque in the first load direction LD1. The multiple rotational directions are defined about the transmitting-structure rotational axis A7. The multiple rotational directions include the first circumferential direction D21 and the second circumferential direction D22. The transmitting structure 62 is configured to transmit the first torque T1 in the first circumferential direction D21 based on a first rotational direction D31 of the output shaft 54A in the state where the transmitting structure 62 transmits the first torque T1 in the first load direction LD1. The transmitting structure 62 is configured to transmit the first torque T1 in the second circumferential direction D22 based on a second rotational direction D32 of the output shaft 54A in the state where the transmitting structure 62 transmits the first torque T1 in the first load direction LD1. The second rotational direction D32 is an opposite direction of the first rotational direction D31.

As seen in FIG. 16, the motor unit 32 further comprises a detection object 100. The motor unit 32 comprises a detector 102 configured to detect the detection object 100. The detection object 100 is configured to be detected by the detector 102. The detector 102 is configured to detect a position of the detection object 100. The detection object 100 is coupled to the support shaft 67 to rotate along with the support shaft 67 about the limiter rotational axis A6. The detector 102 is configured to detect a rotational position of the detection object 100. Thus, the detector 102 is configured to detect a rotational position of the support shaft 67 of the torque limiter 60. The rotational position of the support shaft 67 corresponds to a position of the movable member 14 and a gear position of the derailleur RD. Thus, the detector 102 is configured to detect the position of the movable member 14 and the gear position of the derailleur RD.

In the present embodiment, the detector 102 includes a non-contact detector such as an encoder. Examples of the encoder include a magnetic sensor (e.g., a hall sensor) and an optical sensor (e.g., a photo sensor). The detection object 100 includes a magnetic body (e.g., magnet) and a light emitter (e.g., a light emitting diode (LED)). However, the detector 102 can include a contact detector if needed and/or desired. The detection object 100 can include parts other than the magnetic body or the light emitter.

As seen in FIG. 8, the detection object 100 is provided on a downstream side with respect to the transmitting structure 62 on the power transmission path TP. The detection object 100 is provided on a downstream side with respect to the torque limiter 60 on the power transmission path TP. The detection object 100 is provided on the downstream side with respect to the transmitting structure 62 on the power transmission path TP in the first load direction LD1. The detection object 100 is provided on the downstream side with respect to the torque limiter 60 on the power transmission path TP in the first load direction LD1.

Figure 22:
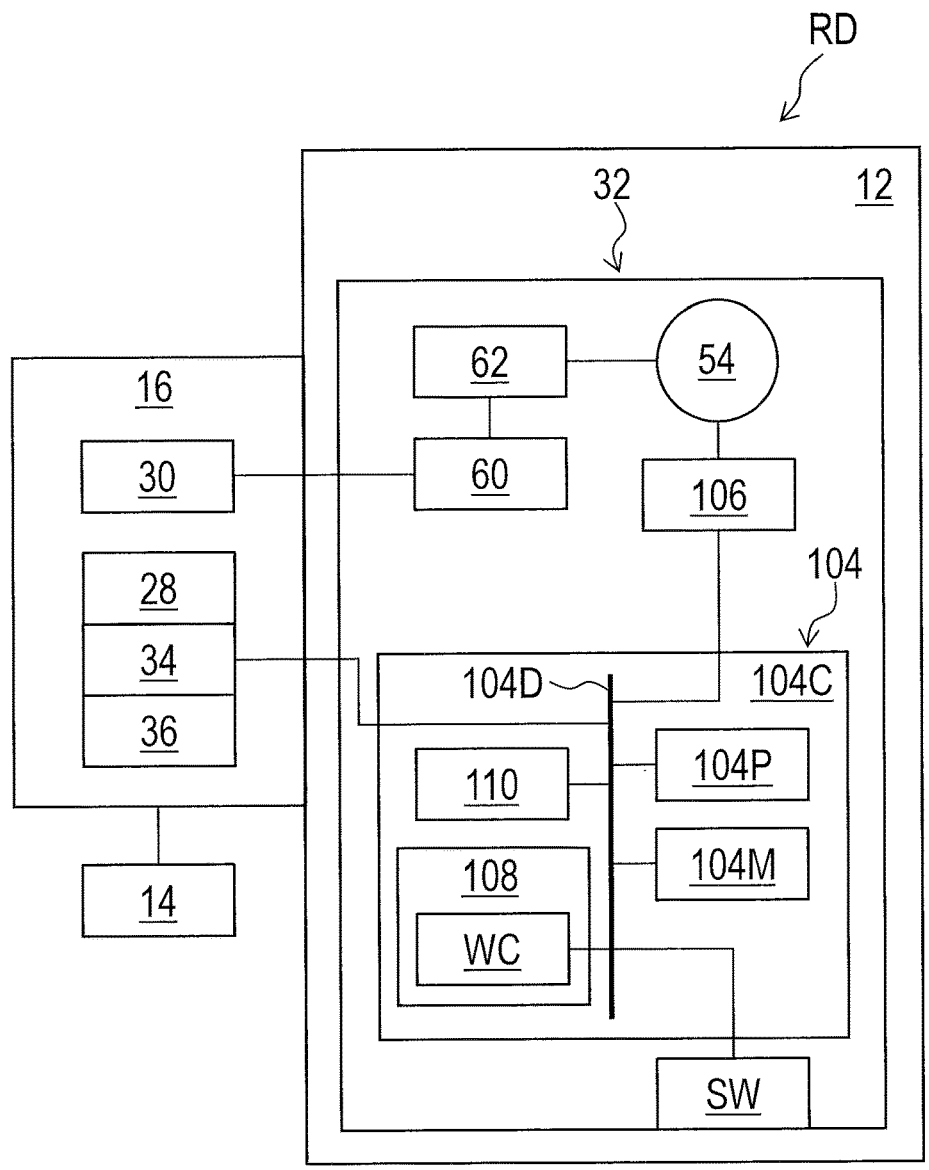
FIG. 22 is a schematic block diagram of the derailleur illustrated in FIG. 2.

As seen in FIG. 22, the motor unit 32 includes an electronic controller 104, a motor driver 106, a communicator 108, an informing device 110, and an electric switch SW. The electronic controller 104 is electrically connected to the detector 102, the motor driver 106, the communicator 108, and the informing device 110. The power-supply attachment structure 34 is electrically connected to the detector 102, the electronic controller 104, the motor driver 106, the communicator 108, and the informing device 110. The electric power source 36 is electrically connected to the detector 102, the electronic controller 104, the motor driver 106, the communicator 108, and the informing device 110 via the power-supply attachment structure 34 to supply electricity to the detector 102, the electronic controller 104, the motor driver 106, the communicator 108, and the informing device 110 via the power-supply attachment structure 34.

As seen in FIG. 22, the electronic controller 104 includes a processor 104P, a memory 104M, a circuit board 104C, and a bus 104D. The processor 104P and the memory 104M are electrically mounted on the circuit board 104C. The processor 104P and the memory 104M are electrically connected to the circuit board 104C via the bus 104D. The processor 104P is electrically connected to the memory 104M via the circuit board 104C and the bus 104D.

For example, the processor 104P includes at least one of a central processing unit (CPU), a micro processing unit (MPU), and a memory controller. The memory 104M is electrically connected to the processor 104P. For example, the memory 104M includes at least one of a volatile memory and a non-volatile memory. Examples of the volatile memory include a random-access memory (RAM) and a dynamic random-access memory (DRAM). Examples of the non-volatile memory include a read only memory (ROM), an electrically erasable programmable ROM (EEPROM), and a hard disc drive (HDD). The memory 104M includes storage areas each having an address. The processor 104P is configured to control the memory 104M to store data in the storage areas of the memory 104M and reads data from the storage areas of the memory 104M. The processor 104P can also be referred to as a hardware processor 104P. The memory 104M can also be referred to as a hardware memory 104M. The memory 104M can also be referred to as a computer-readable storage medium 104M.

The electronic controller 104 is programed to execute at least one control algorithm of the derailleur RD. The memory 104M (e.g., the ROM) stores at least one program including at least one program instruction. The at least one program is read into the processor 104P, and thereby the at least one control algorithm of the derailleur RD is executed based on the at least one program. The electronic controller 104 can also be referred to as an electronic controller circuit or circuitry 104. The electronic controller 104 can also be referred to as a hardware electronic controller 104.

The structure of the electronic controller 104 is not limited to the above structure. The structure of the 22 is not limited to the processor 104P, the memory 104M, and the bus 104D. The electronic controller 104 can be realized by hardware alone or a combination of hardware and software. The processor 104P and the memory 104M can be integrated as a one chip such as an application specific integrated circuit (ASIC) or a field programmable gate array (FPGA).

The communicator 108 is configured to communicate with other devices such as the operating devices 3 and 4 and the derailleur FD. The communicator 108 includes a wireless communicator WC. The electronic controller 104 is electrically connected to the wireless communicator WC to control the wireless communicator WC. The electronic controller 104 is configured to control the wireless communicator WC to execute pairing between the wireless communicator WC and other wireless communicators of the operating devices 3 and 4 and the derailleur FD.

The wireless communicator WC is electrically connected to the processor 104P and the memory 104M with the circuit board 104C and the bus 104D. The wireless communicator WC includes a signal transmitting circuit or circuitry and a signal receiving circuit or circuitry. Thus, the wireless communicator WC can also be referred to as a wireless communicator circuit or circuitry WC.

The wireless communicator WC is configured to superimpose digital signals on carrier wave using a predetermined wireless communication protocol to wirelessly transmit signals. In the first embodiment, the wireless communicator WC is configured to encrypt signals using a cryptographic key to generate encrypted wireless signals. The wireless communicator WC includes at least one antenna. The wireless communicator WC is configured to transmit wireless signals via the at least one antenna. The wireless communicator WC can include at least two antennas. In a case where the wireless communicator WC includes at least two antennas, the wireless communicator WC can be configured to wirelessly communicate with another device of the bicycle 2 via one of the at least two antennas and to wirelessly communicate with a wireless device such as a smartphone, a tablet computer, and a personal computer via another of the at least two antennas.

The wireless communicator WC is configured to receive wireless signals via the antenna. In the first embodiment, the wireless communicator WC is configured to decode the wireless signals to recognize signals transmitted from other wireless communicators. The wireless communicator WC is configured to decrypt the wireless signals using the cryptographic key.

The operating device 3 is configured to generate a control signal in response to a user input. For example, the operating device 3 includes a first electric switch, a first additional electric switch, and a first communicator. The first electric switch is configured to receive a first user input. The first additional electric switch is configured to receive a first additional user input. The first communicator is configured to wirelessly transmit a control signal CS11 in response to the first user input received by the first electric switch. The first communicator is configured to wirelessly transmit a control signal CS12 in response to the first additional user input received by the first additional electric switch. For example, the control signal CS11 indicates upshifting of the derailleur RD. The control signal CS12 indicates downshifting of the derailleur RD. The operating device 3 can be configured to transmit control signals via an electric cable if needed and/or desired.

The operating device 4 is configured to generate a control signal in response to a user input. For example, the operating device 4 includes a second electric switch, a second additional electric switch, and a second communicator. The second electric switch is configured to receive a second user input. The second additional electric switch is configured to receive a second additional user input. The second communicator is configured to wirelessly transmit a control signal CS21 in response to the second user input received by the second electric switch. The second communicator is configured to wirelessly transmit a control signal CS22 in response to the second additional user input received by the second additional electric switch. For example, the control signal CS21 indicates upshifting of the derailleur FD. The control signal CS22 indicates downshifting of the derailleur FD. The operating device 4 can be configured to transmit control signals via an electric cable if needed and/or desired.

The wireless communicator WC is configured to wirelessly receive the control signals CS11, CS12, CS21, and CS22 transmitted from the operating devices 3 and 4. The electronic controller 104 is configured to receive the control signals CS11, CS12, CS21, and CS22 wirelessly transmitted from the operating devices 3 and 4 via the wireless communicator WC. The wireless communicator WC is configured to wirelessly communicate with a wireless communicator of the derailleur FD. The wireless communicator WC is configured to wirelessly transmit, to the derailleur FD, the control signals CS21 and CS22 transmitted from the operating device 4. The communicator 108 can include a wired communicator configured to communicate with another wired communicator via an electric cable if needed and/or desired.

The motor driver 106 is electrically connected to the electric motor 54 and the electronic controller 104 to control the electric motor 54 based on the control signals transmitted from the electronic controller 104. The motor driver 106 is configured to control electricity supplied from the electric power source 36 based on the control signals CS11 and CS12 transmitted from the electronic controller 104. Namely, the electronic controller 104 is configured to control the electric motor 54 based on the control signals CS11 and CS12 transmitted from the operating devices 3 and 4.

The wireless communicator WC has a first mode and a second mode. In the first mode, power consumption of the wireless communicator WC is first power consumption. In the second mode, the power consumption of the wireless communicator WC is second power consumption. The second power consumption is lower than the first power consumption. For example, in the first mode, the electronic controller 104 controls electricity to be supplied from the electric power source 36 to the signal receiving circuit and the signal transmitting circuit of the wireless communicator WC. In the second mode, the electronic controller 104 controls electricity to be supplied from the electric power source 36 to the signal receiving circuit of the wireless communicator WC and not to the signal transmitting circuit of the wireless communicator WC. Thus, in the second mode, the wireless communicator WC is configured to recognize the control signals CS11, CS12, CS21, and CS22 and not to transmit the control signals CS21 and CS22.

In the first mode, the electronic controller 104 is configured to control the electric motor 54 to move the movable member 14 from the current gear position to a target gear position in an upshifting direction based on the control signal CS11 received from the operating device 3 via the wireless communicator WC. In the first mode, the electronic controller 104 is configured to control the electric motor 54 to move the movable member 14 from the current gear position to a target gear position in a downshifting direction based on the control signal CS12 received from the operating device 3 via the wireless communicator WC.

In the first mode, the electronic controller 104 is configured to transmit, to the derailleur FD via the wireless communicator WC, the control signals CS21 and CS22 received from the operating device 4 via the wireless communicator WC. In the first mode, the derailleur FD is configured to change a gear position of the derailleur FD based on the control signals CS21 and CS22 received from the operating device 4 via the wireless communicator WC. However, the derailleur FD can be configured to receive the control signals from the operating device 4 if needed and/or desired.

The electronic controller 104 is configured to change a mode of the wireless communicator WC from the first mode to the second mode if the wireless communicator WC does not recognize any one of the control signals CS11, CS12, CS21, and CS22 for a determination time.

The electronic controller 104 is configured to change the mode of the wireless communicator WC from the second mode to the first mode if the wireless communicator WC recognize one of the control signals CS11, CS12, CS21, and CS22 in the second mode. For example, the electronic controller 104 is configured to control electricity to be supplied from the electric power source 36 to the signal transmitting circuit of the wireless communicator WC if the wireless communicator WC receives a wireless signal in the second mode. The electronic controller 104 can be configured to change the mode of the wireless communicator WC from the second mode to the first mode if the electronic controller 104 receives a signal from a wake-up sensor for a determination time. The wake-up sensor is configured to detect motion of the bicycle 2. Examples of the wake-up sensor include an acceleration sensor and a vibration sensor. The electronic controller 104 can be configured to change the mode of the wireless communicator WC from the first mode to the second mode if the electronic controller 104 does not receive a signal from the wake-up sensor for the determination time.

The informing device 110 is configured to inform the user of information relating to the derailleur RD. The informing device 110 includes an indicator configured to indicate the information. For example, the indicator includes a light emitting diode. The information includes at least one of a state of the derailleur RD, a state of the motor unit 32, a state of the electric power source 36, a state of the electric motor 54, a state of the electronic controller 104, and a state of the communicator 108. The informing device 110 can be omitted from the motor unit 32 if needed and/or desired. The informing device 110 can include other devices such as a speaker instead of or in addition to the indicator if needed and/or desired.

The electric switch SW is configured to receive a user input from the user. The electric switch SW is configured to be activated in response to the user input. The electric switch SW is electrically connected to the electronic controller 104.

The electronic controller 104 is configured to recognize the activation of the electric switch SW. The user input includes a normal press, a long press, and a double click of the electric switch SW. The electric switch SW is configured to recognize the normal press, the long press, and the double click of the electric switch SW. For example, the normal press indicates a change in modes of the derailleur RD, a temporary shifting operation of the derailleur RD during maintenance, or a wake-up of the wireless communicator WC. The long press indicates a power-ON or OFF of the derailleur RD or a pairing mode in which the wireless communicator WC is paired with another wireless communicator of another device such as the operating devices 3 and 4 and the derailleur FD. The electric switch SW can be omitted from the motor unit 32 if needed and/or desired.

The electronic controller 104 is electrically connected to the detector 102 to receive a detection result of the detector 102. The electronic controller 104 is configured to monitor a current gear position of the derailleur RD based on the detection result of the detector 102. The electronic controller 104 is configured to store the current gear position in the memory 104M.

The torque limiter 60 allows the output member 56 to rotate in the state where the external torque ET is equal to or higher than the external torque threshold. Thus, the movable member 14 can be unintentionally moved by the external force EF caused by the physical contact between the obstacle and at least one of the movable member 14 and the linkage 16. The motor unit 32 is configured to automatically return the movable member 14 to a previous gear position which is a position before the movable member 14 is moved by the external force EF.

The electronic controller 104 is configured to periodically monitor the current gear position based on the detection result of the detector 102. The electronic controller 104 is configured to periodically determine, based on the detection result of the detector 102, whether the movable member 14 is moved from the current gear position by the external force EF. The electronic controller 104 is configured to conclude that the movable member 14 is moved from the current gear position by the external force EF if the detection result of the detector 102 indicates that the movable member 14 is moved while the electronic controller 104 does not receive the control signals CS11 and CS12 generated by the operating device 3.

If the electronic controller 104 concludes that the movable member 14 is moved from the current gear position by the external force EF, the electronic controller 104 controls the electric motor 54 to return the movable member 14 to the previous gear position. The electronic controller 104 is configured to control the informing device 110 to inform the user that the movable member 14 is moved by the external force EF.

Second Embodiment

A bicycle component or derailleur RD2 in accordance with a second embodiment will be described below referring to FIGS. 23 to 40. The bicycle component or derailleur RD2 has the same structure and/or configuration as those of the electric component or derailleur RD except for the motor unit 32. Thus, elements having substantially the same function as those in the first embodiment will be numbered the same here and will not be described and/or illustrated again in detail here for the sake of brevity.

Figure 23:
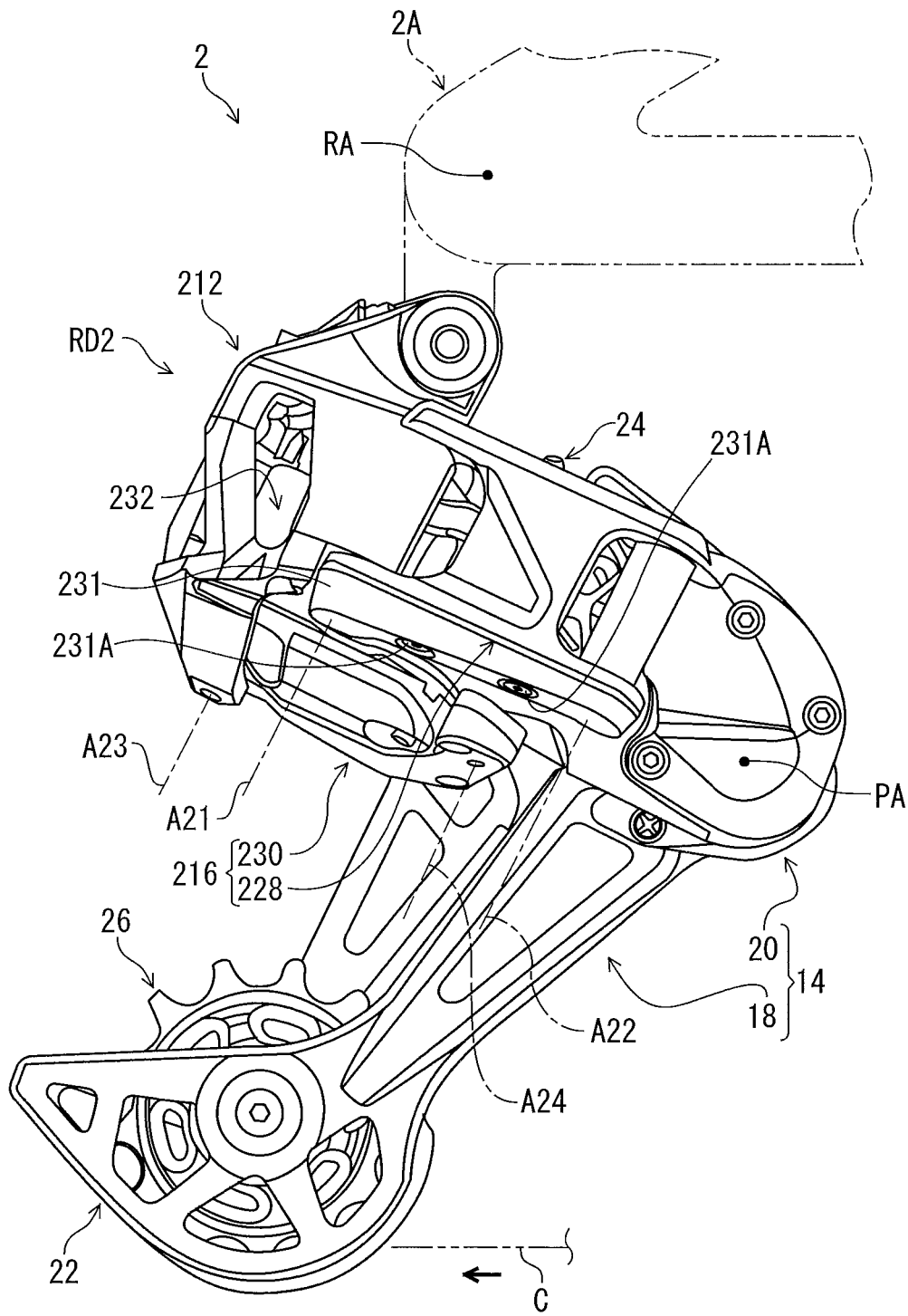
FIG. 23 is a side elevational view of a derailleur in accordance with a second embodiment.
Figure 24:
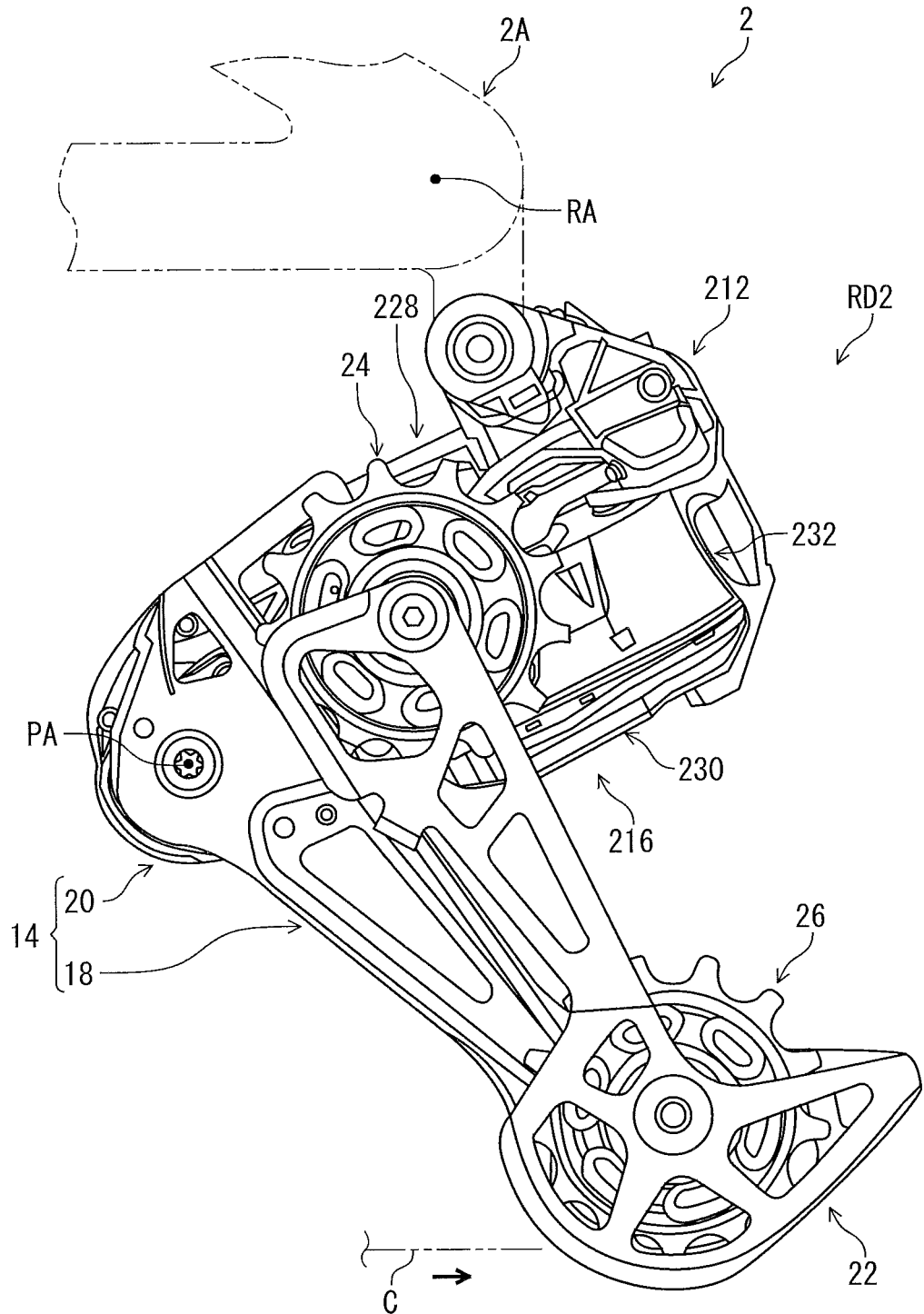
FIG. 24 is a side elevational view of the derailleur illustrated in FIG. 23.

As seen in FIGS. 23 and 24, the derailleur RD2 comprises a base member 212, a movable member 14, and a linkage 216. The base member 212 is configured to be coupled to the vehicle body 2A. The movable member 14 is movable relative to the base member 212. The coupling part 20 is movably coupled to the base member 212 via the linkage 216.

As seen in FIG. 23, the linkage 216 movably couples the base member 212 and the movable member 14. The linkage 216 movably couples the base member 212 and the coupling part 20. In the present embodiment, the linkage 216 includes an outer link 228 and an inner link 230. The outer link 228 is pivotally coupled to the base member 212 about a first pivot axis A21. The outer link 228 is pivotally coupled to the movable member 14 about a second pivot axis A22. The inner link 230 is pivotally coupled to the base member 212 about a third pivot axis A23. The inner link 230 is pivotally coupled to the movable member 14 about a fourth pivot axis A24. The first to fourth pivot axes A21 to A24 are parallel to each other. However, one of the outer link 228 and the inner link 230 can be omitted from the linkage 216 if needed and/or desired. The structure of the linkage 216 is not limited to the above structure. At least one of the first to fourth pivot axes A21 to A24 can be non-parallel to another of the first to fourth pivot axes A21 to A24.

The derailleur RD2 comprises a bumper 231. The bumper 231 is a separate member from the linkage 216. The bumper 231 is a separate member from the outer link 228 and the inner link 230. The bumper 231 is detachably and reattachably attached to the linkage 216 with bumper fasteners 231A. The bumper 231 is detachably and reattachably attached to the outer link 228 of the linkage 216 with the bumper fasteners 231A. The bumper 231 is attached to the outer link 228 to reduce contacts between the outer link 228 and obstacles. However, the bumper 231 can be omitted from the derailleur RD2 if needed and/or desired.

Figure 25:
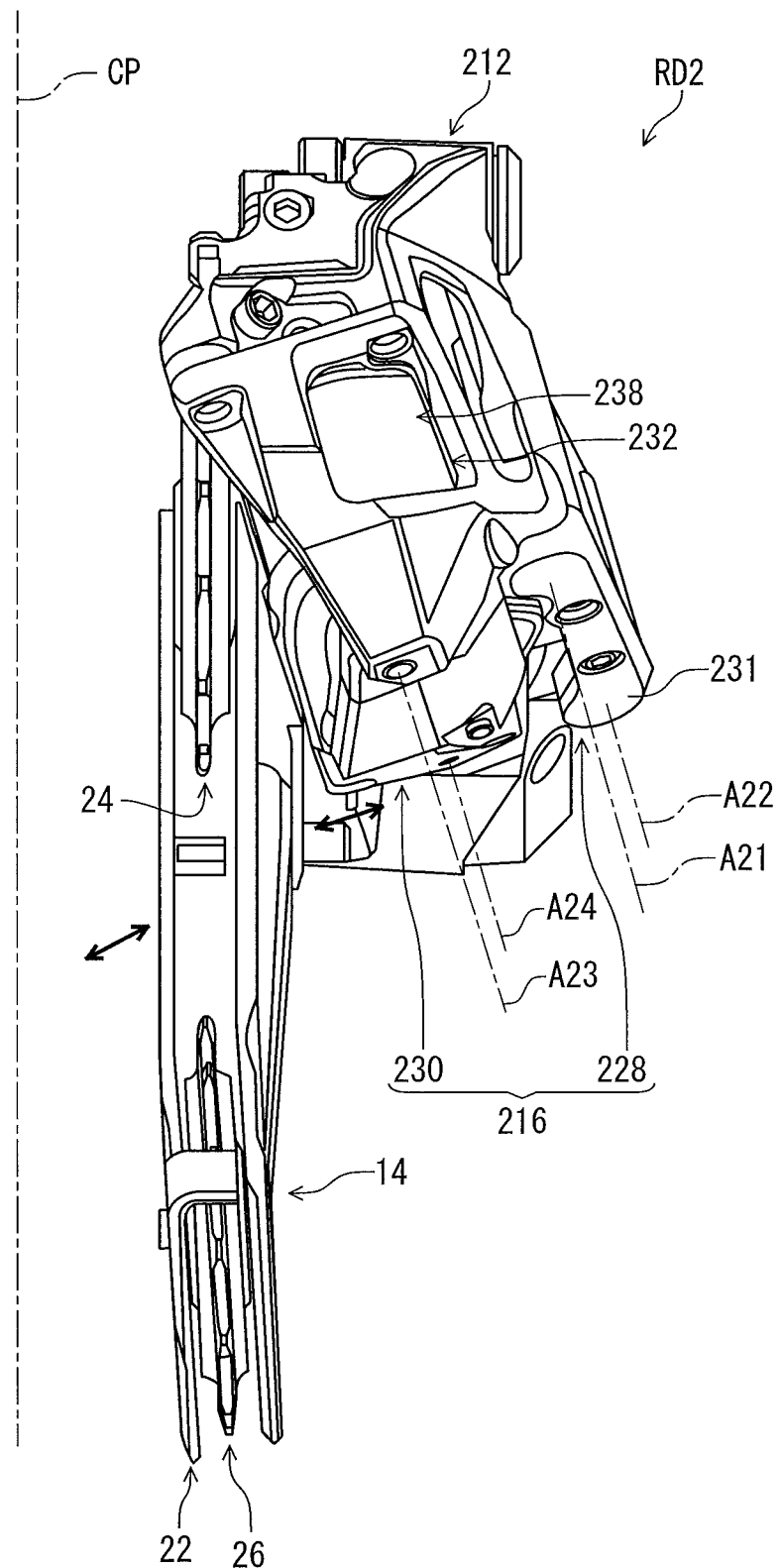
FIG. 25 is a rear view of the derailleur illustrated in FIG. 23.

As seen in FIG. 25, the inner link 230 is at least partially provided between the outer link 228 and the transverse center plane CP of the bicycle 2.

The derailleur RD comprises a motor unit 232. The motor unit 232 is configured to move at least one of the movable member 14 and the linkage 216 relative to the base member 212. In the present embodiment, the motor unit 232 is coupled to the linkage 216 to move the movable member 14 via the linkage 216. The motor unit 232 is configured to generate an actuation force and coupled to the linkage 216 to transmit the actuation force to the linkage 216. However, the motor unit 232 can be directly coupled to the movable member 14 to move the movable member 14 relative to the base member 212 if needed and/or desired. The motor unit 232 can be configured to transmit the actuation force to the movable member 14 if needed and/or desired.

In the second embodiment, as seen in FIGS. 23 to 25, the derailleur RD2 does not include a power-supply attachment structure to which an electric power source is to be attached. As with the derailleur RD of the first embodiment, however, the derailleur RD2 can include a power-supply attachment structure to which an electric power source is to be attached if needed and/or desired.

Figure 26:
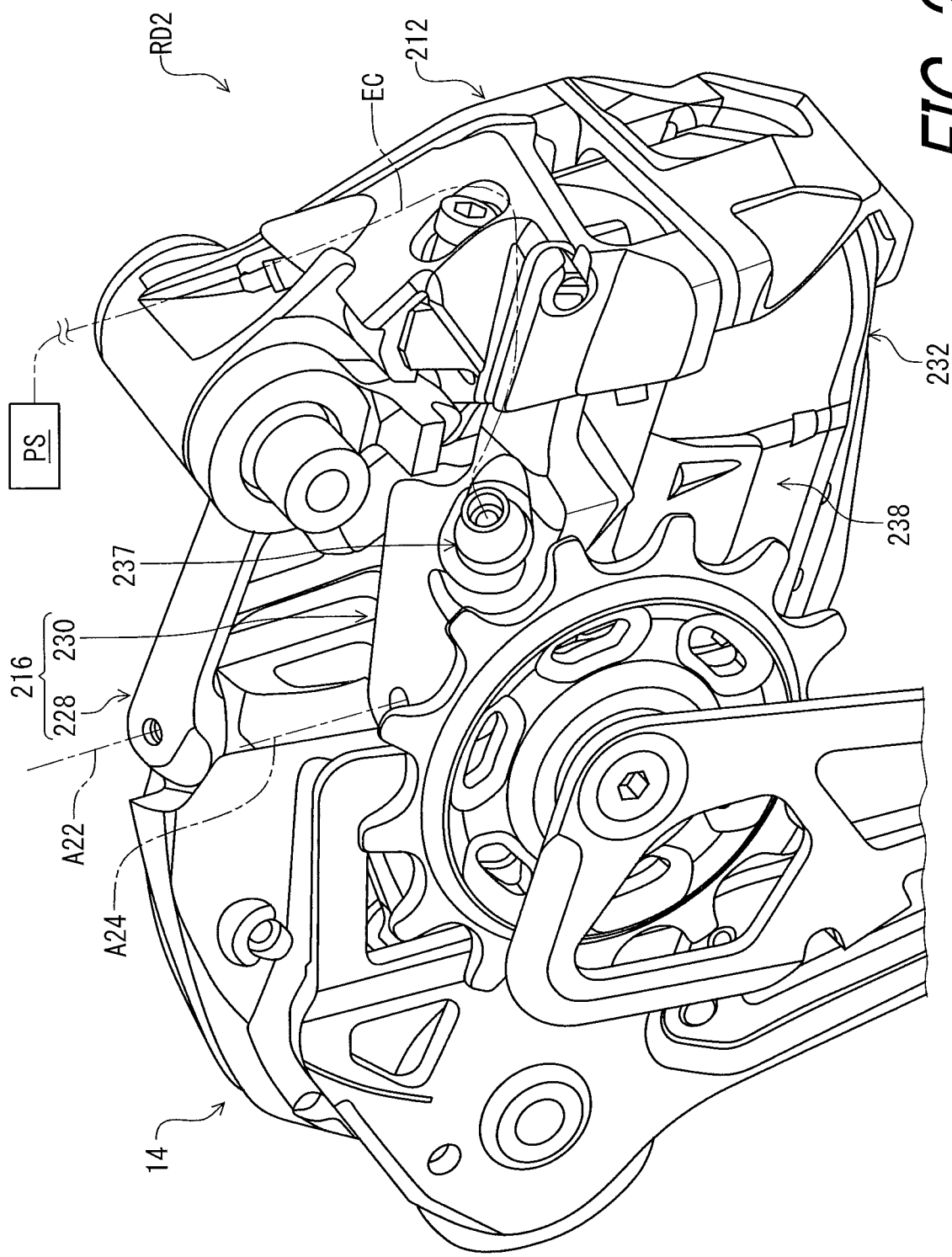
FIG. 26 is a perspective view of the derailleur illustrated in FIG. 23.

As seen in FIG. 26, the motor unit 232 includes an electric connector 237 to which an electric cable EC is to be detachably connected. The motor unit 232 is configured to be electrically connected to an electric power source PS via the electric connector 237 and the electric cable EC. For example, the electric power source PS is mounted to the vehicle body 2A.

The motor unit 232 is provided at one of the base member 212, the movable member 14, and the linkage 216. The motor unit 232 is provided at one of the base member 212 and the linkage 216. In the present embodiment, the motor unit 232 is provided at the linkage 216. The motor unit 232 is provided at the inner link 230. However, the motor unit 232 can be provided at one of the movable member 14 and the linkage 216 if needed and/or desired. The motor unit 232 can be provided at the outer link 228 of the linkage 216 if needed and/or desired.

Figure 27:
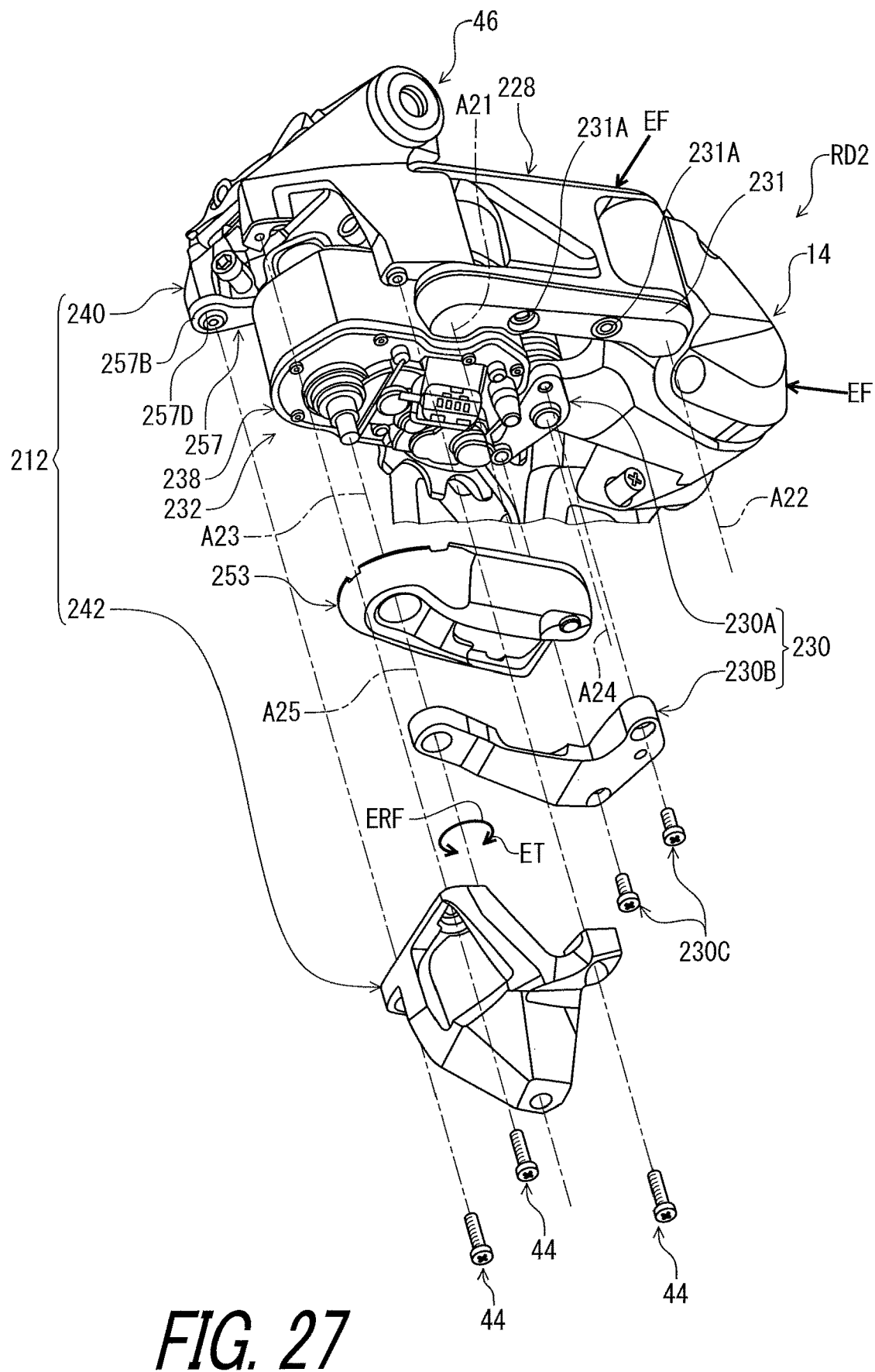
FIG. 27 is an exploded perspective view of the derailleur illustrated in FIG. 23.

As seen in FIG. 27, the motor unit 232 includes a housing 238. The housing 238 is a separate member from the base member 212. However, the housing 238 can be at least partially provided integrally with the base member 212 as a one-piece unitary member.

The base member 212 includes a first base body 240, a second base body 242, and the fasteners 44. The first base body 240 is configured to be coupled to the vehicle body 2A with the derailleur fastener 46. The second base body 242 is a separate member from the first base body 240. The second base body 242 is fastened to the first base body 240 with the fasteners 44 such as screws. The motor unit 232 is provided between the first base body 240 and the second base body 242. The housing 238 of the motor unit 232 is provided between the first base body 240 and the second base body 242.

Figure 28:
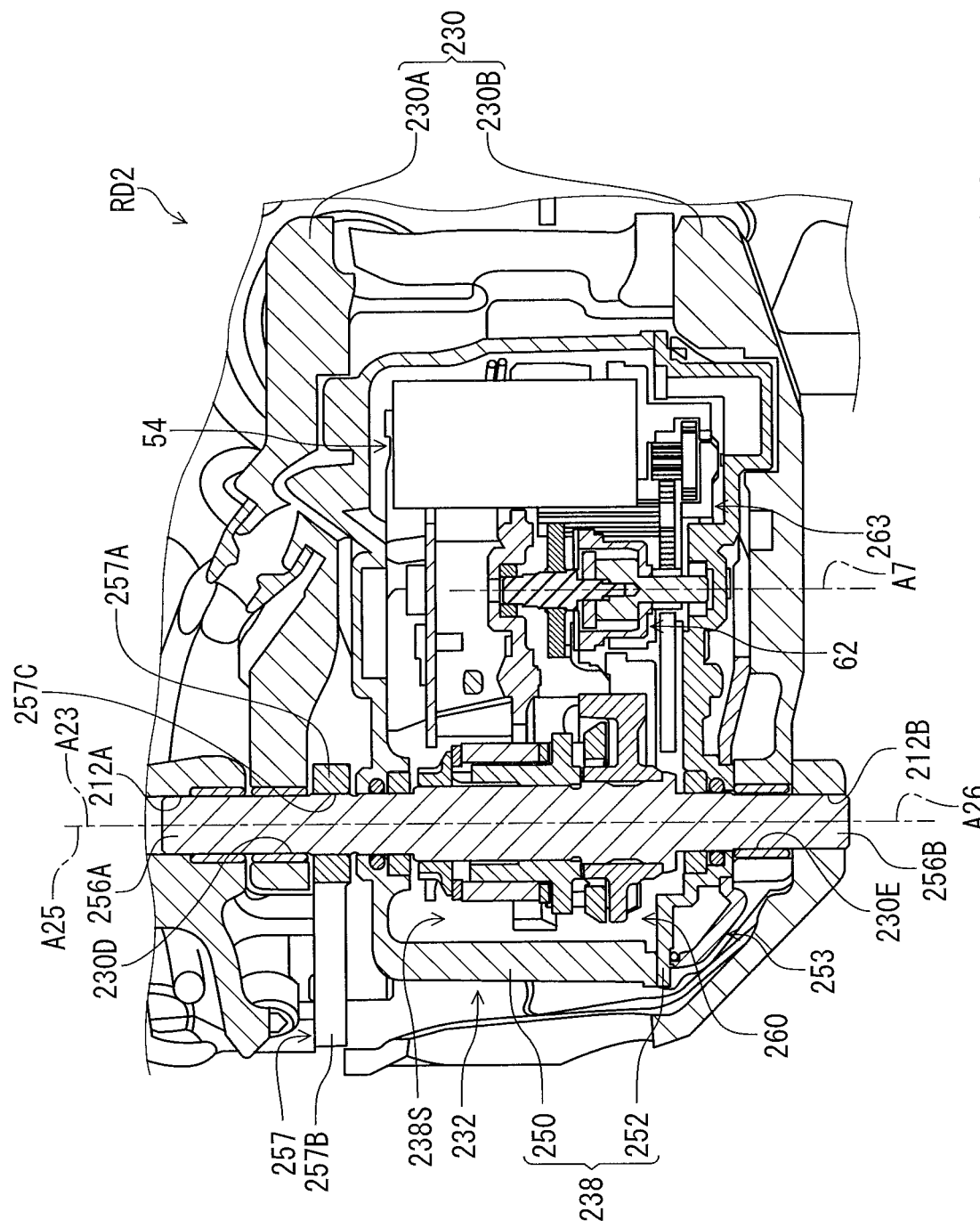
FIG. 28 is a cross-sectional view of the derailleur illustrated in FIG. 23.

As seen in FIG. 28, the housing 238 includes a first housing 250 and a second housing 252. The housing 238 includes an internal space 238S. The first housing 250 and the second housing 252 define the internal space 238S between the first housing 250 and the second housing 252. The second housing 252 is secured to the first housing 250 with fasteners, for example. The second housing 252 is a separate member from the first housing 250. However, the second housing 252 can be integrally provided with the first housing 250 as a one-piece unitary member if needed and/or desired.

Figure 29:
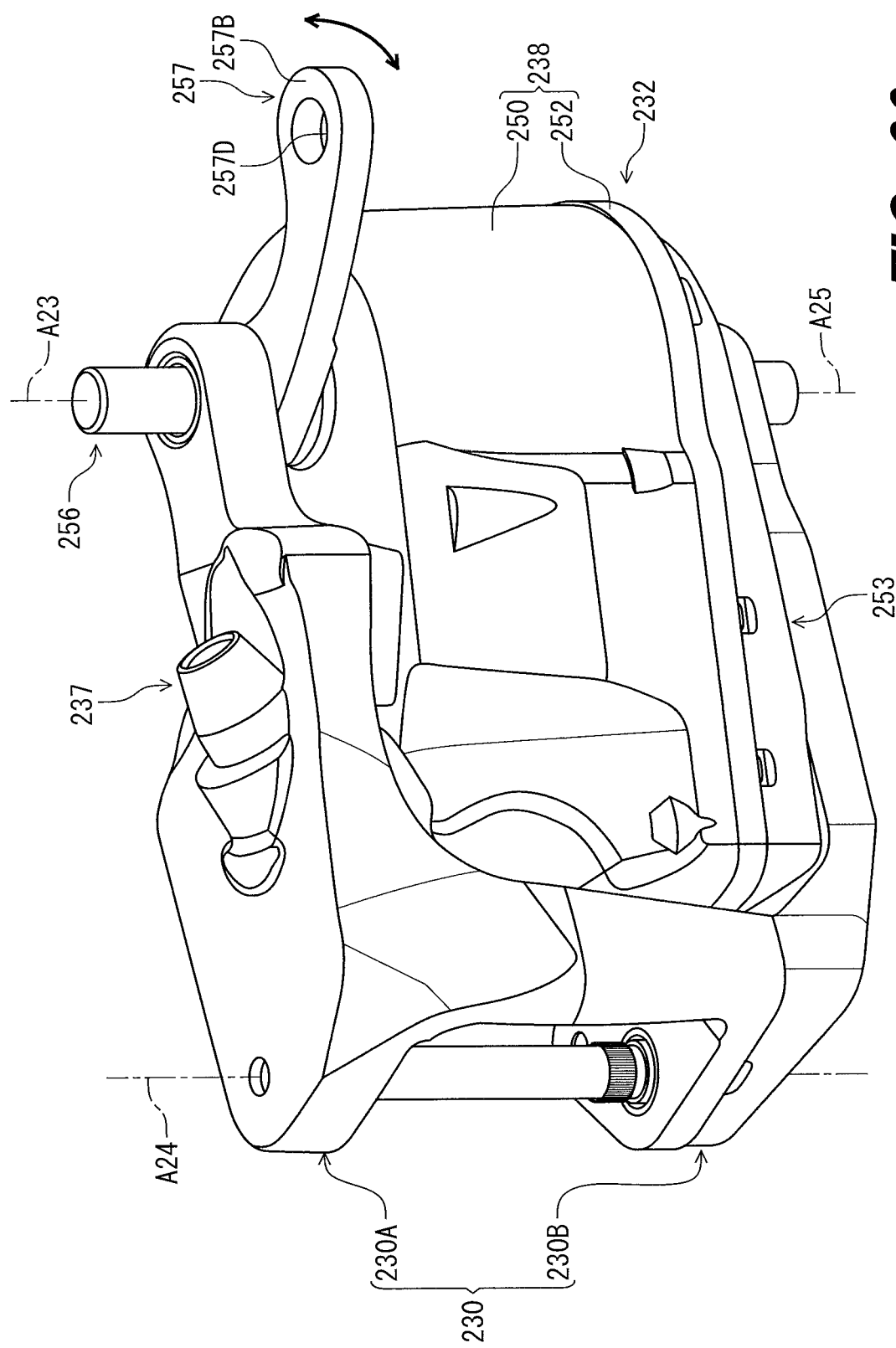
FIG. 29 is a perspective view of an inner link and a motor unit of the derailleur illustrated in FIG. 23.

As seen in FIGS. 27 and 29, the inner link 230 includes a first inner link body 230A, a second inner link body 230B, and fasteners 230C. The second inner link body 230B is secured to the first inner link body 230A with the fasteners 230C. The motor unit 232 includes a cover 253. The cover 253 is held between the housing 238 and the second inner link body 230B.

As seen in FIGS. 28 and 29, the motor unit 232 is at least partially provided between the first inner link body 230A and the second inner link body 230B. The housing 238 is at least partially provided between the first inner link body 230A and the second inner link body 230B. In the present embodiment, the motor unit 232 is partially provided between the first inner link body 230A and the second inner link body 230B. The housing 238 is partially provided between the first inner link body 230A and the second inner link body 230B. However, the motor unit 232 can be entirely provided between the first inner link body 230A and the second inner link body 230B if needed and/or desired. The housing 238 can be entirely provided between the first inner link body 230A and the second inner link body 230B if needed and/or desired.

Figure 30:
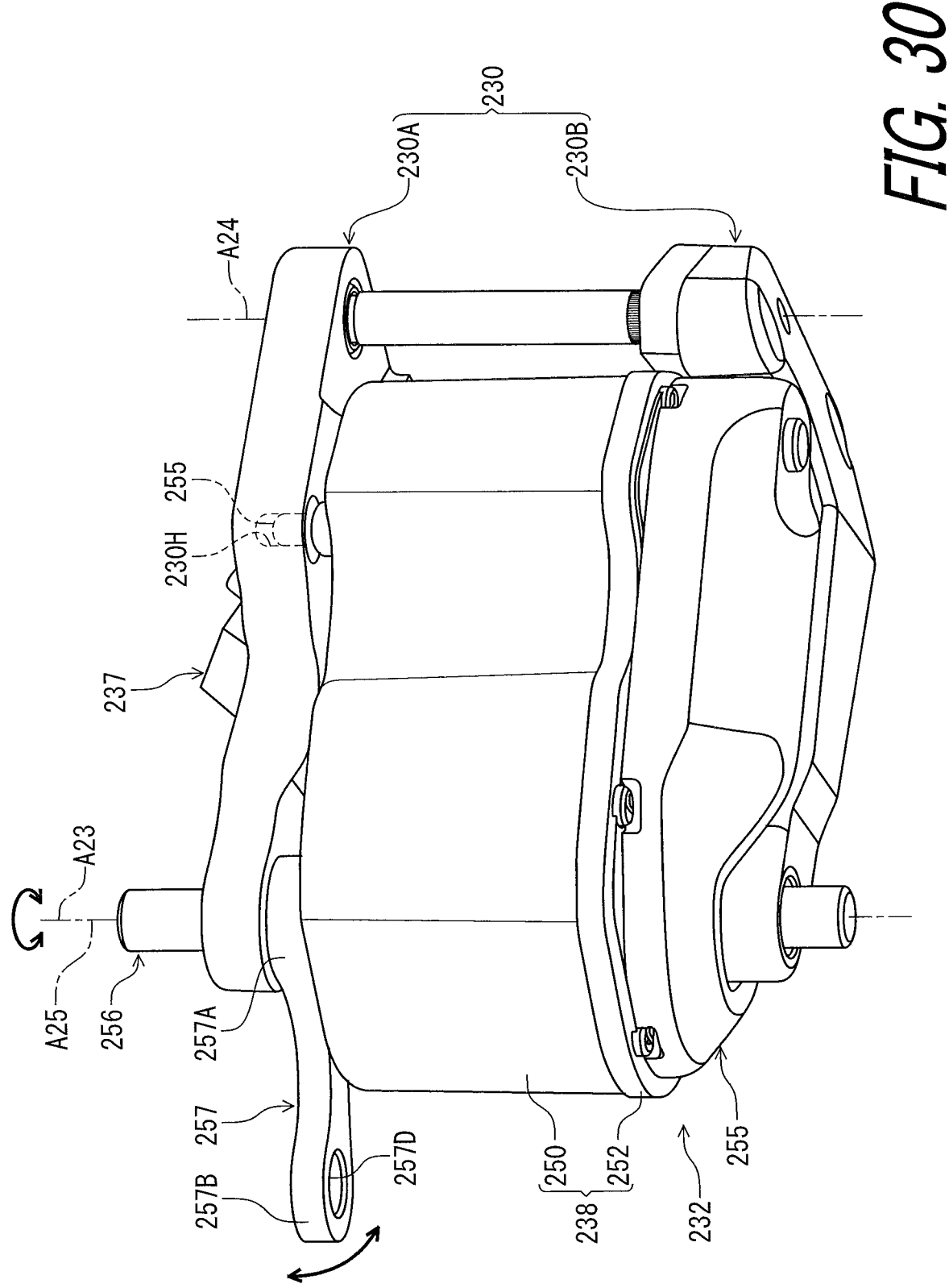
FIG. 30 is a perspective view of the inner link and the motor unit of the derailleur illustrated in FIG. 23.

As seen in FIG. 30, the housing 238 includes a positioning projection 255. The positioning projection 255 protrudes from the first housing 250. The first inner link body 230A includes a positioning hole 230H. The positioning projection 255 is at least partially provided in the positioning hole 230H.

Figure 31:
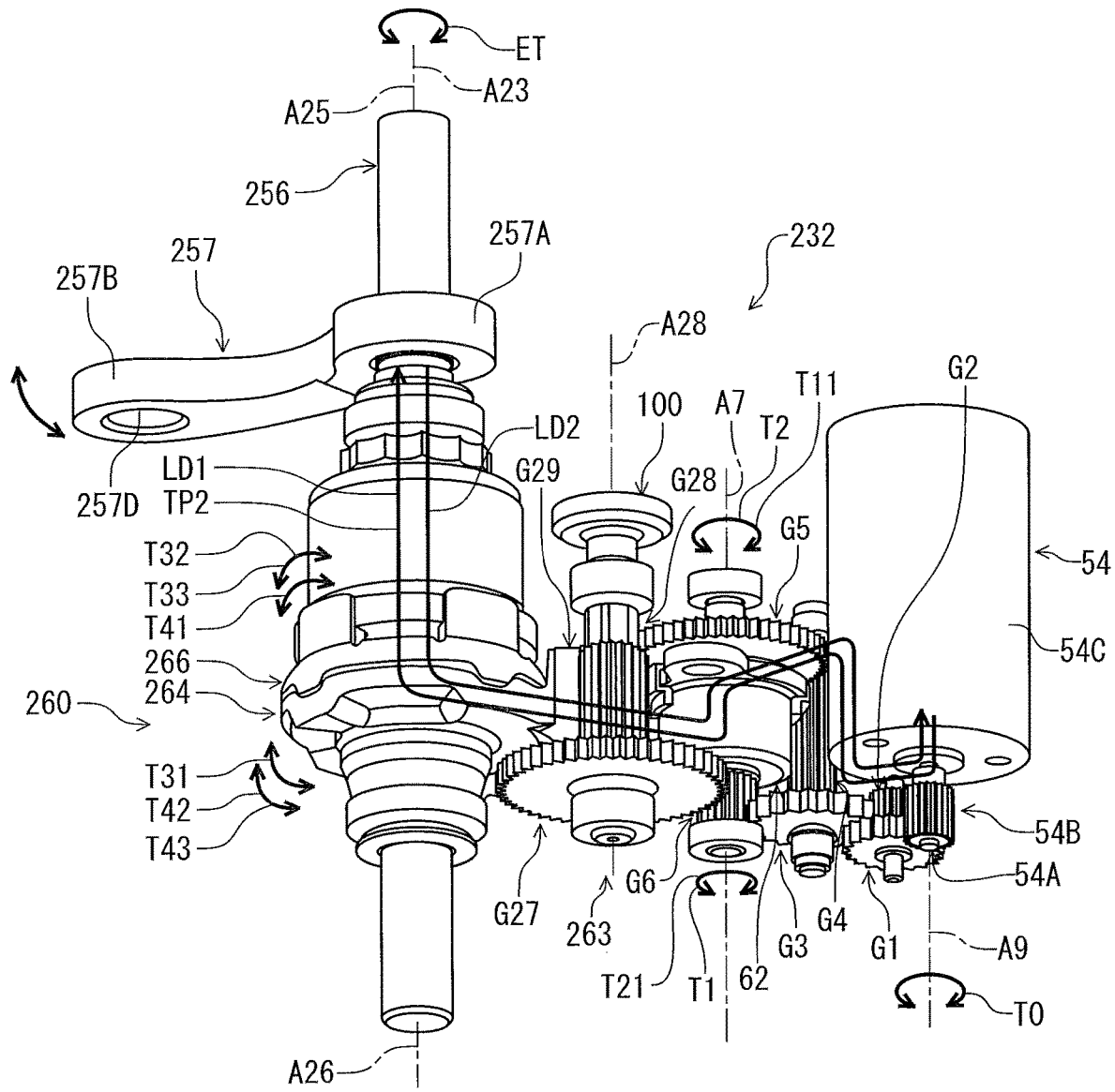
FIG. 31 is a perspective view of the internal structure of the motor unit of the derailleur illustrated in FIG. 23.

As seen in FIG. 31, the motor unit 232 for the bicycle component RD2 comprises the electric motor 54. The electric motor 54 is configured to generate the actuation force using electricity supplied from the electric power source PS via the electric cable EC (see e.g., FIG. 26). The electric motor 54 is provided in the internal space 238S (see e.g., FIG. 28) of the housing 238. The electric motor 54 is provided between the first housing 250 and the second housing 252.

The motor unit 232 for the bicycle component RD2 comprises an output member 256. The electric motor 54 is coupled to the output member 256 to rotate the output member 256 relative to the housing 238 about an output rotational axis A25. The output member 256 extends along the output rotational axis A25.

As seen in FIG. 28, the output member 256 includes a first end 256A and a second end 256B. The output member 256 extends along the output rotational axis A25 between the first end 256A and the second end 256B. The base member 212 includes a first support hole 212A and a second support hole 212B. The first end 256A is provided in the first support hole 212A. The second end 256B is provided in the second support hole 212B. The output member 256 is rotatable relative to the base member 212 about the output rotational axis A25.

The inner link 230 includes a first hole 230D and a second hole 230E. The first inner link body 230A includes the first hole 230D. The second inner link body 230B includes the second hole 230E. The output member 256 extends through the first hole 230D and the second hole 230E. The inner link 230 is rotatably supported by the output member 256 about the output rotational axis A25. Thus, the output rotational axis A25 is coincident with the third pivot axis A23. The output member 256 is rotatable relative to the housing 238 about the third pivot axis A23. However, the output rotational axis A25 can be offset from the third pivot axis A23 if needed and/or desired.

As seen in FIG. 30, the output member 256 is spaced apart from the positioning projection 255 of the housing 238. The positioning projection 255 is coupled to the housing 238 to restrict the housing 238 from rotating relative to the inner link 230 about the output rotational axis A25. Thus, the housing 238 is integrally provided with the inner link 230 as a single unit. As seen in FIG. 25, the inner link 230 and the motor unit 232 are movable together relative to the base member 212 and the movable member 14. The inner link 230 and the motor unit 232 are pivotable together relative to the base member 212 about the third pivot axis A23. The inner link 230 and the motor unit 232 are pivotable together relative to the movable member 14 about the fourth pivot axis A24.

As seen in FIG. 31, the motor unit 32 includes a coupling arm 257. The coupling arm 257 is coupled to the output member 256 to rotate along with the output member 256 relative to the housing 238 about the output rotational axis A25. The coupling arm 257 includes a first arm end 257A and a second arm end 257B. The coupling arm 257 extends between the first arm end 257A and the second arm end 257B. The first arm end 257A is coupled to the output member 256.

Figure 32:
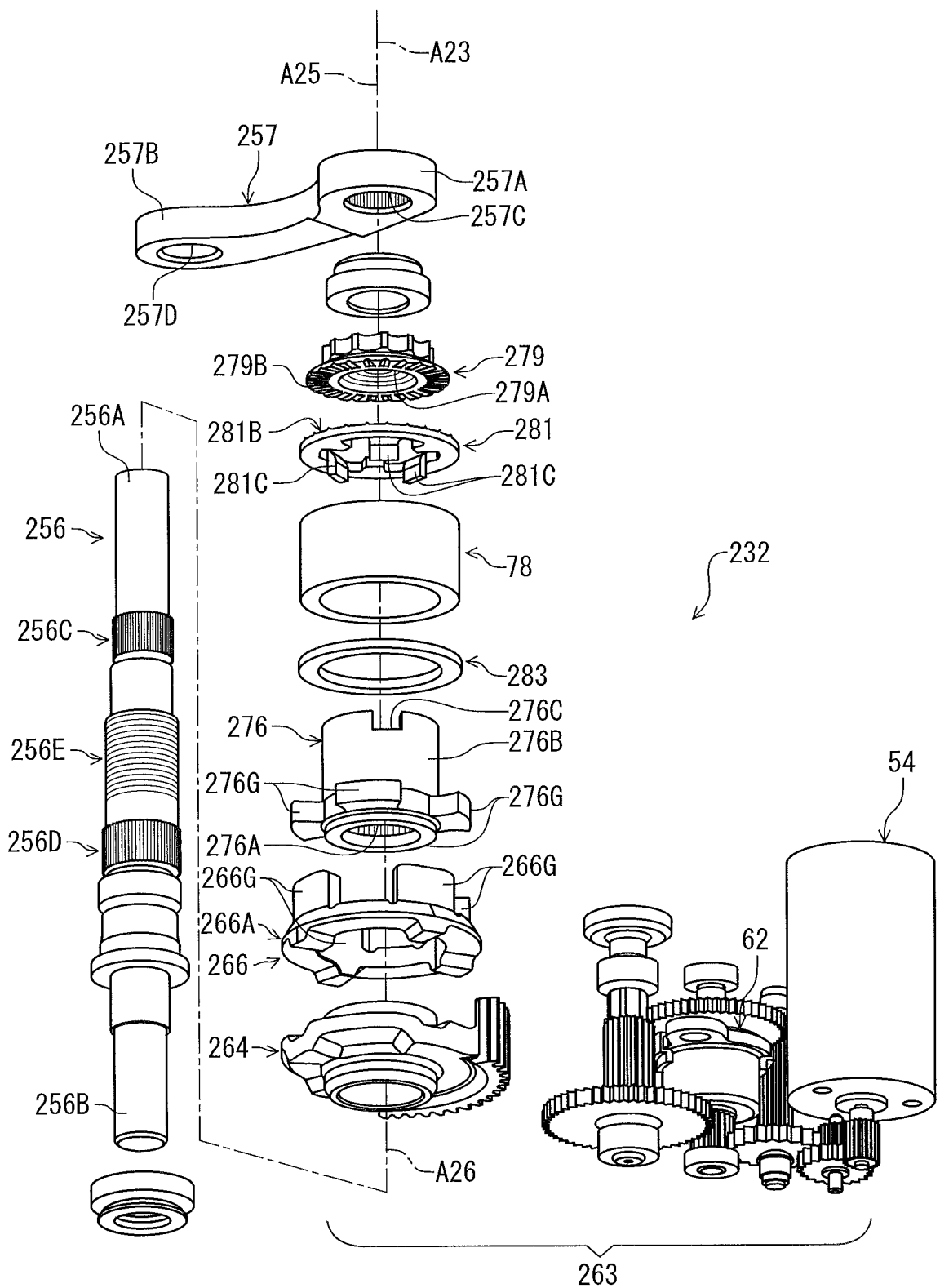
FIG. 32 is an exploded perspective view of the internal structure of the motor unit of the derailleur illustrated in FIG. 23.

As seen in FIG. 32, the first arm end 257A includes a splined hole 257C. The output member 256 includes a splined part 256C. The splined part 256C of the output member 256 meshes with the splined hole 257C of the first arm end 257A. The splined part 256C is fastened to the splined hole 257C with a fastening structure such as press-fitting and an adhesive agent. Thus, the coupling arm 257 is fastened to the output member 256 via the splined part 256C and the splined hole 257C. The coupling arm 257 is coupled to the output member 256 to rotate relative to the inner link 230 and the housing 238 along with the output member 256 about the output rotational axis A25.

As seen in FIGS. 29 and 30, the output member 256 is rotated relative to the housing 238 about the output rotational axis A25 in response to the actuation force generated by the motor unit 232. Thus, the coupling arm 257 is rotated relative to the housing 238 about the output rotational axis A25 in response to the actuation force generated by the motor unit 232.

As seen in FIG. 31, the second arm end 257B includes a coupling hole 257D. As seen in FIG. 27, the second arm end 257B is coupled to the first base body 240 of the base member 212. The first base body 240 is partially provided in the coupling hole 257D of the second arm end 257B. As seen in FIG. 28, the first arm end 257A is coupled to the base member 212 via the output member 256. Thus, the coupling arm 257 is coupled to the base member 212 to be stationary relative to the base member 212. The inner link 230 and the motor unit 232 are pivoted relative to the base member 212 about the third pivot axis A23 in response to the actuation force generated by the motor unit 232.

As seen in FIG. 27, the external force EF is applied to at least one of the movable member 14 and the linkage 216 in response to a physical contact between an obstacle and the at least one of the movable member 14 and the linkage 216. Thus, the external rotational force ERF having external torque ET is applied to the output member 256 via the linkage 216 in response to the external force EF. It is preferable to restrict the external torque ET from being transmitted from at least one of the movable member 14 and the linkage 216 to the electric motor 54 (see e.g., FIG. 31).

As seen in FIG. 31, the motor unit 232 for the bicycle component RD2 comprises a torque limiter 260 and the transmitting structure 62. The torque limiter 260 is configured to protect the electric motor 54 from damage caused by the external force EF while allowing a necessary force to be transmitted from the electric motor 54 to at least one of the movable member 14 and the linkage 216. The transmitting structure 62 is configured to protect the electric motor 54 from damage caused by the external force EF while allowing the actuation force generated by the electric motor 54 to be transmitted to at least one of the movable member 14 and the linkage 216. The torque limiter 260 has a structure different from a structure of the transmitting structure 62.

The torque limiter 260 and the transmitting structure 62 are provided between the electric motor 54 and the output member 256 on a power transmission path TP2 provided from the electric motor 54 to the output member 256. The transmitting structure 62 is provided between the electric motor 54 and the torque limiter 260 on the power transmission path TP2 provided from the electric motor 54 to the output member 256. The torque limiter 260 is provided between the transmitting structure 62 and the output member 256 on the power transmission path TP2. The power transmission path TP2 is defined from the electric motor 54 to the output member 256 through the transmitting structure 62 and the torque limiter 260.

The torque limiter 260 and the transmitting structure 62 are configured to transmit the actuation force generated by the electric motor 54 to at least one of the movable member 14 and the linkage 216. For example, the torque limiter 260 is configured to transmit the actuation force to the movable member 14 via the linkage 216 in a normal state where the movable member 14 is movable in response to the actuation force transmitted via the torque limiter 260. However, the torque limiter 260 is configured to restrict the actuation force from being transmitted to the movable member 14 via the linkage 216 in an abnormal state where at least one of the movable member 14 and the linkage 216 is jammed due to foreign matters. The torque limiter 260 is configured to block the actuation force in the abnormal state. The torque limiter 260 is configured to restricting a force from being transmitted from one of the movable member 14 and the linkage 216 to the transmitting structure 62. The transmitting structure 62 is configured to restricting a force from being transmitted from the torque limiter 260 to the electric motor 54.

The motor unit 232 further comprises a speed reducer 263. The speed reducer 263 couples the electric motor 54 and the output member 256 to transmit the output torque TO of the electric motor 54 to the output member 256. The speed reducer 263 has substantially the same structure as the structure of the speed reducer 63.

In the present embodiment, the speed reducer 263 includes the torque limiter 260 and the transmitting structure 62. However, one of the torque limiter 260 and the transmitting structure 62 can be omitted from the speed reducer 263 if needed and/or desired. The speed reducer 263 can include structures other than the torque limiter 260 and the transmitting structure 62 in additional to the torque limiter 260 and the transmitting structure 62 if needed and/or desired.

As seen in FIG. 31, the electric motor 54 is coupled to the transmitting structure 62. The electric motor 54 is coupled to the transmitting structure 62 via at least one gear. The speed reducer 263 includes the gears G1, G2, G3, G4, and G5. Namely, the motor unit 232 includes the gears G1 to G5.

The transmitting structure 62 is coupled to the torque limiter 260. The transmitting structure 62 is coupled to the torque limiter 260 via at least one gear. The speed reducer 263 includes gears G6, G27, G28, and G29. Namely, the motor unit 232 further comprises the gear G29. The transmitting structure 62 is coupled to the torque limiter 260 via the gears G6, G27, G28, and G29. The gear G6 is coupled to the transmitting structure 62 to receive a rotational force from the transmitting structure 62. The gear G27 meshes with the gear G6. The gear G28 is rotatable along with the gear G27. The gear G28 meshes with the gear G29. The gear G29 is coupled to the torque limiter 260 to transmit a rotational force between the torque limiter 260 and the gear G29.

As seen in FIG. 31, the transmitting structure 62 is configured to transmit the first torque T1 in the first load direction LD1 defined from the electric motor 54 to the output member 256. The transmitting structure 62 is configured to transmit the first torque T1 in the first load direction LD1 defined from the output shaft 54A to the output member 256. The transmitting structure 62 is configured to transmit the first torque T1 to the torque limiter 260 in a state where first input torque T11 is applied to the transmitting structure 62 from a device other than the torque limiter 260.

The transmitting structure 62 is configured to receive the first input torque T11 from the electric motor 54 via the gear G5 in the first load direction LD1. The transmitting structure 62 is configured to transmit the first torque T1 to the gear G6 in the first load direction LD1.

The transmitting structure 62 is configured to transmit the second torque T2 in the second load direction LD2 defined from the output member 256 to the electric motor 54. The transmitting structure 62 is configured to transmit the second torque T2 in the second load direction LD2 defined from the output member 256 to the output shaft 54A. The transmitting structure 62 is configured to transmit the second torque T2 in the state where the second input torque T21 is applied from the torque limiter 260 to the transmitting structure 62.

The transmitting structure 62 is configured to receive the second input torque T21 from the torque limiter 260 via the gear G6 in the second load direction LD2. The transmitting structure 62 is configured to transmit the second torque T2 to the gear G5 in the second load direction LD2.

In the present embodiment, the second torque T2 is lower than the second input torque T12. The second torque T2 can include zero. The second torque T2 can be zero. The transmitting structure 62 is configured to reduce the second input torque T21 to the second torque T2 in the second load direction LD2. The transmitting structure 62 is configured to restrict the second input torque T21 from being transmitted to the gear G5 via the transmitting structure 62 in the second load direction LD2. However, the second torque T2 can be higher than zero if needed and/or desired.

The first torque T1 is higher than the second torque T2. In other words, the second torque T2 transmitted via the transmitting structure 62 in the second load direction LD2 is lower than the first torque T1 transmitted via the transmitting structure 62 in the first load direction LD1. However, the first torque T1 can be equal to or lower than the second torque T2 if needed and/or desired.

The torque limiter 260 is configured to receive the third input torque T31 from the gear G29 in the first load direction LD1. The torque limiter 260 is configured to transmit third output torque T32 or the limited output torque T33 to the gear G8 in the first load direction LD1.

The torque limiter 260 is configured to transmit the third output torque T32 which is equal to the third input torque T31 to the gear G8 in the first load direction LD1 in the state where the third input torque T31 is lower than the torque threshold. The torque limiter 260 is configured to transmit the limited output torque T33 which is lower than the third input torque T31 to the gear G8 in the first load direction LD1 in a state where the third input torque T31 is equal to or higher than the torque threshold. The torque limiter 260 is configured to reduce the third input torque T31 to the limited output torque T33 in the state where the third input torque T31 is equal to or higher than the torque threshold.

In the present embodiment, the limited output torque T33 is lower than the torque threshold. The limited output torque T33 can include zero. The limited output torque T33 can be zero or approximately zero. However, the limited output torque T33 can be higher than zero if needed and/or desired.

The torque limiter 260 is configured to receive the third input torque T31 from the electric motor 54 via the transmitting structure 62 and the gears G1 to G6, G27, G28 and G29. The torque threshold is higher than a possible maximum value of the third input torque T31. Thus, the torque limiter 260 is configured to transmit the output torque T33 to the gear G8 when the torque limiter 260 receives the third input torque T31 from the electric motor 54 via the transmitting structure 62 and the gears G1 to G6, G27, G28 and G29.

The torque limiter 260 is configured to receive the fourth input torque T41 from the gear G8 in the second load direction LD2. The torque limiter 260 is configured to transmit the fourth output torque T42 or the limited output torque T43 to the gear G29 in the second load direction LD2.

As seen in FIG. 31, the torque limiter 260 is configured to transmit the fourth output torque T42 which is equal to the fourth input torque T41 to the gear G29 in the second load direction LD2 in a state where the fourth input torque T41 is lower than the torque threshold. The torque limiter 260 is configured to transmit the limited output torque T43 which is lower than the fourth input torque T41 to the gear G29 in the second load direction LD2 in a state where the fourth input torque T41 is equal to or higher than the torque threshold. The torque limiter 260 is configured to reduce the fourth input torque T41 to the limited output torque T43 in the state where the fourth input torque T41 is equal to or higher than the torque threshold.

In the present embodiment, the limited output torque T43 is lower than the fourth output torque T42 and the torque threshold. The limited output torque T43 can include zero. The limited output torque T43 can be zero or approximately zero. The fourth output torque T42 can also be referred to as third torque T42. The limited output torque T43 can also be referred to as fourth torque T43. The third torque T42 is higher than the fourth torque T43. In other words, the fourth torque T43 is lower than the third torque T42. However, the limited output torque T43 can be higher than zero if needed and/or desired.

The fourth input torque T41 is applied to the torque limiter 260 from the output member 256 when the external torque ET is applied to the output member 256 from at least one of the movable member 14 and the linkage 216.

The torque limiter 260 is configured to transmit the third torque T42 in a state where the torque which is input to the torque limiter 260 is lower than the torque threshold. The torque limiter 260 is configured to transmit the third torque T42 in the second load direction LD2 in the state where the fourth input torque T41 is lower than the torque threshold. The torque limiter 260 is configured to transmit the fourth torque T43 in a state where the torque which is input to the torque limiter 260 is equal to or higher than the torque threshold. The torque limiter 260 is configured to transmit the fourth torque T43 in the second load direction LD2 in the state where the fourth input torque T41 is equal to or higher than the torque threshold. In other words, the torque limiter 260 is configured to transmit the third torque T42 in the second load direction LD2 in the state where the external torque ET is lower than the external torque threshold. The torque limiter 260 is configured to transmit the fourth torque T43 in the second load direction LD2 in a state where the external torque ET is equal to or higher than the external torque threshold. The external torque threshold is a standard for determining the external torque ET applied to the output member 256 while the torque threshold is a standard for determining the fourth input torque T41 applied to the torque limiter 260.

As seen in FIG. 31, the torque limiter 260 includes a first member 264 and a second member 266. The first member 264 has substantially the same structure as the structure of the first member 64 of the torque limiter 60 described in the first embodiment. The second member 266 has substantially the same structure as the structure of the second member 66 of the torque limiter 60 described in the second embodiment.

The first member 264 and the second member 266 are movable relative to each other in a state where a torque applied to the torque limiter 260 is equal to or higher than the torque threshold. The first member 264 and the second member 266 are movable together with each other in a state where the torque is lower than the torque threshold. The first member 264 and the second member 266 contact each other to transmit the third torque T42 between the first member 264 and the second member 266 in the state where the torque is lower than the torque threshold. The first member 264 and the second member 266 are configured to transmit the fourth torque T43 between the first member 264 and the second member 266 in the state where the torque is equal to or higher than the torque threshold.

The first member 264 and the second member 266 slidably contacts with each other to transmit the third torque T42 between the first member 264 and the second member 266 in a state where the torque is lower than the torque threshold. The first member 264 and the second member 266 are movable relative to each other in a state where the third input torque T31 applied to the first member 264 is equal to or higher than the torque threshold. The first member 264 is movable relative to the second member 266 in the state where the third input torque T31 applied to the first member 264 is equal to or higher than the torque threshold. The first member 264 and the second member 266 are movable together with each other in a state where the third input torque T31 is lower than the torque threshold.

The first member 264 and the second member 266 are movable relative to each other in a state where the fourth input torque T41 applied to the torque limiter 260 is equal to or higher than the torque threshold. The second member 266 is movable relative to the first member 264 in the state where the fourth input torque T41 applied to the second member 266 is equal to or higher than the torque threshold. The first member 264 and the second member 266 are movable together with each other in a state where the fourth input torque T41 is lower than the torque threshold.

The gear G29 is fastened to the first member 264 to transmit the torque from the transmitting structure 62 to the first member 264. In the present embodiment, the gear G29 is integrally provided with the first member 264 as a one-piece unitary member. However, the gear G29 can be a separate member from the first member 264 if needed and/or desired.

The second member 266 is configured to transmit the third torque T42 to the first member 264 in the second load direction LD2 defined from the output member 256 to the electric motor 54 in a state where the external torque ET which is input to the output member 256 is lower than the external torque threshold. The second member 266 is configured to transmit the fourth torque T43 to the first member 264 in the second load direction LD2 in a state where the external torque ET is equal to or larger than the external torque threshold.

The first member 264 slidably contacts the second member 266 to transmit the third torque T42 between the first member 264 and the second member 266 in the state where the external torque ET which is input to the output member 256 is lower than the external torque threshold. The first member 264 slidably contacts the second member 266 to transmit the fourth torque T43 between the first member 264 and the second member 266 in the state where the external torque ET is equal to or higher than the external torque threshold.

The torque limiter 260 has a limiter rotational axis A26. The first member 264 is rotatable relative to the housing 238 (see e.g., FIG. 28) about the limiter rotational axis A26. The second member 266 is rotatable relative to the housing 238 (see e.g., FIG. 28) about the limiter rotational axis A26. The first member 264 and the second member 266 are rotatable relative to each other about the limiter rotational axis A26 in the state where the torque applied to the torque limiter 260 is equal to or higher than the torque threshold. The first member 264 and the second member 266 are rotatable together with each other about the limiter rotational axis A26 in the state where the torque applied to the torque limiter 260 is lower than the torque threshold.

In the present embodiment, the limiter rotational axis A26 is coincident with the output rotational axis A25 and the third pivot axis A23. However, the limiter rotational axis A26 can be offset from at least one of the output rotational axis A25 and the third pivot axis A23 if needed and/or desired.

As seen in FIG. 32, the torque limiter 260 includes a guide member 276. The guide member 276 is coupled to the output member 256 to guide the second member 266 along the limiter rotational axis A26. The guide member 276 is coupled to the output member 256 to rotate along with the output member 256 about the limiter rotational axis A26. The guide member 276 is movably supported by the output member 256.

The output member 256 includes a splined part 256D. The guide member 276 includes a splined hole 276A. The splined part 256D of the output member 256 meshes with the splined hole 276A of the guide member 276. The splined part 256D is fastened to the splined hole 276A with a fastening structure such as press-fitting and an adhesive agent. Thus, the guide member 276 is fastened to the output member 256 via the splined part 267D and the splined hole 276A. The guide member 276 is fastened to the output member 256 with a fastening structure such as press-fitting and an adhesive agent. The guide member 276 is coupled to the output member 256 to rotate along with the output member 256 about the limiter rotational axis A26.

The guide member 276 includes a guide base 276B and at least one first guide part 276G. The guide base 276B includes the splined hole 276A. The guide base 276B has an annular shape. In the present embodiment, the guide member 276 includes at least two first guide part 276G. The first guide part 276G extends from the guide base 276B along the limiter rotational axis A26. The at least two first guide parts 276G are circumferentially spaced apart from each other about the limiter rotational axis A26.

The second member 266 includes a base part 266A and a second guide part 266G. The base part 266A has an annular shape. In the present embodiment, the second member 266 includes at least two second guide parts 266G. The second guide part 266G extends from the base part 266A along the limiter rotational axis A26. The at least two second guide parts 266G are circumferentially spaced apart from each other about the limiter rotational axis A26.

In the present embodiment, a total number of the first guide parts 276G is three. A total number of the second guide parts 266G is three. However, the total number of the first guide parts 276G is not limited to three. The total number of the second guide parts 266G is not limited to three.

Figure 33:
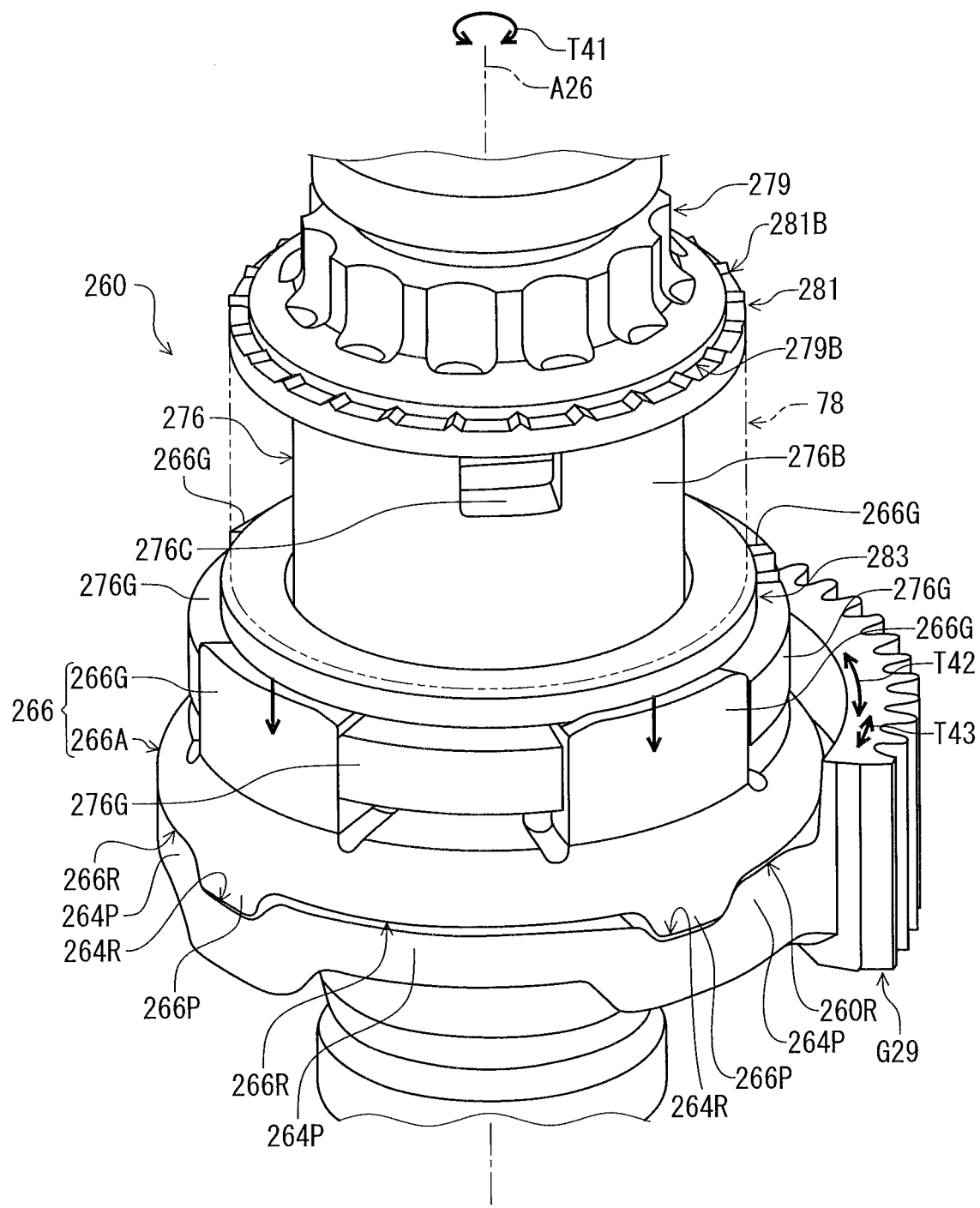
FIG. 33 is a perspective view of a torque limiter of the motor unit of the derailleur illustrated in FIG. 23.

As seen in FIG. 33, the at least two second guide parts 266G are engaged with the at least two first guide parts 276G. The second guide part 266G is circumferentially provided between adjacent two guide parts of the at least two first guide parts 276G. The first guide part 276G is circumferentially provided between adjacent two guide parts of the at least two second guide parts 266G. Thus, the second member 266 is movable relative to the output member 256 and the guide member 276 along the limiter rotational axis A26 without rotating relative to the output member 256.

The torque limiter 260 includes the biasing member 78. The biasing member 78 is configured to bias at least one of the first member 264 and the second member 266 to maintain a contact state between the first member 264 and the second member 266. The biasing member 78 is configured to bias at least one of the first member 264 and the second member 266 to maintain a slidable contact state between the first member 264 and the second member 266. The biasing member 78 is provided between the second member 266 and the guide member 276. The biasing member 78 is provided between the base part 266A and the guide base 276B. The first guide parts 276G and the second guide parts 266G are provided in the biasing member 78.

In the present embodiment, the biasing member 78 includes a coiled wave spring. However, the biasing member 78 can include other members such as a disc spring, a coiled spring, and an elastic member (e.g., rubber) instead of or in addition to the coiled wave spring if needed and/or desired. In FIGS. 31 to 33, the biasing member 78 is depicted in a simplified manner.

As seen in FIG. 32, the motor unit 232 includes an adjustment member 279, a first intermediate member 281, and a second intermediate member 283. The adjustment member 279 is rotatably coupled to the output member 256. The adjustment member 279 is coupled to the output member 256 to change a distance between the adjustment member 279 and the second member 266 in response to rotation of the adjustment member 279 relative to the output member 256 about the limiter rotational axis A26. The adjustment member 279 includes a threaded hole 279A. The output member 256 includes an externally threaded part 256E. The externally threaded part 256E is threadedly engaged with the threaded hole 279A. The externally threaded part 256E and the threaded hole 279A are configured to convert the rotation of the adjustment member 279 to an axial movement of the adjustment member 279 along the limiter rotational axis A26. The biasing member 78 is provided between the adjustment member 279 and the second member 266. Thus, the adjustment member 279 is configured to change the biasing force applied from the biasing member 78 to the second member 266.

The first intermediate member 281 is provided between the adjustment member 279 and the biasing member 78. The first intermediate member 281 is movably coupled to the output member 256 along the limiter rotational axis A26. The first intermediate member 281 contacts the adjustment member 279 to apply rotational resistance to the adjustment member 279. The adjustment member 279 includes a first friction part 279B. The first intermediate member 281 includes a second friction part 281B. The second friction part 281E slidably contacts the first friction part 289B. The first friction part 279B has an annular shape. The second friction part 281B has an annular shape. For example, the first friction part 279B includes at least two recesses. The second friction part 281B includes at least two protrusions. The at least two recesses of the first friction part 279B and the at least two protrusions of the second friction part 281B are configured to generate the rotational resistance between the adjustment member 279 and the first intermediate member 281 and configured to position the adjustment member 279 relative to the first intermediate member 281 in one of at least two rotational positions.

The first intermediate member 281 includes at least two restriction parts 281C. The at least two restriction parts 281C extends from the second friction part 281B toward the guide member 276. The guide base 276B includes at least two restriction recesses 276C. The restriction part 281C is provided in the restriction recess 276C to restrict the first intermediate member 281 from rotating relative to the guide member 276 about the limiter rotational axis A26 while allowing the first intermediate member 281 to move relative to the guide member 276 along the limiter rotational axis A26.

The second intermediate member 283 has an annular shape. The second intermediate member 283 is provided between the biasing member 78 and the second member 266.

As seen in FIG. 33, the second intermediate member 283 is provided between the biasing member 78 and the second guide parts 266G. The second intermediate member 283 contacts the second guide parts 266G. The biasing force of the biasing member 78 is applied to the second member 266 via the second intermediate member 283.

Figure 34:
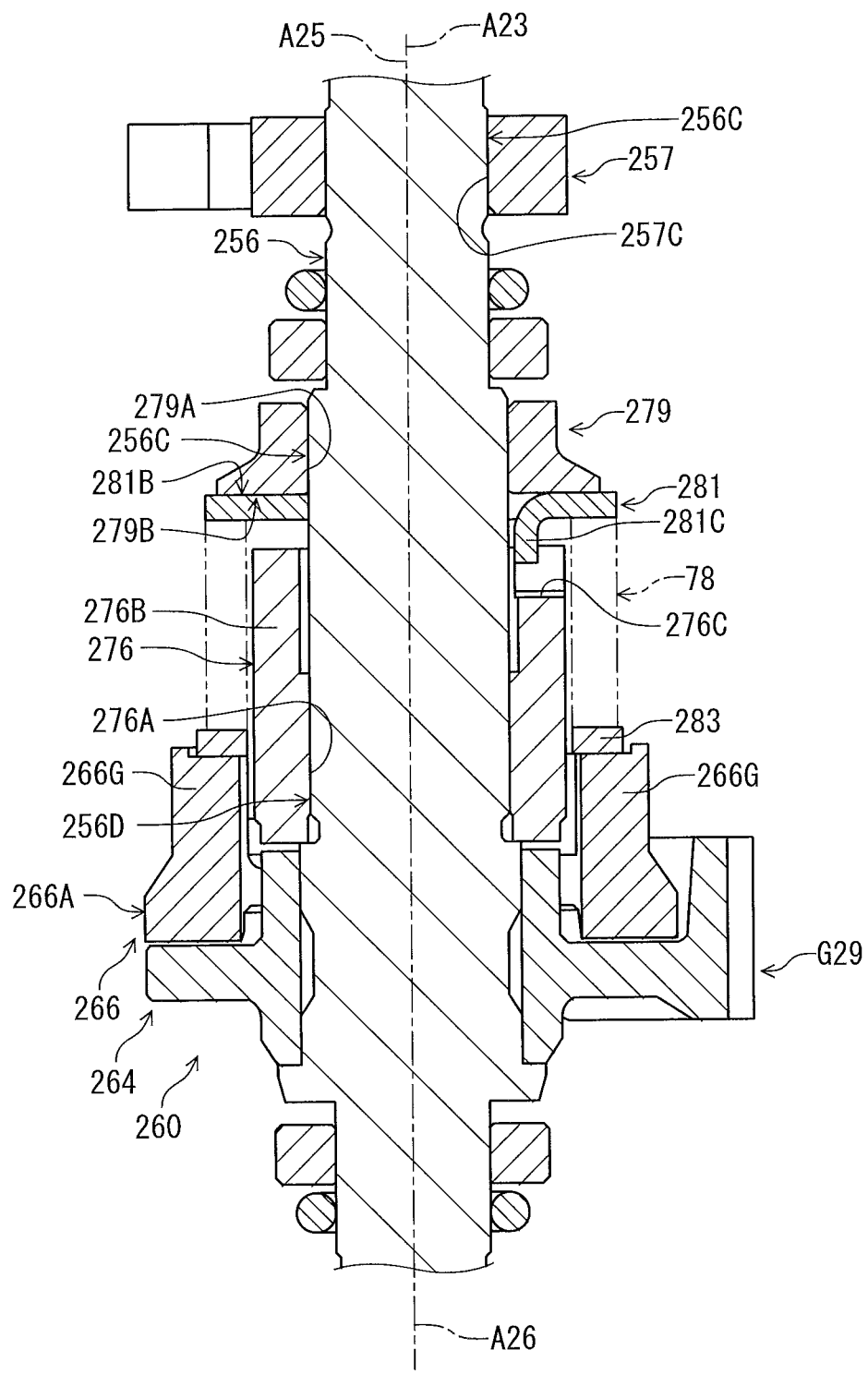
FIG. 34 is a cross-sectional view of the torque limiter of the motor unit of the derailleur illustrated in FIG. 23.

As seen in FIG. 34, the second intermediate member 283 is spaced apart from the first guide parts 276G of the guide member 276 in a state where the second intermediate member 283 contacts the second guide parts 266G of the second member 266. Thus, the biasing force of the biasing member 78 is applied to the second member 266 via the second intermediate member 283 without being applied to the guide member 276.

Figure 35:
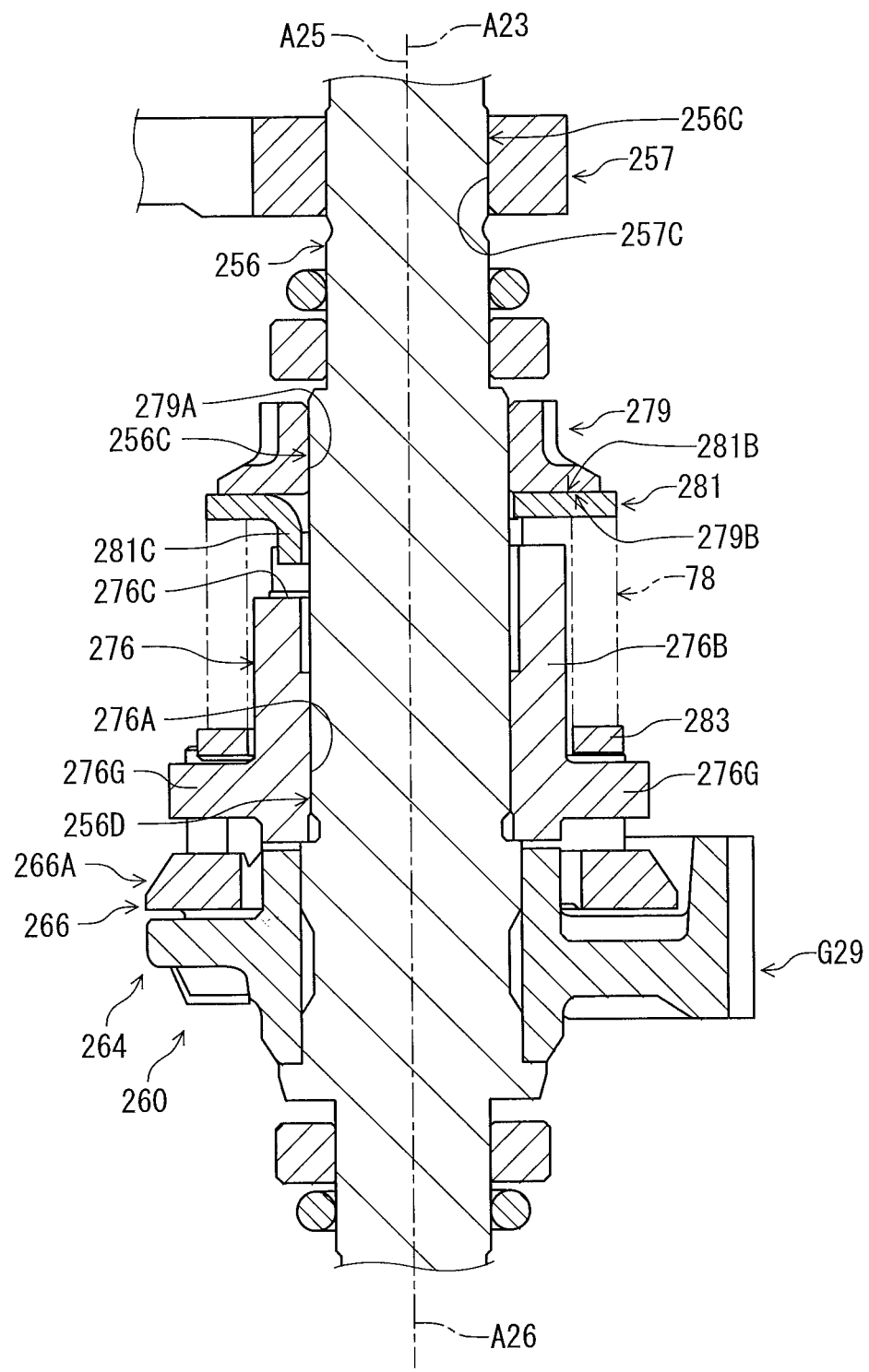
FIG. 35 is a cross-sectional view of the torque limiter of the motor unit of the derailleur illustrated in FIG. 23.

As seen in FIG. 35, the biasing member 78 is configured to bias the second member 266 toward the first member 264 to maintain the contact state between the first member 264 and the second member 266. The biasing member 78 is configured to bias the second member 266 toward the first member 264 to maintain the slidable contact state between the first member 264 and the second member 266.

However, the biasing member 78 can be configured to bias the first member 264 toward the second member 266 to maintain the contact state between the first member 264 and the second member 266 if needed and/or desired. The biasing member 78 can be configured to bias the first member 264 and the second member 266 toward each other to maintain the contact state between the first member 264 and the second member 266 if needed and/or desired. The biasing member 78 can be configured to bias the first member 264 toward the second member 266 to maintain the slidable contact state between the first member 264 and the second member 266 if needed and/or desired. The biasing member 78 can be configured to bias the first member 264 and the second member 266 toward each other to maintain the slidable contact state between the first member 264 and the second member 266 if needed and/or desired.

Figure 36:
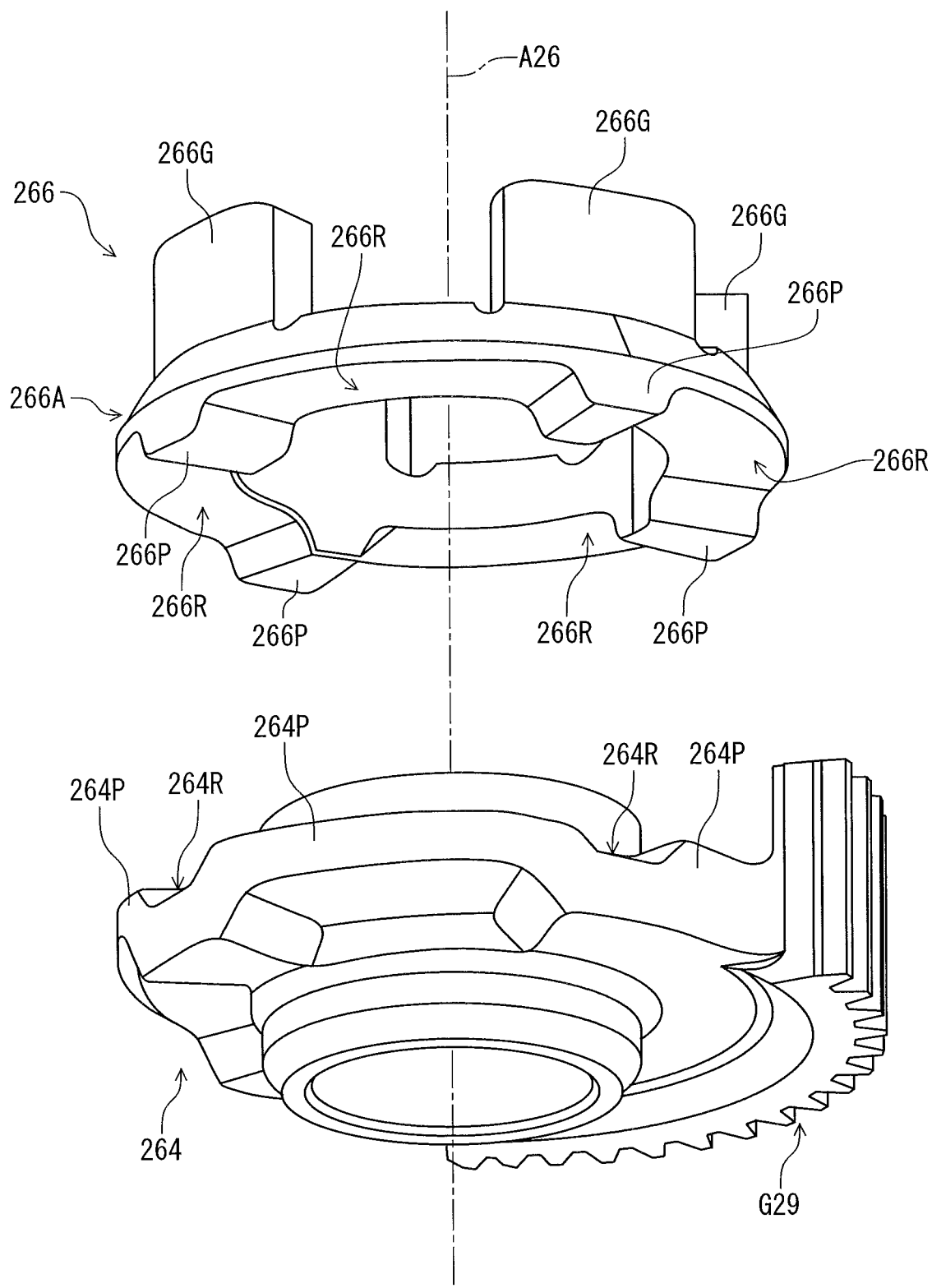
FIG. 36 is an exploded perspective view of a first member and a second member of the torque limiter of the motor unit illustrated in FIG. 31.
Figure 37:
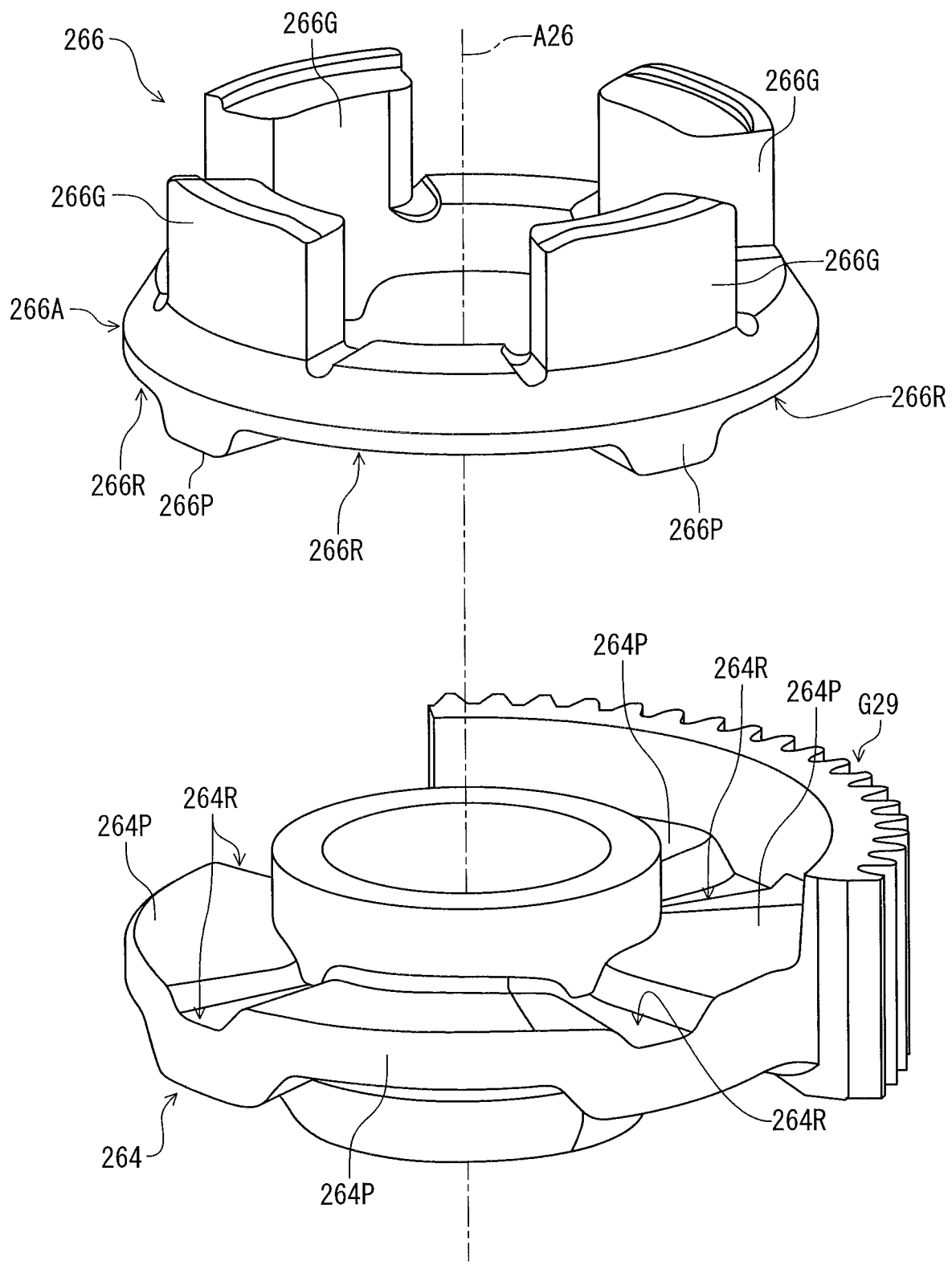
FIG. 37 is an exploded perspective view of the first member and the second member of the torque limiter of the motor unit illustrated in FIG. 31.

As seen in FIGS. 36 and 37, one of the first member 264 and the second member 266 includes a recess. The other of the first member 264 and the second member 266 includes a protruding part. In the present embodiment, the first member 264 includes a recess 264R. The second member 266 includes a recess 266R. The base part 266A of the second member 266 includes the recess 266R. The first member 264 includes a protruding part 264P. The second member 66 includes a protruding part 266P. The base part 266A of the second member 266 includes the protruding part 266P.

More specifically, the first member 264 includes at least two recesses 264R. The second member 266 includes at least two recesses 266R. The base part 266A of the second member 266 includes the at least two recesses 266R. The first member 264 includes at least two protruding parts 264P. The second member 66 includes at least two protruding parts 266P. The base part 266A of the second member 266 includes the at least two protruding parts 266P. The recess 264R is provided between adjacent two protruding parts of the at least two protruding parts 264P. The recess 266R is provided between adjacent two protruding parts of the at least two protruding parts 266P. However, only one of the first member 264 and the second member 266 can include a recess if needed and/or desired. Only the other of the first member 264 and the second member 266 can include a protruding part if needed and/or desired.

As seen in FIG. 33, the protruding part 264P is configured to be engaged in the recess 266R to transmit the third torque T42 between the first member 264 and the second member 266 in the state where the torque (e.g., the fourth input torque T41) is lower than the torque threshold. The protruding part 264P is configured to be disengaged from the recess 266R to transmit the fourth torque T43 between the first member 264 and the second member 266 in the state where the torque (e.g., the fourth input torque T41) is equal to or higher than the torque threshold.

The protruding part 266P is configured to be engaged in the recess 264R to transmit the third torque T42 between the first member 264 and the second member 266 in the state where the torque (e.g., the fourth input torque T41) is lower than the torque threshold. The protruding part 266P is configured to be disengaged from the recess 264R to transmit the fourth torque T43 between the first member 264 and the second member 266 in the state where the torque (e.g., the fourth input torque T41) is equal to or higher than the torque threshold.

Figure 38:
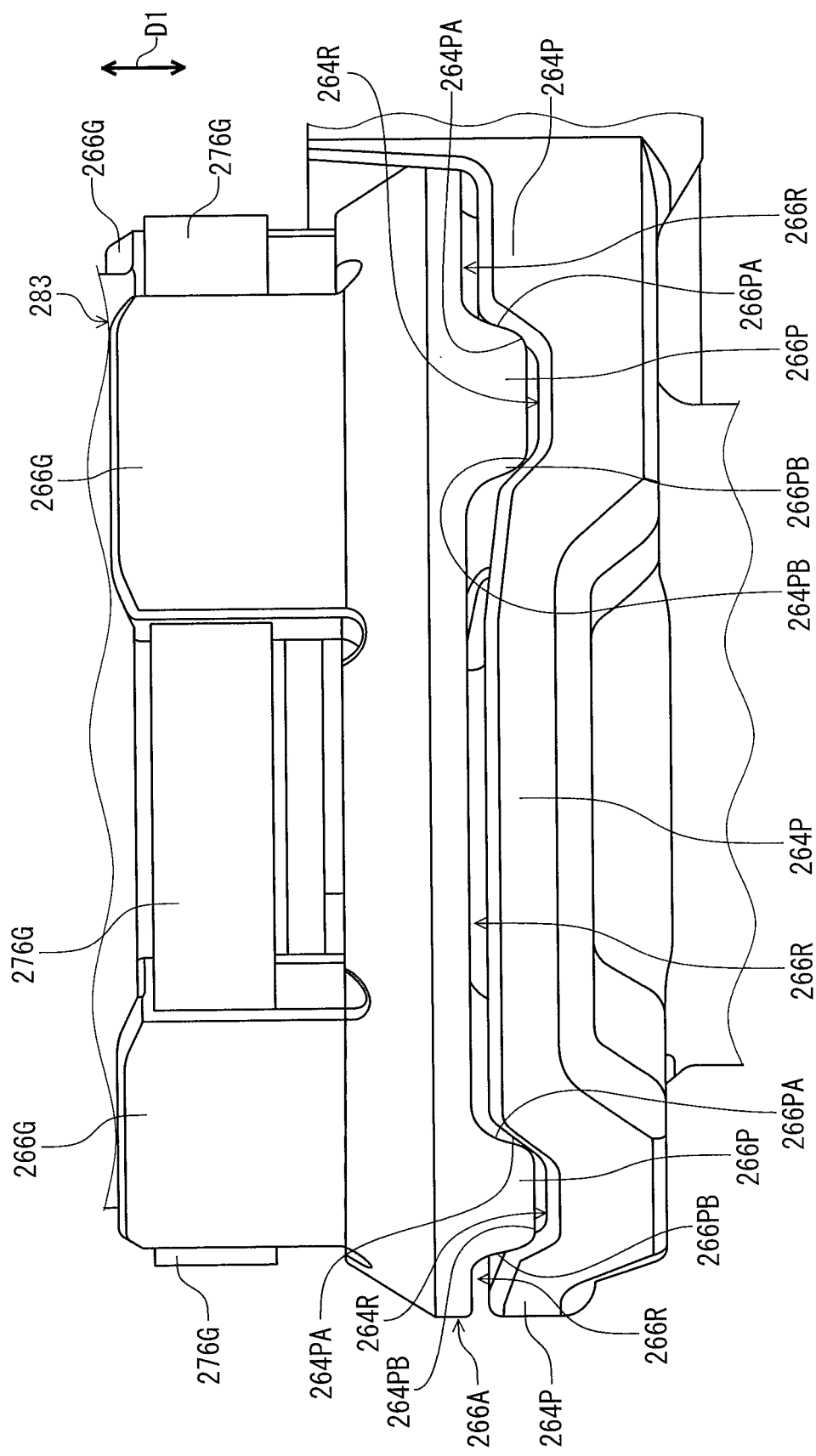
FIG. 38 is a side elevational view of the first member and the second member of the torque limiter of the motor unit illustrated in FIG. 31.

As seen in FIG. 38, the protruding part 264P includes a first inclined surface 264PA and a second inclined surface 264PB. The first inclined surface 264PA and the second inclined surface 264PB at least partially define the recess 264R. The first inclined surface 264PA is non-parallel and non-perpendicular to the limiter rotational axis A26. The second inclined surface 264PB is non-parallel and non-perpendicular to the limiter rotational axis A26.

The protruding part 266P includes a first inclined surface 266PA and a second inclined surface 266PB. The first inclined surface 266PA and the second inclined surface 266PB at least partially define the recess 266R. The first inclined surface 266PA is non-parallel and non-perpendicular to the limiter rotational axis A26. The second inclined surface 266PB is non-parallel and non-perpendicular to the limiter rotational axis A26.

The first inclined surface 264PA is contactable with the first inclined surface 266PA. The second inclined surface 264PB is contactable with the second inclined surface 266PB. The first inclined surface 264PA is in contact with the first inclined surface 266PA in a state where the protruding part 264P is provided in the recess 266R and the protruding part 266P is provided in the recess 264R. The second inclined surface 264PB is in contact with the second inclined surface 266PB in a state where the protruding part 264P is provided in the recess 266R and the protruding part 266P is provided in the recess 264R.

As seen in FIG. 38, the second member 266 is movable relative to the first member 264 between a first position P11 and a second position P12 in an axial direction D1 parallel to the limiter rotational axis A26. The protruding part 264P is configured to be engaged in the recess 266R to transmit the third torque T42 between the first member 264 and the second member 266 in a state where the second member 266 is in the first position P11 relative to the first member 264. The protruding part 266P is configured to be engaged in the recess 264R to transmit the third torque T42 between the first member 264 and the second member 266 in the state where the second member 266 is in the first position P11 relative to the first member 264.

The protruding part 264P is provided in the recess 266R in a state where the second member 66 is in the first position P11. The protruding part 266P is provided in the recess 264R in a state where the second member 266 is in the first position P11. The second member 266 is maintained in the first position P11 by the biasing force of the biasing member 78 in a state where the torque is not input to the first member 264 and the second member 266.

When the torque is input to one of the first member 264 and the second member 266, one of the first inclined surface 264PA and the second inclined surface 264PB of the protruding part 264P guides the protruding part 266P to an axial end of the protruding part 264P to disengage the protruding part 266P from the recess 264R in the state where the torque is equal to or higher than the torque threshold. Namely, when the torque is input to one of the first member 264 and the second member 266, one of the first inclined surface 264PA and the second inclined surface 264PB of the protruding part 264P guides the protruding part 266P to the axial end of the protruding part 264P to move the second member 266 from the first position P11 to the second position P12 against the biasing force of the biasing member 78 in the state where the torque is equal to or higher than the torque threshold.

The protruding part 266P moves from the axial end of the protruding part 264P into the recess 266R along one of the first inclined surface 264PA and the second inclined surface 264PB of the protruding part 264P in the state where the torque is equal to or higher than the torque threshold, moving the second member 266 from the second position P12 to the first position P11. The protruding parts 266P are repeatedly disengaged from and engaged with the recesses 264R while one of the first member 264 and the second member 266 receives the torque which is equal to or higher than the torque threshold, allowing the first member 264 and the second member 266 to rotate relative to each other about the limiter rotational axis A26.

While the disengagement and the engagement between the protruding parts 266P and the recesses 264R are repeated, the fourth torque T43 is transmitted between the first member 264 and the second member 266. The fourth torque T43 depends on rotational resistance generated by the protruding parts 264P, the protruding parts 266P, the recesses 264R, and the recesses 266R while the first member 264 and the second member 266 rotate relative to each other. For example, the fourth torque T43 is substantially zero.

The structure of the torque limiter 260 is not limited to the illustrated embodiment. The torque limiter 260 can have other structures such as a friction torque limiter and a ball clutch.

As seen in FIG. 28, the torque limiter 260 is entirely disposed inside the housing 238 of the motor unit 232. The torque limiter 260 is entirely disposed in the internal space 238S of the housing 238. However, the torque limiter 260 can be partially disposed inside the housing 238 of the motor unit 232 if needed and/or desired. The torque limiter 260 can be partially disposed in the internal space 238S of the housing 238 if needed and/or desired.

The transmitting structure 62 is entirely disposed inside the housing 238 of the motor unit 232. The transmitting structure 62 is entirely disposed in the internal space 238S of the housing 238. However, the transmitting structure 62 can be partially disposed inside the housing 238 of the motor unit 232 if needed and/or desired. The transmitting structure 62 can be partially disposed in the internal space 238S of the housing 238 if needed and/or desired.

The transmitting structure 62 of the motor unit 232 is the same as the transmitting structure 62 of the motor unit 32 described in the first embodiment. Thus, it will not be described and illustrated in detail here for the sake of brevity.

Figure 39:
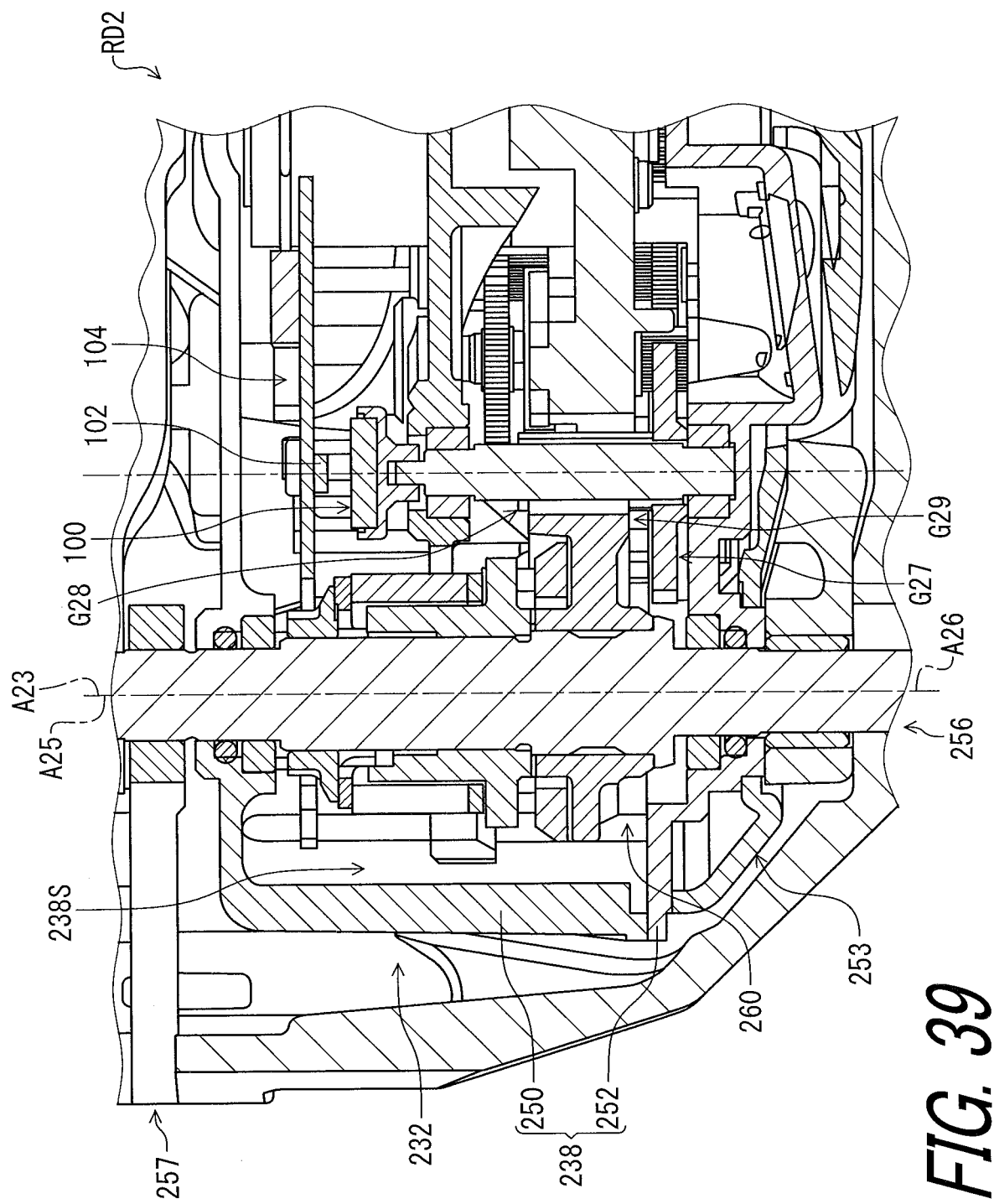
FIG. 39 is a cross-sectional view of the derailleur illustrated in FIG. 23.

As seen in FIG. 39, the motor unit 232 further comprises the detection object 100. The motor unit 232 comprises the detector 102 configured to detect the detection object 100. The detection object 100 is configured to be detected by the detector 102. The detection object 100 is coupled to the gears G27 and G28 to rotate along with the gears G27 and G28 about a rotational axis A28. The detector 102 is configured to detect a rotational position of the gears G27 and G28. The gear G28 meshes with the gear G29 coupled to the first member 264. Thus, the detector 102 is configured to detect a rotational position of the output member 256 via the torque limiter 260. The rotational position of the output member 256 corresponds to a position of the linkage 216. Thus, the detector 102 is configured to detect the position of the linkage 216.

As seen in FIG. 31, the detection object 100 is provided on an upstream side with respect to the torque limiter 260 on the power transmission path TP2. The detection object 100 is provided on the upstream side with respect to the torque limiter 260 on the power transmission path TP2 in the first load direction LD1. As with the motor unit 32 of the first embodiment, however, the detection object 100 can be provided on a downstream side with respect to the torque limiter 260 on the power transmission path TP2 if needed and/or desired.

Figure 40:
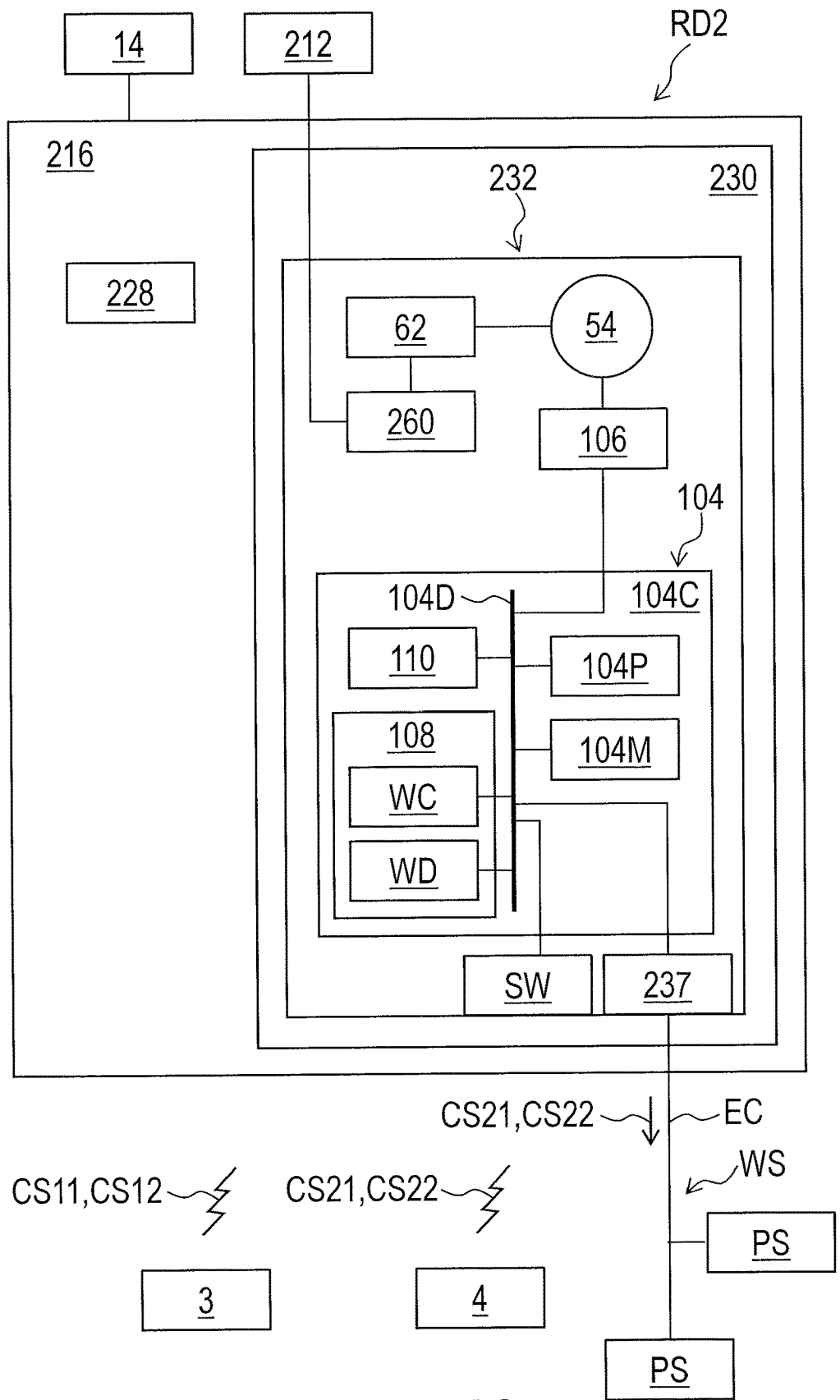
FIG. 40 is a schematic block diagram of the derailleur illustrated in FIG. 23.

As seen in FIG. 40, the motor unit 232 includes the electronic controller 104, the motor driver 106, the communicator 108, the informing device 110, and the electric switch SW. In the motor unit 232, the detection result of the detector 102 indicates the current position of the first member 264. Since the detection object 100 is provided on the upstream side with respect to the torque limiter 60 on the power transmission path TP2, however, the detection result of the detector 102 does not indicate the current position of the movable member 14 after the second member 266 slides with the first member 264. Thus, the returning control in which the motor unit 32 automatically returns the movable member 14 to a previous gear position which is a position before the movable member 14 is moved by the external force EF can be omitted from the control of the electronic controller 104.

The communicator 108 includes a wired communicator WD. The wired communicator WD is configured to communicate with another wired communicator of another device such as the derailleur FD via a wired communication structure WS including the electric cable EC. The wired communicator WD is electrically connected to the electronic controller 104. The motor unit 232 is electrically connected to the electric power source PS and the derailleur FD via the wired communication structure WS. The derailleurs RD2 and FD are powered by the electric power source PS.

The wired communicator WD is configured to communicate with another wired communicator of another device via the wired communication structure WS using power line communication (PLC) technology. More specifically, the wired communication structure WS includes a ground line and a voltage line that are detachably connected to a serial bus that is formed by communication interfaces. In the present embodiment, the wired communicator WD is configured to communicate with the derailleur FD through the voltage line using the PLC technology. Since the PLC technology has been known, it will not be described in detail here for the sake of brevity.

The electronic controller 104 is configured to control the wired communicator WD to transmit the control signal CS21 to the derailleur FD via the wired communication structure WS if the wireless communicator WC wirelessly receives the control signal CS21 from the operating device 4. The electronic controller 104 is configured to control the wired communicator WD to transmit the control signal CS22 to the derailleur FD via the wired communication structure WS if the wireless communicator WC wirelessly receives the control signal CS22 from the operating device 4.

Modifications

In the first embodiment and the modifications thereof, the torque limiter 60 of the first embodiment includes the first member 64 includes the protruding parts 64P and the recesses 64R. The second member 66 includes the protruding parts 66P and the recesses 66R. The protruding parts 64P are provided in the recesses 66R. The protruding parts 66P are provided in the recesses 64R. However, the structure of the torque limiter 60 is not limited to the structures described the first and second embodiments and the modifications thereof.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A motor unit for a bicycle component, comprising:
a torque limiter including a first member and a second member, the first member and the second member being movable relative to each other in a state where a torque applied to the torque limiter is equal to or higher than a torque threshold, the first member and the second member being movable together with each other in a state where the torque is lower than the torque threshold;
a transmitting structure having a transmitting-structure rotational axis, the transmitting structure including:
a first race;
a second race;
a first intermediate element at least partially provided between the first race and the second race; and
a second intermediate element at least partially provided between the first race and the second race;
the first intermediate element being configured to move toward the first race in response to the first intermediate element pushed by the second race in a first circumferential direction with respect to the transmitting-structure rotational axis;
the first intermediate element being configured to move toward the first race in response to the first intermediate element pushed by the second race in a second circumferential direction different from the first circumferential direction;
the first intermediate element being configured to move away from the first race in response to the first intermediate element pushed by the second intermediate element in the first circumferential direction; and
the first intermediate element being configured to move away from the first race in response to the first intermediate element pushed by the second intermediate element in the second circumferential direction different from the first circumferential direction.

2. The motor unit according to claim 1, wherein
the first intermediate element is configured to rotate together with the first race in a state where the second race pushes the first intermediate element without the second intermediate element pushing the first intermediate element.

3. The motor unit according to claim 1, wherein
the first intermediate element is configured to rotate relative to the first race in a state where the second intermediate element pushes the first intermediate element without the second race pushing the first intermediate element.

4. The motor unit according to claim 1, further comprising:
an electric motor;
an output member; and
a speed reducer coupling the electric motor and the output member to transmit an output torque of the electric motor to the output member.

5. The motor unit according to claim 4, wherein
the speed reducer includes the torque limiter and the transmitting structure.

6. The motor unit according to claim 5, wherein
the transmitting structure is provided between the electric motor and the torque limiter on a power transmission path provided from the electric motor to the output member.

7. The motor unit according to claim 4, wherein
the transmitting structure is configured to transmit a first torque in a first load direction defined from the electric motor to the output member,
the transmitting structure is configured to transmit a second torque in a second load direction defined from the output member to the electric motor, and
the first torque is higher than the second torque.

8. The motor unit according to claim 4, wherein
the second member is configured to transmit a third torque to the first member in a second load direction defined from the output member to the electric motor in a state where an external torque which is input to the output member is lower than an external torque threshold,
the second member is configured to transmit a fourth torque to the first member in a second load direction in a state where the external torque is equal to or larger than the external torque threshold, and
the third torque is higher than the fourth torque.

9. The motor unit according to claim 1, wherein
the torque limiter has a limiter rotational axis,
the transmitting structure has a transmitting-structure rotational axis, and
the limiter rotational axis is not coincident with the transmitting-structure rotational axis.

10. The motor unit according to claim 1, wherein
the torque limiter has a limiter rotational axis, and
the limiter rotational axis is parallel to the transmitting-structure rotational axis.

11. The motor unit according to claim 1, wherein
the torque limiter has a limiter rotational axis, and
the limiter rotational axis is coincident with the transmitting-structure rotational axis.

12. The motor unit according to claim 1, wherein
the first member slidably contacts the second member to transmit a third torque between the first member and the second member in a state where external torque which is input to the output member is lower than an external torque threshold,
the first member slidably contacts the second member to transmit a fourth torque between the first member and the second member in a state where the external torque is equal to or higher than the external torque threshold, and
the third torque is higher than the fourth torque.

13. The motor unit according to claim 1, wherein
one of the first member and the second member includes a recess,
the other of the first member and the second member includes a protruding part,
the protruding part is configured to be engaged in the recess to transmit a third torque between the first member and the second member in a state where the torque is lower than the torque threshold,
the protruding part is configured to be disengaged from the recess to transmit a fourth torque between the first member and the second member in a state where the torque is equal to or higher than the torque threshold, and
the third torque is higher than the fourth torque.

14. The motor unit according to claim 1, further comprising
a gear fastened to the first member to transmit the torque from the transmitting structure to the first member.

15. The motor unit according to claim 1, wherein
the torque limiter includes a biasing member configured to bias at least one of the first member and the second member to maintain a contact state between the first member and the second member.

16. The motor unit according to claim 1, further comprising
a detection object configured to be detected by a detector, wherein
the detection object is provided on a downstream side with respect to the transmitting structure on a power transmission path.

17. The motor unit according to claim 1, further comprising
a detection object configured to be detected by a detector, wherein
the detection object is provided on a downstream side with respect to the torque limiter on a power transmission path.

18. The motor unit according to claim 1, wherein
the transmitting structure is coupled to the torque limiter,
the transmitting structure is configured to transmit a first torque to the torque limiter in a state where first input torque is applied to the transmitting structure from a device other than the torque limiter,
the transmitting structure is configured to transmit a second torque in a state where second input torque is applied from the torque limiter to the transmitting structure, and
the first torque is higher than the second torque.

19. A derailleur comprising:
a base member;
a movable member;
a linkage movably coupling the base member and the movable member; and
the motor unit according to claim 1, the motor unit being provided at one of the base member, the movable member, and the linkage.

20. The derailleur according to claim 19, further comprising
a power-supply attachment structure to which an electric power source is to be attached, the power-supply attachment structure being provided at one of the base member, the movable member, and the linkage.

21. The derailleur according to claim 20, wherein
the motor unit is provided at one of the base member, the movable member, and the linkage, and
the power-supply attachment structure is provided at another of the base member, the movable member, and the linkage.

22. The derailleur according to claim 20, wherein
the motor unit is provided at one of the base member and the linkage, and
the power-supply attachment structure is provided at the other of the base member and the linkage.

23. A motor unit for a bicycle component, comprising:
an output member;
an electric motor including an output shaft;
a torque limiter entirely disposed inside a housing of the motor unit;
a transmitting structure configured to transmit a first torque in a first load direction defined from the output shaft to the output member and configured to transmit a second torque in a second load direction defined from the output member to the output shaft, the transmitting structure being configured to transmit a torque in multiple rotational directions based on a rotational direction of the output shaft in a state where the transmitting structure transmits the torque in the first load direction; and
the first torque being higher than the second torque.

24. The motor unit according to claim 23, wherein
the torque limiter is configured to transmit a third torque in a state where the torque which is input to the torque limiter is lower than a torque threshold, the torque limiter is configured to transmit a fourth torque in a state where the torque which is input to the torque limiter is equal to or higher than the torque threshold, and the third torque is higher than the fourth torque.

25. The motor unit according to claim 23, wherein the torque limiter includes a first member and a second member, the first member and the second member contact each other to transmit the third torque between the first member and the second member in a state where the torque is lower than the torque threshold, and the first member and the second member are configured to transmit the fourth torque between the first member and the second member in a state where the torque is equal to or higher than the torque threshold.

* * * * *